United States Patent
Morishita et al.

(10) Patent No.: US 11,426,975 B2
(45) Date of Patent: Aug. 30, 2022

(54) HOT-DIP GALVANIZED STEEL SHEET

(71) Applicant: NIPPON STEEL CORPORATION, Tokyo (JP)

(72) Inventors: Atsushi Morishita, Tokyo (JP); Taihei Kaneto, Tokyo (JP); Satoshi Uchida, Tokyo (JP); Tatsuya Nakada, Tokyo (JP); Yuji Yamaguchi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 2 days.

(21) Appl. No.: 16/635,499

(22) PCT Filed: Jul. 31, 2017

(86) PCT No.: PCT/JP2017/027659
§ 371 (c)(1),
(2) Date: Jan. 30, 2020

(87) PCT Pub. No.: WO2019/026116
PCT Pub. Date: Feb. 7, 2019

(65) Prior Publication Data
US 2020/0230918 A1    Jul. 23, 2020

(51) Int. Cl.
*B32B 15/01* (2006.01)
*C22C 38/00* (2006.01)
(Continued)

(52) U.S. Cl.
CPC ............ *B32B 15/013* (2013.01); *C21D 6/001* (2013.01); *C21D 6/002* (2013.01); *C21D 6/005* (2013.01);
(Continued)

(58) Field of Classification Search
CPC ... B32B 15/013; C22C 38/002; C22C 38/005; C22C 38/02; C22C 38/06; C22C 38/08;
(Continued)

(56) References Cited

U.S. PATENT DOCUMENTS 6,558,815 B1    5/2003    Suzuki et al.
2004/0202889 A1    10/2004    Fujita et al.
(Continued)

FOREIGN PATENT DOCUMENTS

JP    9-176815 A    7/1997
JP    11-140587 A    5/1999
(Continued)

OTHER PUBLICATIONS

International Search Report for PCT/JP2017/027659 dated Oct. 24, 2017.
(Continued)

*Primary Examiner* — Humera N. Sheikh
*Assistant Examiner* — Katherine A Christy
(74) *Attorney, Agent, or Firm* — Birch, Stewart, Kolasch & Birch, LLP

(57) ABSTRACT

In a thickness range of which center is a ¼ thickness from the surface of a base steel sheet, a volume fraction of a ferrite phase is 0% to less than 50%, a volume fraction of the total of a hard structure composed of one or more of a bainite structure, a bainitic ferrite phase, a fresh martensite phase, and a tempered martensite phase is 50% or more, a volume fraction of a retained austenite phase is 0-8%, and a volume fraction of the total of a pearlite phase and a coarse cementite phase is 0-8%, at an interface between a plating layer and the base steel sheet, a Fe—Al alloy layer is provided, the Fe—Al alloy layer having an average thickness of 0.1-2.0 μm and a difference between a maximum thickness and a minimum thickness in the width direction of the steel sheet being within 0.5 μm.

8 Claims, 1 Drawing Sheet

(51) Int. Cl.

| | |
|---|---|
| *C22C 38/02* | (2006.01) |
| *C22C 38/06* | (2006.01) |
| *C22C 38/08* | (2006.01) |
| *C22C 38/16* | (2006.01) |
| *C22C 38/22* | (2006.01) |
| *C22C 38/26* | (2006.01) |
| *C22C 38/28* | (2006.01) |
| *C22C 38/32* | (2006.01) |
| *C22C 38/38* | (2006.01) |
| *C21D 6/00* | (2006.01) |
| *C21D 8/02* | (2006.01) |
| *C21D 9/46* | (2006.01) |
| *C23C 2/06* | (2006.01) |
| *C23C 2/40* | (2006.01) |

(52) U.S. Cl.
CPC ........... *C21D 6/008* (2013.01); *C21D 8/0205* (2013.01); *C21D 8/0236* (2013.01); *C21D 9/46* (2013.01); *C22C 38/002* (2013.01); *C22C 38/005* (2013.01); *C22C 38/02* (2013.01); *C22C 38/06* (2013.01); *C22C 38/08* (2013.01); *C22C 38/16* (2013.01); *C22C 38/22* (2013.01); *C22C 38/26* (2013.01); *C22C 38/28* (2013.01); *C22C 38/32* (2013.01); *C22C 38/38* (2013.01); *C23C 2/06* (2013.01); *C23C 2/40* (2013.01); *C21D 2211/001* (2013.01); *C21D 2211/002* (2013.01); *C21D 2211/005* (2013.01); *C21D 2211/008* (2013.01)

(58) Field of Classification Search
CPC ......... C22C 38/16; C22C 38/22; C22C 38/26; C22C 38/28; C22C 38/32; C22C 38/38
USPC ....................................................... 428/659
See application file for complete search history.

(56) References Cited

U.S. PATENT DOCUMENTS

| | | |
|---|---|---|
| 2007/0051438 A1 | 3/2007 | Honda et al. |
| 2008/0035247 A1 | 2/2008 | Fujita et al. |
| 2009/0272467 A1 | 11/2009 | Fujita et al. |
| 2010/0304183 A1 | 12/2010 | Honda et al. |
| 2014/0234660 A1 | 8/2014 | Kawata et al. |
| 2014/0255724 A1 | 9/2014 | Yamanaka et al. |
| 2017/0305114 A1 | 10/2017 | Kawata et al. |
| 2017/0314115 A1* | 11/2017 | Kawata ................. C22C 38/58 |
| 2017/0314116 A1 | 11/2017 | Kawata et al. |

FOREIGN PATENT DOCUMENTS

| | | |
|---|---|---|
| JP | 2001-26853 A | 1/2001 |
| JP | 2001-303226 A | 10/2001 |
| JP | 2002-88459 A | 3/2002 |
| JP | 2003-55751 A | 2/2003 |
| JP | 2003-96541 A | 4/2003 |
| JP | 2005-60742 A | 3/2005 |
| JP | 2005-60743 A | 3/2005 |
| JP | 2005-200750 A | 7/2005 |
| JP | 2008-19465 A | 1/2008 |
| JP | 2013-163827 A | 8/2013 |
| TW | 201536954 A | 10/2015 |
| TW | 201623652 A | 7/2016 |
| WO | WO 2013/047812 A1 | 4/2013 |
| WO | WO 2013/047821 A1 | 4/2013 |
| WO | WO 2016/072479 A1 | 5/2016 |
| WO | WO-2016072478 A1 * | 5/2016 ............ C22C 38/12 |

OTHER PUBLICATIONS

Written Opinion of the International Searching Authority for PCT/JP2017/027659 (PCT/ISA/237) dated Oct. 24, 2017.
International Preliminary Report on Patentability and English translation of the Written Opinion of the International Searching Authority (forms PCT/IB/373, PCT/ISA/237 and PCT/IB/338), dated Feb. 13, 2020, for corresponding International Application No. PCT/JP2017/027659.

* cited by examiner

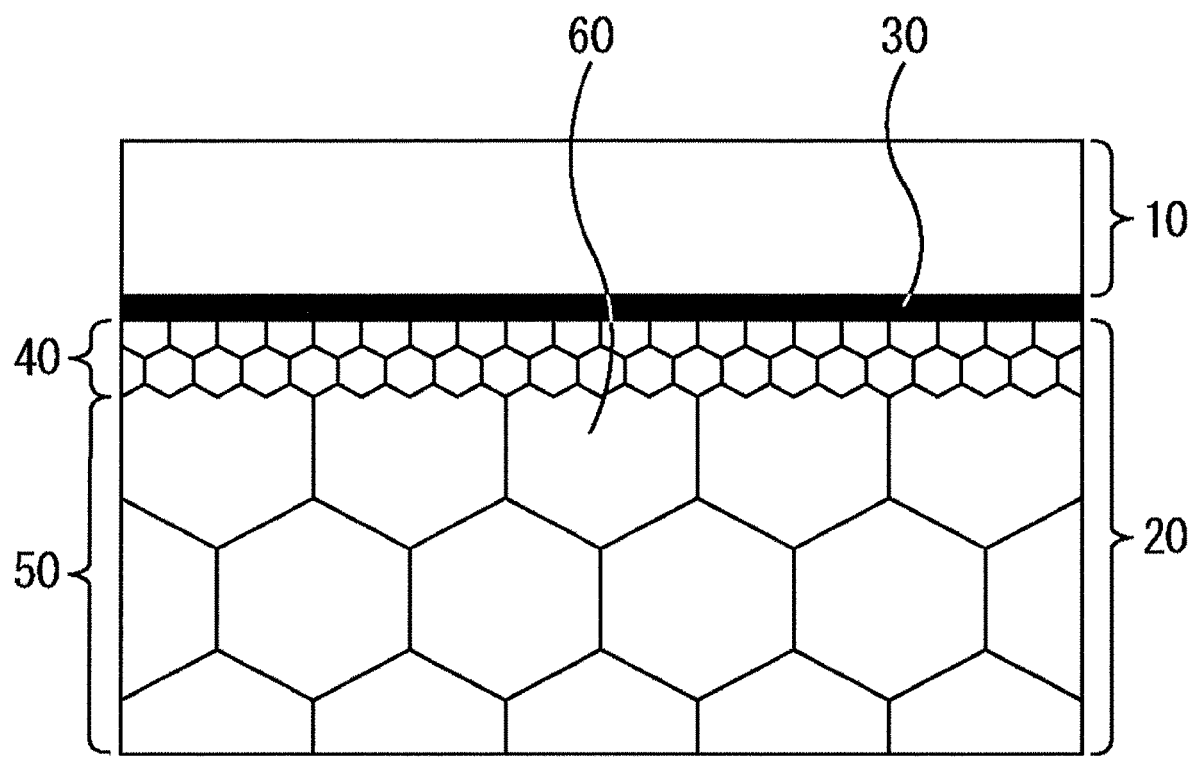

HOT-DIP GALVANIZED STEEL SHEET

TECHNICAL FIELD

The present invention relates to a high-strength hot-dip galvanized steel sheet excellent in ductility, bendability, hole expandability, and plating adhesion at the time of bending deformation and excellent in continuous bending fatigue resistance.

BACKGROUND ART

There has been an increasing demand for high-strengthening of steel sheets mainly used for automotive frame members. For these high-strength steel sheets, it is general to add alloying elements represented by Si and Mn that contribute to a strength improvement in order to obtain high strength and excellent formability. However, the alloying elements represented by Si and Mn also have a function to reduce the plating adhesion.

Further, automotive steel sheets, which are generally used outdoors, are usually required to have excellent corrosion resistance.

By the way, in the uses for automotive outer sheets and the like, heavy bending (hem bending) is usually applied to the peripheral portion of the sheet by presswork. Steel sheets having undergone heavy bending, hole expanding, and so on by presswork are often used not only in the automobile outer sheets but also in other applications. Then, in the case of applying heavy bending, hole expanding, or the like to a conventional hot-dip galvanized steel sheet, a plating layer sometimes peels off from a base steel sheet at its worked portion. Such peeling of the plating layer causes a problem that the corrosion resistance of the peeled portion is lost and the base steel sheet is corroded and rusted at an early stage. In addition, even if the plating layer does not go so far as to peel off, the adhesion between the plating layer and the base steel sheet is lost and even a small void is generated in a portion in which the adhesion is lost to cause the outside air or moisture to enter the void, resulting in that a function of corrosion resistance by the plating layer is lost. As a result, as described above, corrosion and rusting occur in the base steel sheet at an early stage.

In view of such problems, as a high-strength steel sheet to be used with heavy bending or the like applied thereto, there has been a strong desire for a metal coated steel sheet including a hot-dip galvanizing layer excellent in adhesion of the plating layer with the base steel sheet.

In order to enhance the adhesion of a plating layer, for example, as represented by Patent Literatures 1 to 3, there were proposed methods of forming oxides inside a steel sheet and reducing the oxides at an interface between a base iron and a plating layer that cause plating peeling. However, in the case of forming such oxides in a surface layer of the steel sheet, carbon in the surface layer of the steel sheet bonds to oxygen to be gasified. As a result, the carbon is released from the steel sheet, and thus, the strength of the region of the steel sheet from which the carbon has been released decreases significantly in some cases. In the case where the strength of the surface layer of the steel sheet decreases, fatigue resistance that strongly depends on the properties of the surface layer portion deteriorates, giving rise to a concern about a great decrease in fatigue strength.

Alternatively, in order to enhance the adhesion of the plating layer, in Patent Literature 4, there was proposed a method of enhancing plating adhesion by additionally applying a new annealing step and an acid pickling step before an ordinary annealing step to thereby reform the surface of a base steel sheet. However, in the method described in Patent Literature 4, the number of steps is increased as compared to a normal method of manufacturing a high-strength metal coated steel sheet, thus causing a problem in costs.

Further, in Patent Literature 5, there was proposed a method of enhancing plating adhesion by removing carbon from a surface layer portion of a base steel sheet. However, in the method described in Patent Literature 5, the strength of the region from which carbon has been removed decreases significantly. Therefore, the method described in Patent Literature 5 makes fatigue resistance, which strongly depends on the properties of the surface layer portion, deteriorate, giving rise to a concern about a great decrease in fatigue strength.

Further, in Patent Literatures 6 and 7, there were proposed steel sheets with improved plating adhesion that have a plating layer whose contents of Mn, Al, and Si were controlled to suitable ranges. For the steel sheets described in Patent Literatures 6, 7, it is necessary to control the contents of elements in the plating layer with high accuracy at the time of manufacture, which is a great operational load and causes a problem in costs.

In Patent Literature 8, there was proposed a high-strength steel sheet in which a microstructure of the steel sheet was made of only ferrite as a method for enhancing plating adhesion. However, since the microstructure is made of only soft ferrite in the steel sheet described in Patent Literature 8, it is impossible to obtain a sufficiently high strength.

Here, galvannealed steel sheets having undergone an alloying treatment after a hot-dip galvanizing treatment have been used widely. The alloying treatment is a treatment of heating a plating layer to a temperature of equal to or more than the melting point of Zn, diffusing a large amount of Fe atoms into the plating layer from the inside of a base steel sheet, and forming the plating layer into a layer mainly containing a Zn—Fe alloy. For example, in Patent Literatures 9, 10, and 11, there were proposed galvannealed steel sheets excellent in plating adhesion. However, it is necessary to heat a steel sheet to a high temperature in order to sufficiently alloy a plating layer. When the steel sheet is heated to a high temperature, the microstructure inside the steel sheet is changed in quality, particularly coarse iron-based carbides are easily generated, and the properties of the steel sheet are sometimes impaired, which is not preferable.

On the other hand, in a hot-dip galvanized steel sheet described in Patent Literature 12, for example, there has been a case where uneven appearance resulting from non-uniformity of the content of Fe in a plating layer in the width direction occurs.

CITATION LIST

Patent Literature

Patent Literature 1: Japanese Laid-open Patent Publication No. 2008-019465
Patent Literature 2: Japanese Laid-open Patent Publication No. 2005-060742
Patent Literature 3: Japanese Laid-open Patent Publication No. 09-176815
Patent Literature 4: Japanese Laid-open Patent Publication No. 2001-026853
Patent Literature 5: Japanese Laid-open Patent Publication No. 2002-088459
Patent Literature 6: Japanese Laid-open Patent Publication No. 2003-055751

Patent Literature 7: Japanese Laid-open Patent Publication No. 2003-096541

Patent Literature 8: Japanese Laid-open Patent Publication No. 2005-200750

Patent Literature 9: Japanese Laid-open Patent Publication No. 11-140587

Patent Literature 10: Japanese Laid-open Patent Publication No. 2001-303226

Patent Literature 11: Japanese Laid-open Patent Publication No. 2005-060743

Patent Literature 12: International Publication Pamphlet No. 2016/072479

SUMMARY OF INVENTION

Technical Problem

In consideration of the above circumstances, an object of the present invention is to provide a high-strength hot-dip galvanized steel sheet excellent in formabilities of a steel sheet, which are represented by, particularly, bendability and stretch flange formability (to be also referred to as stretch flangeability simply below) and excellent in plating appearance uniformity, fatigue resistance, weldability, corrosion resistance, and plating adhesion.

Solution to Problem

The present inventors have repeatedly conducted intensive investigations for obtaining a high-strength hot-dip galvanized steel sheet excellent in formabilities of a steel sheet represented by bendability and stretch flange formability and fatigue resistance, weldability, corrosion resistance, and plating adhesion. As a result, the present inventors have improved stretch flangeability (hole expandability) by appropriately controlling structural fractions of a microstructure of a steel sheet. In addition, the present inventors have improved bendability and fatigue resistance by controlling a volume fraction of a hard phase at the side of a base steel sheet from an interface between a plating layer and the base steel sheet. Further, the present inventors have found out that even when using a steel sheet containing large amounts of Si and Mn as a plating substrate, a specific fine-grain layer made of ultrafine particles of a ferrite phase is formed immediately under a Fe—Al alloy layer formed at an interface between a plating layer formed by using a plating bath with Al added thereto and a base steel sheet, thereby making it possible to suppress occurrence and propagation of cracks at the time of working and suppress plating peeling starting from the cracks. Further, they have found out that the thicknesses of the fine-grain layer and the Fe—Al alloy layer in the width direction of the steel sheet are controlled to fall within specific ranges, thereby making it possible to obtain a hot-dip galvanized steel sheet excellent not only in plating adhesion but also in appearance uniformity.

The present invention has been completed based on such findings and aspects thereof are as follows.

(1) A hot-dip galvanized steel sheet including a hot-dip galvanizing layer on at least one side of a base steel sheet, in which the base steel sheet has chemical components containing, in mass %, C: 0.040% to 0.280%,
Si: 0.05% to 2.00%,
Mn: 0.50% to 3.50%,
P: 0.0001% to 0.1000%,
S: 0.0001% to 0.0100%,
Al: 0.001% to 1.500%,
N: 0.0001% to 0.0100%,
O: 0.0001% to 0.0100%,
Ti: 0% to 0.150%,
Nb: 0% to 0.100%,
V: 0% to 0.300%,
Cr: 0% to 2.00%,
Ni: 0% to 2.00%,
Cu: 0% to 2.00%,
Mo: 0% to 2.00%,
B: 0% to 0.0100%,
W: 0% to 2.00%, and
Ca, Ce, Mg, Zr, La, and REM: 0% to 0.0100% in total, and a balance composed of Fe and impurities, and the base steel sheet has a microstructure in which in a range of ⅛ thickness to ⅜ thickness of which center is a ¼ thickness of the entire thickness of the base steel sheet from the surface of the base steel sheet, a volume fraction of a ferrite phase is 0% or more and less than 50%, a volume fraction of the total of a hard structure composed of one or more of a bainite structure, a bainitic ferrite phase, a fresh martensite phase, and a tempered martensite phase is 50% or more, a volume fraction of a retained austenite phase is 0% to 8%, and a volume fraction of the total of a pearlite phase and a coarse cementite phase is 0% to 8%, in a surface layer portion from an interface between the hot-dip galvanizing layer and the base steel sheet to 20 μm in depth in the thickness direction of the steel sheet, a volume fraction of retained austenite is 0% to 3%, and V1/V2 being a ratio of a volume fraction V1 of the hard structure in the surface layer portion to a volume fraction V2 of the hard structure in the range of ⅛ thickness to ⅜ thickness of which center is the ¼ thickness from the surface of the base steel sheet is limited within a range of 0.10 or more and 0.90 or less, and in the hot-dip galvanizing layer, a Fe content is more than 0% and 3.0% or less and an Al content is more than 0% and 1.0% or less, the hot-dip galvanized steel sheet includes:

a Fe—Al alloy layer provided at an interface between the hot-dip galvanizing layer and the base steel sheet, the Fe—Al alloy layer having an average thickness of 0.1 μm to 2.0 μm and a difference between a maximum thickness and a minimum thickness in a width direction of the steel sheet being within 0.5 μm; and a fine-grain layer provided in the base steel sheet and directly in contact with the Fe—Al alloy layer, the fine-grain layer having an average thickness of 0.1 μm to 5.0 μm, the fine-grain layer including a ferrite phase with an average grain diameter of 0.1 μm to 3.0 μm, the fine-grain layer containing an oxide of one or more of Si and Mn, a maximum diameter of the oxide being 0.01 μm to 0.4 μm, and the fine-grain layer having a difference between a maximum thickness and a minimum thickness in the width direction of the steel sheet being within 2.0 μm.

(2) The hot-dip galvanized steel sheet according to (1), in which a plating deposition amount per one side of the hot-dip galvanizing layer is 10 g/m2 or more and 100 g/m2 or less.

(3) The hot-dip galvanized steel sheet according to (1) or (2), in which the base steel sheet further contains, in mass %, one or two or more selected from a group consisting of Ti: 0.001% to 0.150%,
Nb: 0.001% to 0.100%, and
V: 0.001% to 0.300%.

(4) The hot-dip galvanized steel sheet according to any one of (1) to (3), in which the base steel sheet further contains, in mass %, one or two or more selected from a group consisting of Cr: 0.01% to 2.00%,
Ni: 0.01% to 2.00%,
Cu: 0.01% to 2.00%,
Mo: 0.01% to 2.00%,
B: 0.0001% to 0.0100%, and
W: 0.01% to 2.00%.

(5) The hot-dip galvanized steel sheet according to any one of (1) to (4), in which the base steel sheet further contains, in mass %, 0.0001% to 0.0100% in total of one or two or more selected from a group consisting of Ca, Ce, Mg, Zr, La, and REM.

Advantageous Effects of Invention

According to the aforementioned aspects of the present invention, it is possible to provide a hot-dip galvanized steel sheet excellent in plating appearance uniformity, formability, fatigue resistance, weldability, corrosion resistance, and plating adhesion.

BRIEF DESCRIPTION OF DRAWINGS

FIG. 1 is a view illustrating one example of a schematic view of a cross-sectional structure of a hot-dip galvanized steel sheet of the present invention.

DESCRIPTION OF EMBODIMENTS

A hot-dip galvanized steel sheet according to an embodiment of the present invention is formed by forming a hot-dip galvanizing layer (to be also referred to as a plating layer simply below) on a surface of a base steel sheet (to be also referred to as a steel sheet simply below) having chemical components containing, in mass %, C: 0.040% to 0.280%, Si: 0.05% to 2.00%, Mn: 0.50% to 3.50%, P: 0.0001% to 0.100%, S: 0.0001% to 0.0100%, Al: 0.001% to 1.500%, O: 0.0001% to 0.0100%, N: 0.0001% to 0.0100%, and a balance composed of Fe and impurities.

It is appropriate that the sheet thickness of the base steel sheet is 0.6 mm or more and less than 5.0 mm. When the sheet thickness of the base steel sheet is less than 0.6 mm, it is difficult to keep the shape of the base steel sheet flat, which is not appropriate. In addition, when the sheet thickness of the base steel sheet is 5.0 mm or more, the control of cooling in a manufacturing process becomes difficult, to fail to obtain a predetermined microstructure, resulting in that formability sometimes deteriorates.

The plating layer has a Fe content of more than 0% and 3.0% or less and an Al content of more than 0% and 1.0% or less.

The chemical components (composition) of the base steel sheet forming the hot-dip galvanized steel sheet according to the embodiment of the present invention are explained below. In the following explanation, [%] means [mass %] except for the ones with special explanation.

[C: 0.040% to 0.280%]

C is contained to increase the strength of the base steel sheet. However, when the C content exceeds 0.280%, spot weldability deteriorates, and thus the C content is set to 0.280% or less. From the viewpoint of spot weldability, the C content is preferably 0.250% or less and more preferably 0.220% or less. On the other hand, when the C content is less than 0.040%, strength decreases to be difficult to secure a sufficient maximum tensile strength, and thus, the C content is set to 0.040% or more. For a further increase in the strength, the C content is preferably 0.055% or more and more preferably 0.070% or more.

[Si: 0.05% to 2.00%]

Si is an element that suppresses generation of iron-based carbides in the base steel sheet and increases strength and formability. However, Si is also an element that makes a steel material brittle, and when the Si content exceeds 2.00%, a trouble such as cracking of a cast slab or the like easily occurs. Therefore, the Si content is set to 2.00% or less. Further, Si forms oxides on the surface of the base steel sheet in an annealing step to significantly impair plating adhesion. From this viewpoint, the Si content is preferably 1.500% or less and more preferably 1.200% or less. On the other hand, when the Si content is less than 0.05%, in a plating step of the hot-dip galvanized steel sheet, coarse iron-based carbides in large amounts are generated and strength and formability deteriorate, and thus, the Si content is set to 0.05% or more. From the viewpoint of suppressing the generation of iron-based carbides, the Si content is preferably 0.10% or more and more preferably 0.25% or more.

[Mn: 0.50% to 3.50%]

Mn is contained to increase strength by increasing hardenability of the base steel sheet. However, when the Mn content exceeds 3.50%, a coarse Mn-concentrated portion is generated in the thickness middle portion of the base steel sheet and embrittlement easily occurs, and thus, a trouble such as cracking of a cast slab easily occurs. Therefore, the Mn content is set to 3.50% or less. In addition, an increase in the Mn content results in deterioration in the spot weldability of the hot-dip galvanized steel sheet. For this reason, the Mn content is preferably 3.00% or less and more preferably 2.80% or less. On the other hand, when the Mn content is less than 0.50%, a large amount of soft structure is formed during cooling after annealing, to thus be difficult to secure a sufficiently high maximum tensile strength. Accordingly, the Mn content needs to be 0.50% or more. For a further increase in the strength of the hot-dip galvanized steel sheet, the Mn content is preferably 0.80% or more and more preferably 1.00% or more.

[P: 0.0001% to 0.1000%]

P is an element that makes a steel material brittle, and when the P content exceeds 0.1000%, troubles such as cracking of a cast slab and cracking of a slab during hot rolling easily occur, and therefore, the P content is set to 0.1000% or less. In addition, P is also an element that makes a molten portion generated by spot welding brittle, and the P content is preferably set to 0.0400% or less and further preferably set to 0.0200% or less in order to obtain a sufficient welded joint strength. On the other hand, setting the P content to less than 0.0001% results in a great increase in manufacturing cost, and thus, the P content is preferably set to 0.010% or more with its lower limit value set to 0.0001%.

[S: 0.0001% to 0.0100%]

S is an element that bonds to Mn to form coarse MnS and impair formabilities such as ductility, hole expandability (stretch flangeability), and bendability, and thus the S content is set to 0.0100% or less. In addition, S is also an element that impairs spot weldability. Therefore, the S content is preferably set to 0.0060% or less and more preferably set to 0.0035% or less. On the other hand, setting the S content to less than 0.0001% results in a great increase in manufacturing cost. Therefore, the S content is preferably set to 0.0005% or more and further preferably set to 0.0010% or more with its lower limit value set to 0.0001%.

[Al: 0.001% to 1.500%]

Al is an element that makes a steel material brittle. When the Al content exceeds 1.500%, a trouble such as cracking of a cast slab easily occurs, and thus the Al content is set to 1.500% or less. Further, when the Al content is increased, spot weldability deteriorates, and thus the Al content is more preferably set to 1.200% or less and further preferably set to 1.000% or less. On the other hand, even when the lower limit of the Al content is not particularly determined, the effects of this embodiment are exhibited. However, Al is an impurity present in the raw material in minute amounts and setting its content to less than 0.001% results in a great increase in manufacturing cost. Therefore, the Al content is set to 0.001% or more. Further, Al is an element effective also as a deoxidizing material, but in order to obtain a deoxidation effect more sufficiently, the Al content is more preferably set to 0.010% or more.

[N: 0.0001% to 0.0100%]

N is an element that forms coarse nitrides to impair formabilities such as ductility, hole expandability (stretch flangeability), and bendability, and thus, it is necessary to suppress its content. When the N content exceeds 0.0100%, the deterioration in formabilities becomes significant, and thus the upper limit of the N content is set to 0.0100%. Further, containing N excessively causes occurrence of blowholes at the time of welding, and thus a lower content thereof is better. From these viewpoints, the N content is preferably 0.0070% or less and more preferably 0.0050% or less. On the other hand, even when the lower limit of the N content is not particularly determined, the effects of this embodiment are exhibited, but setting the N content to less than 0.0001% results in a great increase in manufacturing cost. Therefore, the lower limit of the N content is set to 0.0001% or more. The N content is preferably 0.0003% or more and more preferably 0.0005% or more.

[O: 0.0001% to 0.0100%]

O forms oxides to impair the formabilities such as ductility, hole expandability (stretch flangeability), and bendability of the hot-dip galvanized steel sheet, and thus, it is necessary to suppress the O content. When the O content exceeds 0.0100%, the deterioration in the formabilities becomes significant, and thus the upper limit of the O content is set to 0.0100%. Further, the O content is preferably 0.0050% or less and more preferably 0.0030% or less. Even when the lower limit of the O content is not particularly determined, the effects of this embodiment are exhibited, but setting the O content to less than 0.0001% results in a great increase in manufacturing cost, and thus its lower limit is set to 0.0001%. The O content is preferably 0.0003% or more and more preferably 0.0005% or more.

Besides, the following elements may be contained in the base steel sheet of the hot-dip galvanized steel sheet according to this embodiment as necessary.

First, the base steel sheet according to this embodiment may further contain one or two or more selected from a group consisting of Ti: 0.001% to 0.150%, Nb: 0.001% to 0.100%, and V: 0.001% to 0.300%.

[Ti: 0.001% to 0.150%]

Ti is an element that contributes to an increase in the strength of the hot-dip galvanized steel sheet by precipitate strengthening, strengthening by grain refinement through the suppression of the growth of ferrite crystal grains, and dislocation strengthening through the suppression of recrystallization.

However, when the Ti content exceeds 0.150%, the amount of precipitated carbonitrides increases and formability deteriorates, and thus, the Ti content is set to 0.150% or less. Further, from the viewpoint of formability, the Ti content is preferably 0.080% or less. On the other hand, even when the lower limit of the Ti content is not particularly determined, the effects of this embodiment are exhibited, but for sufficiently obtaining the effect of increasing strength by Ti, the Ti content is preferably 0.001% or more. For achieving a higher strength of the hot-dip galvanized steel sheet, the Ti content is more preferably 0.010% or more.

[Nb: 0.001% to 0.100%]

Nb is an element that contributes to an increase in the strength of the hot-dip galvanized steel sheet by precipitate strengthening, strengthening by grain refinement through the suppression of the growth of ferrite crystal grains, and dislocation strengthening through the suppression of recrystallization.

However, when the Nb content exceeds 0.100%, the amount of precipitated carbonitrides increases and the formability of the hot-dip galvanized steel sheet deteriorates, and thus the Nb content is set to 0.100% or less. From the viewpoint of formability, the Nb content is preferably 0.060% or less. On the other hand, even when the lower limit of the Nb content is not particularly determined, the effects of this embodiment are exhibited, but for sufficiently obtaining the effect of increasing strength by Nb, the Nb content is preferably 0.001% or more. For achieving a higher strength of the hot-dip galvanized steel sheet, the Nb content is more preferably 0.005% or more.

[V: 0.001% to 0.300%]

V is an element that contributes to an increase in the strength of the hot-dip galvanized steel sheet by precipitate strengthening, strengthening by grain refinement through the suppression of the growth of ferrite crystal grains, and dislocation strengthening through the suppression of recrystallization.

However, when the V content exceeds 0.300%, the amount of precipitated carbonitrides increases and formability deteriorates. Therefore, the V content is set to 0.300% or less. The V content is preferably 0.200% or less. On the other hand, even when the lower limit of the V content is not particularly determined, the effects of this embodiment are exhibited. For sufficiently obtaining the effect of increasing strength by V, the V content is preferably 0.001% or more and further preferably 0.010% or more.

In addition, the base steel sheet according to this embodiment may contain one or two or more selected from a group consisting of Cr: 0.01% to 2.00%, Ni: 0.01% to 2.00%, Cu: 0.01% to 2.00%, Mo: 0.01% to 2.00%, B: 0.0001% to 0.0100%, and W: 0.01% to 2.00%.

[Cr 0.01% to 2.00%]

Cr is an element that suppresses phase transformation at a high temperature and is effective for high-strengthening of the hot-dip galvanized steel sheet and may be contained instead of part of C and/or Mn. However, when the Cr content exceeds 2.00%, hot workability is impaired and productivity decreases, and thus, the Cr content is preferably set to 2.00% or less and is further preferably 1.20% or less. On the other hand, even when the lower limit of the Cr content is not particularly determined, the effects of this embodiment are exhibited, but for sufficiently obtaining the effect of high-strengthening by Cr, the Cr content is preferably 0.01% or more and further preferably 0.10% or more.

[Ni: 0.01% to 2.00%]

Ni is an element that suppresses phase transformation at a high temperature and is effective for high-strengthening of the hot-dip galvanized steel sheet and may be contained instead of part of C and/or Mn. However, when the Ni content exceeds 2.00%, weldability is impaired, and thus, the Ni content is preferably set to 2.00% or less and further preferably 1.20% or less. On the other hand, even when the lower limit of the Ni content is not particularly determined, the effects of this embodiment are exhibited, but for sufficiently obtaining the effect of high-strengthening by Ni, the Ni content is preferably 0.01% or more and further preferably 0.10% or more.

[Cu: 0.01% to 2.00%]

Cu is an element that increases the strength of the hot-dip galvanized steel sheet by being present in steel as fine particles and can be contained instead of part of C and/or Mn. However, when the Cu content exceeds 2.00%, weldability is impaired, and thus, the Cu content is set to 2.00% or less. The Cu content is preferably 1.20% or less. On the other hand, even when the lower limit of the Cu content is not particularly determined, the effects of this embodiment are exhibited, but for sufficiently obtaining the effect of high-strengthening of the hot-dip galvanized steel sheet by Cu, the Cu content is preferably 0.01% or more and further preferably 0.10% or more.

[Mo: 0.01% to 2.00%]

Mo is an element that suppresses phase transformation at a high temperature and is effective for high-strengthening of the hot-dip galvanized steel sheet and may be contained instead of part of C and/or Mn. However, when the Mo content exceeds 2.00%, hot workability is impaired and productivity decreases, and thus, the Mo content is set to 2.00% or less. The Mo content is preferably 1.20% or less. On the other hand, even when the lower limit of the Mo content is not particularly determined, the effects of this embodiment are exhibited, but for sufficiently obtaining the effect of high-strengthening by Mo, the Mo content is preferably 0.01% or more and further preferably 0.05% or more.

[B: 0.0001% to 0.0100%]

B is an element that suppresses phase transformation at a high temperature and is effective for high-strengthening of the hot-dip galvanized steel sheet and may be contained instead of part of C and/or Mn. However, when the B content exceeds 0.0100%, hot workability is impaired and productivity decreases, and thus, the B content is set to 0.0100% or less. From the viewpoint of productivity, the B content is preferably 0.0050% or less. On the other hand, even when the lower limit of the B content is not particularly determined, the effects of this embodiment are exhibited, but for sufficiently obtaining the effect of high-strengthening by B, the B content is preferably set to 0.0001% or more. For achieving further high-strengthening of the hot-dip galvanized steel sheet, the B content is more preferably 0.0005% or more.

[W: 0.01% to 2.00%]

W is an element that suppresses phase transformation at a high temperature and is effective for high-strengthening of the hot-dip galvanized steel sheet and may be contained instead of part of C and/or Mn. However, when the W content exceeds 2.00%, hot workability is impaired and productivity decreases, and thus, the W content is set to 2.00% or less. The W content is preferably 1.20% or less. On the other hand, even when the lower limit of the W content is not particularly determined, the effects of this embodiment are exhibited, but for sufficiently obtaining the effect of high-strengthening by W, the W content is preferably 0.01% or more and further preferably 0.10% or more.

The base steel sheet in the hot-dip galvanized steel sheet in this embodiment may further contain, as other elements, 0.0001% to 0.0100% in total of one or two or more selected from a group consisting of Ca, Ce, Mg, Zr, La, and REM. The reasons for containing these elements are as follows. REM stands for Rare Earth Metal and refers to an element belonging to the lanthanoid series. In this embodiment of the present invention, REM and Ce are often contained in misch metal and may contain elements of the lanthanoid series other than La and Ce in a complex form. The effects of this embodiment are exhibited even when elements of the lanthanoid series other than La and Ce are contained as impurities. Further, the effects of this embodiment are exhibited even when metals La and Ce are contained.

Ca, Ce, Mg, Zr, La, and REM are elements effective for improving the formability of the hot-dip galvanized steel sheet, and one or two or more of these elements can be contained. However, when the total content of one or two or more selected from a group consisting of Ca, Ce, Mg, Zr, La, and REM exceeds 0.0100%, ductility may be impaired, and thus, the total content of the respective elements is set to 0.0100% or less. The total content of these respective elements is preferably 0.0070% or less. On the other hand, even when the lower limit of the content of one or two or more selected from a group consisting of Ca, Ce, Mg, Zr, La, and REM is not particularly determined, the effects of this embodiment are exhibited, but for sufficiently obtaining the effect of improving the formability of the hot-dip galvanized steel sheet, the total content of these respective elements is preferably 0.0001% or more. From the viewpoint of formability, the total content of one or two or more selected from a group consisting of Ca, Ce, Mg, Zr, La, and REM is further preferably 0.0010% or more.

In the chemical components of the hot-dip galvanized steel sheet according to this embodiment, a balance other than the above-described respective elements is Fe and impurities. A very small amount of each of Ti, Nb, V, Cr, Ni, Cu, Mo, B, and W described above, which is less than the above-described lower limit value, is allowed to be contained as an impurity. In addition, regarding Ca, Ce, Mg, Zr, La, and REM, a minute amount of them, which is less than the above-described lower limit value of the total content of them, is allowed to be contained as an impurity.

The reasons for defining the structure of the base steel sheet of the hot-dip galvanized steel sheet according to the embodiment of the present invention are as follows.

(Microstructure)

There is explained a microstructure of the base steel sheet of the hot-dip galvanized steel sheet according to the embodiment of the present invention. The properties of the steel material change according to the microstructure, but when the microstructure is quantified, it is unrealistic to quantify and define the microstructure over the entire region of the steel material. Therefore, in the present invention, a microstructure in a range of ⅛ thickness to ⅜ thickness of which center is a ¼ thickness from the surface of the base steel sheet, which indicates a typical microstructure of the steel material, is quantified and defined. It is impossible to say that the microstructure in a sheet thickness middle portion is a microstructure representing the steel material because the microstructure changes by strong solidification segregation. It is impossible to say that the microstructure in a portion close to the surface layer of the steel sheet is a microstructure representing the steel material because the microstructure changes by a local temperature change or reaction with the outside air.

The microstructure in the base steel sheet of the hot-dip galvanized steel sheet according to the embodiment of the present invention is that, in a range of ⅛ thickness to ⅜ thickness of which center is a ¼ thickness from the surface of the base steel sheet, a volume fraction of a ferrite phase (to be referred to as ferrite, hereinafter) is less than 50%, a volume fraction of the total of a hard structure composed of one or more of a bainite structure (to be referred to as bainite, hereinafter), a bainitic ferrite phase (to be referred to as bainitic ferrite, hereinafter), a fresh martensite phase (to be referred to as fresh martensite, hereafter), and a tempered martensite phase (to be referred to as tempered martensite, hereafter) is 50% or more, a volume fraction of a retained austenite phase (to be referred to as retained austenite, hereafter) is 0% to 8% (including 0%), and a volume fraction of the total of a pearlite phase (to be referred to as pearlite, hereafter) and a coarse cementite phase (to be referred to as cementite, hereafter) is 0% to 8% (including 0%).

"Ferrite"

The ferrite is a structure that has excellent ductility. However, the ferrite is soft, to thus be low in strength, failing to obtain a hot-dip galvanized steel sheet having sufficient stretch flange formability when the volume fraction of the ferrite is set to 50% or more. Therefore, the volume fraction of the ferrite is set to less than 50%. In order to increase stretch flangeability, the volume fraction of the ferrite is preferably set to 45% or less and further preferably set to 40% or less. Even when the lower limit of the volume fraction of the ferrite is not particularly determined, the effects of this embodiment are exhibited and the volume fraction may be 0%. For increasing ductility, the fraction of the ferrite is preferably 5% or more and further preferably 10% or more.

"Retained Austenite"

The retained austenite is a structure for increasing a balance between the strength and the ductility of the hot-dip galvanized steel sheet. On the other hand, the retained austenite is transformed into hard martensite as it deforms and this hard martensite works as a starting point of breakage, and thus stretch flangeability deteriorates, resulting in that the upper limit of the volume fraction of the retained austenite is set to 8%. From the viewpoint of formability of the hot-dip galvanized steel sheet, a smaller volume fraction of the retained austenite is more preferable, and it is preferably set to 5% or less and further preferably set to 0% to 3% (including 0%). A smaller volume fraction of the retained austenite of the hot-dip galvanized steel sheet is more preferable and the volume fraction may be 0%.

"Hard Structure"

In order to increase the maximum tensile strength and the stretch flangeability of the hot-dip galvanized steel sheet, it is necessary to set the volume fraction of the hard structure composed of one or more of the bainite, the bainitic ferrite, the fresh martensite, and the tempered martensite to 50% or more. In order to increase the stretch flangeability of the steel sheet, the volume fraction of the hard structure is preferably set to 58% or more and further preferably set to 65% or more. On the other hand, even when the upper limit of the volume fraction of the hard structure is not particularly determined, the effects of this embodiment are exhibited, and the volume fraction may be 100%. For reducing a yield stress and increasing shape fixability, the volume fraction of the hard structure is preferably 93% or less and further preferably 85% or less.

"Bainitic Ferrite and Bainite"

The bainitic ferrite and the bainite each are a structure excellent in a balance between the strength and the formability of the hot-dip galvanized steel sheet, and the volume fraction of the bainitic ferrite and the bainite may be 100% in total. In addition, the bainitic ferrite and the bainite are microstructures that have an intermediate strength between soft ferrite and hard martensite and an intermediate strength between tempered martensite and retained austenite, and from the viewpoint of stretch flangeability, 5% or more of them is preferably contained and 10% or more of them is further preferably contained. On the other hand, when the volume fraction of the bainitic ferrite and/or the bainite exceeds 90%, the yield stress increases excessively, giving rise to a concern about deterioration in shape fixability, and thus it is not preferable.

"Tempered Martensite"

The volume fraction of the tempered martensite is preferably set to 5% or more from the viewpoint of a tensile strength of the hot-dip galvanized steel sheet. Further, the tempered martensite is a structure that greatly improves a tensile strength and the volume fraction may be 100%. On the other hand, when the volume fraction of the tempered martensite contained in the structure of the steel sheet exceeds 90%, the yield stress increases excessively, giving rise to a concern about deterioration in shape fixability, and thus the volume fraction of the tempered martensite is preferably set to 90% or less.

"Fresh Martensite"

The fresh martensite increases the tensile strength of the hot-dip galvanized steel sheet greatly, but becomes a starting point of breakage to make stretch flangeability deteriorate, and thus 30% or less by volume fraction is preferably contained in the structure of the steel sheet. In order to increase hole expandability in particular, the volume fraction of the fresh martensite is more preferably set to 20% or less and further preferably set to 10% or less.

"Other Microstructures"

Structures other than the above, such as pearlite and/or coarse cementite, may be contained in the steel sheet structure of the hot-dip galvanized steel sheet according to the embodiment of the present invention. However, ductility deteriorates when the content of the pearlite and/or the coarse cementite increases in the steel sheet structure of the hot-dip galvanized steel sheet. From this, the volume fraction of the pearlite and/or the coarse cementite contained in the structure of the steel sheet is set to 8% or less in total. The volume fraction of the pearlite and/or the coarse cementite is preferably 5% or less in total.

Further, in the steel sheet structure of the hot-dip galvanized steel sheet according to the embodiment of the present invention, the volume fraction of the retained austenite is limited 0% to to 3% (including 0%) in a surface layer portion starting from an interface between a plating layer and the base steel sheet (base iron) to 20 μm in depth in the thickness direction of the steel sheet, and at the same time, a volume fraction "V1" of the aforementioned hard structure in the aforementioned surface layer portion is in a range of 0.10 times or more to 0.90 times or less of a volume fraction "V2" of the aforementioned hard structure in a range of ⅛ thickness to ⅜ thickness of which center is a ¼ thickness from the surface of the steel sheet.

"Retained Austenite in the Vicinity of the Interface Between the Plating Layer and the Base Iron"

The retained austenite in the vicinity of the interface between, of the hot-dip galvanized steel sheet, the plating layer and the base steel sheet is transformed into hard martensite as its deforms and works as a starting point of breakage at the time of bending deformation in which a large strain is added to the vicinity of the surface of the hot-dip galvanized steel sheet, and therefore is a structure that contributes to deteriorations in bendability and fatigue resistance. Form this viewpoint, it is necessary to limit the volume fraction of the retained austenite to 0% to 3% (including 0%) in the surface layer portion starting from the interface between the plating layer and the base steel sheet to 20 μm in depth in the thickness direction of the steel sheet. A lower volume fraction of the retained austenite in the surface layer portion is more preferable, and the volume fraction may be 0%.

"Hard Structure in the Vicinity of the Interface Between the Plating Layer and the Base Iron"

The hard structure in the vicinity of the interface between, of the hot-dip galvanized steel sheet, the plating layer and the base steel sheet (base iron) is a structure that increases the strength in the surface layer portion of the hot-dip galvanized steel sheet, greatly improves a fatigue limit strength, and contributes to an improvement in fatigue resistance. From this viewpoint, when the volume fraction of the hard structure in the surface layer portion starting from the interface between the plating layer and the base iron to 20 μm in depth in the thickness direction of the steel sheet is set to "V1" and the total volume fraction in the range of ⅛ thickness to ⅜ thickness of which center is the ¼ thickness from the surface of the steel sheet is set to "V2," V1/V2 being a ratio of these is set to 0.10 or more, and then, it is necessary to sufficiently increase the strength in the surface layer portion of the hot-dip galvanized steel sheet. For sufficiently improving fatigue resistance, V1/V2 is preferably 0.20 or more, more preferably 0.30 or more, and further preferably 0.40 or more. On the other hand, it is also possible to improve bendability by suppressing the fraction of the hard structure in the surface layer portion starting from the interface between the plating layer and the base iron to 20 μm in depth in the thickness direction of the steel sheet to a certain degree and reducing the strength in the vicinity of the surface of the hot-dip galvanized steel sheet to improve local ductility. From this viewpoint, in order to obtain good bendability, V1/V2 is set to 0.90 or less, preferably set to 0.85 or less, and more preferably set to 0.80 or less.

Further, in the surface layer portion starting from the interface between, of the hot-dip galvanized steel sheet according to this embodiment, the plating layer and the base iron to 20 μm in depth in the thickness direction of the steel sheet, a fine oxide containing Si and/or Mn may be contained at a BCC crystal grain boundary and/or within a crystal grain of iron. A fine oxide is first generated inside the steel sheet, which is the surface layer portion, thereby making it possible to suppress occurrence of an oxide containing Si and/or Mn in the surface of the steel sheet to be a starting point of peeling of the plating layer, namely, at the interface between the plating layer and the base steel sheet.

The volume fraction of each of the structures contained in the base steel sheet of the hot-dip galvanized steel sheet according to the embodiment of the present invention can be measured by the following method, for example.

The volume fraction of each of the ferrite, the bainitic ferrite, the bainite, the tempered martensite, the fresh martensite, the pearlite, and the coarse cementite contained in the steel sheet structure of the hot-dip galvanized steel sheet of the present invention can be measured by the following method. First, a sample with a sheet thickness cross section parallel to the rolling direction of the steel sheet set as an observation surface is collected, and the observation surface is polished and etched with nital. Then, the range of ⅛ thickness to ⅜ thickness of which center is ¼ of the sheet thickness and the surface layer portion starting from the interface between the plating layer and the base steel sheet (base iron) to 20 μm in depth in the thickness direction of the steel sheet are each observed with a field emission scanning electron microscope (FE-SEM) to measure area fractions and these area fractions can be regarded as the volume fractions. However, when the plating layer is removed by the nital etching, the surface of the sample may be regarded as the interface between the plating layer and the base iron.

The volume fraction of the retained austenite contained in the steel sheet structure of the hot-dip galvanized steel sheet in this embodiment is evaluated by performing a high-resolution crystal orientation analysis by an EBSD (Electron Bach-scattering Diffraction) method using a FE-SEM. First, a sheet thickness cross section parallel to the rolling direction is subjected to mirror polishing, in each of the range of ⅛ thickness to ⅜ thickness of which center is the ¼ thickness from the surface of the base steel sheet and the surface layer portion starting from the interface between the plating layer and the base iron to 20 μm in depth in the thickness direction of the steel sheet, crystal orientations are measured in a region of 10000 μm$^2$ or more in total with a measurement step set to 0.15 μm or less. Then, each measurement point is determined whether it is iron in BCC (body-centered cubic structure) or iron in FCC (face-centered cubic structure), the point determined as FCC iron is set as the retained austenite, an area fraction of the retained austenite is measured, and this area fraction can be regarded as the volume fraction. The area fraction becomes equivalent to the volume fraction when a sufficient broad region is measured, and thus in the above case, the area fraction of the retained austenite can be regarded as the volume fraction by measuring crystal orientations in a region of 10000 μm$^2$ or more in total.

As illustrated in FIG. 1, the hot-dip galvanized steel sheet in this embodiment has a Fe—Al alloy layer 30 at an interface between a hot-dip galvanizing layer 10 and a base steel sheet 20 and has a fine-grain layer 40 and a decarburized layer 50 to be described below in the base steel sheet 20.

The fine-grain layer and the decarburized layer each are a layer to be generated by a decarburization reaction progressing under the condition that the atmosphere is controlled to a specific atmosphere in a specific temperature zone in an annealing step as described later. Therefore, constituent phases in the fine-grain layer and the decarburized layer each are a structure mainly composed of a ferrite phase 60 substantially except for oxides and inclusion particles. Concretely, it indicates a layer in which the volume fraction of the ferrite phase is 70% or more and the remaining structure is a mixed structure composed of one or two or more of an austenite phase, bainite, a martensite phase, and pearlite.

As for the definition of the fine-grain layer, it is defined that the fine-grain layer is present when the average grain diameter of the ferrite phase in the outermost layer of the base steel sheet is ½ or less of the average grain diameter of the ferrite phase in the decarburized layer. The boundary at which the average grain diameter of the ferrite phase in the fine-grain layer is greater than ½ of the average grain diameter of the ferrite phase in the decarburized layer is defined as a boundary between the fine-grain layer and the decarburized layer.

The fine-grain layer is in direct contact with the aforementioned Fe—Al alloy layer. The average thickness of the fine-grain layer is 0.1 μm to 5.0 μm, the average grain diameter of the ferrite phase in the fine-grain layer is 0.1 to 3.0 μm, an oxide of one or more of Si and Mn is contained in the fine-grain layer, and the maximum diameter of the oxide is 0.01 μm to 0.4 μm.

The average thickness of the fine-grain layer is 0.1 μm to 5.0 μm. When the average thickness of the fine-grain layer is less than 0.1 μm, it is impossible to obtain an effect of suppressing crack occurrence and extension, resulting in failing to obtain an effect of improving plating adhesion. When the average thickness is greater than 5.0 μm, alloying of the plating layer progresses, a Fe content in the plating layer increases, and plating adhesion decreases. Here, alloying of the plating layer indicates that Fe atoms are diffused in the plating layer and a Zn—Fe alloy is generated. The preferable average thickness of the fine-grain layer is 0.2 μm to 4.0 μm and it is further preferably 0.3 μm to 3.0 μm.

The difference between the maximum thickness and the minimum thickness of the aforementioned fine-grain layer in the width direction of the steel sheet is preferably within 2.0 μm. Here, the maximum thickness and the minimum thickness of the aforementioned fine-grain layer in the width direction of the steel sheet indicate the maximum thickness and the minimum thickness respectively among thicknesses obtained when the thickness of the fine-grain layer is measured totally at eight places, that is, positions 50 mm distant from both edges and positions dividing a gap between these 50 mm-distant positions into seven equal parts. As the thickness of the fine-grain layer is thicker, alloying of the plating layer is more likely to progress, and thus a larger thickness difference of the fine-grain layer in the width direction of the steel sheet causes uneven alloying, resulting in adversely affecting plating adhesion and plating appearance uniformity in some cases. From the viewpoints of plating adhesion and plating appearance uniformity, the difference between the maximum thickness and the minimum thickness of the aforementioned fine-grain layer in the width direction of the steel sheet is preferably 1.5 μm or less and further preferably 1.0 μm or less.

The average grain diameter of the ferrite phase in the fine-grain layer is 0.1 μm to 3.0 μm. When the average grain diameter of the ferrite phase is less than 0.1 μm, it is impossible to obtain the effect of suppressing crack occurrence and extension, resulting in failing to obtain the effect of improving plating adhesion. When the average grain diameter of the ferrite phase is greater than 3.0 μm, it is impossible to obtain the effect of improving plating adhesion. The preferable average grain diameter of the ferrite phase is 0.1 μm to 2.0 μm.

As the oxide of one or more of Si and Mn contained in the fine-grain layer, for example, there can be cited one or two or more selected from among $SiO_2$, $Mn_2SiO_4$, $MnSiO_3$, $Fe_2SiO_4$, $FeSiO_3$, and MnO.

The maximum diameter of the oxide of one or more of Si and Mn contained in the fine-grain layer is 0.01 μm to 0.4 μm. This oxide is, as described later, formed inside the base steel sheet in a specific temperature zone at the time of annealing, and by particles of this oxide, the growth of crystals of the ferrite phase in the surface layer of the base steel sheet is suppressed and the fine-grain layer is formed. When the maximum diameter of the oxide is less than 0.01 μm, the fine-grain layer is not formed sufficiently and plating adhesion decreases. When the maximum diameter of the oxide is greater than 0.4 μm, the ferrite phase becomes coarse, the fine-grain layer is not formed sufficiently, and the oxide itself becomes a starting point of plating peeling, and thus plating adhesion decreases. The preferable range of the maximum diameter of the oxide is 0.05 μm to 0.2 μm.

The average thickness of the fine-grain layer and the average grain diameter of the ferrite phase in the fine-grain layer are measured by the following method. A sample with a sheet thickness cross section parallel to the rolling direction of the base steel sheet set as an observation surface is collected from the hot-dip galvanized steel sheet. The observation surface of the sample is processed by a CP (Cross section polisher) device and a reflected electron image in FE-SEM (Field Emission Scanning Electron Microscopy) is observed at a magnification of 5000 times and the measurement is performed.

The maximum diameter of the oxide of one or more of Si and Mn contained in the fine-grain layer is measured by the following method. Samples with a sheet thickness cross section parallel to the rolling direction of the base steel sheet set as an observation surface are collected from the hot-dip galvanized steel sheet. The observation surface of each of the samples is processed with FIB (Focused Ion Beam) to fabricate thin film samples. Thereafter, each of the thin film samples is observed with FE-TEM (Field Emission Transmission Electron Microscopy) at a magnification of 30000 times. Each thin film sample is observed in five visual fields and the maximum value of the diameter of the oxide measured in all the visual fields is set as the maximum diameter of the oxide in the thin film sample.

(Fe—Al alloy layer)

In the embodiment of the present invention, the Fe—Al alloy layer is formed at the interface between the plating layer and the steel sheet. Forming the Fe—Al alloy layer makes it possible to suppress alloying of the plating layer and suppress the decrease in plating adhesion. Additionally, it is also possible to suppress occurrence of uneven appearance caused by uneven alloying. The uneven appearance caused by uneven alloying is more likely to occur in a hot-dip galvanized steel sheet that does not undergo an alloying treatment than in a galvannealed steel sheet that has undergone an alloying treatment after the hot-dip galvanizing treatment. The thickness of the Fe—Al alloy layer is set to 0.1 μm to 2.0 μm. When the thickness is less than 0.1 μm, plating adhesion and appearance decrease in some cases, and when the thickness is greater than 2.0 μm, plating adhesion and weldability decrease in some cases. It is preferably 0.1 μm to 1.0 μm.

The difference between the maximum thickness and the minimum thickness of the aforementioned Fe—Al alloy layer in the width direction of the steel sheet is set to be within 0.5 μm. Here, the maximum thickness and the minimum thickness of the aforementioned Fe—Al alloy layer in the width direction of the steel sheet indicate the maximum thickness and the minimum thickness respectively among thicknesses obtained when the thickness of the Fe—Al alloy layer is measured totally at eight places, that is, positions 50 mm distant from both edges of the Fe—Al alloy layer and positions dividing a gap between these 50 mm-distant positions into seven equal parts. As the thickness of the Fe—Al alloy layer is thinner, alloying of the plating layer (generation of a Zn—Fe alloy) is more likely to progress, and thus a large thickness difference of the Fe—Al alloy layer in the width direction of the steel sheet causes uneven alloying, resulting in adversely affecting plating adhesion and plating appearance uniformity in some cases. From the viewpoints of plating adhesion and plating appearance uniformity, the difference between the maximum thickness and the minimum thickness of the aforementioned Fe—Al alloy layer in the width direction of the steel sheet is preferably 0.4 µm or less and further preferably 0.3 µm or less.

(Plating Layer)

In the hot-dip galvanizing layer in the embodiment of the present invention, a Fe content is more than 0% and 3.0% or less and an Al content is more than 0% and 1.0% or less. Furthermore, the hot-dip galvanizing layer may be one containing one or two or more of Ag, B, Be, Bi, Ca, Cd, Co, Cr, Cs, Cu, Ge, Hf, I, K, La, Li, Mg, Mn, Mo, Na, Nb, Ni, Pb, Rb, Sb, Si, Sn, Sr, Ta, Ti, V, W, Zr, and REM or one in which one or two or more of these elements are mixed. Even when the hot-dip galvanizing layer may be one containing one or two or more of the above-described elements or one in which one or two or more of the above-described elements are mixed as above, the effects of the present invention are not impaired and there is sometimes a preferable case such that corrosion resistance and workability are improved depending on the content of the element.

Further, in this embodiment, the hot-dip galvanizing layer may contain columnar crystals made of a $\zeta$ phase ($FeZn_{13}$), but a coverage ratio of the $\zeta$ phase at the entire interface between the plating layer and the base steel sheet is preferably less than 20% from the viewpoint of plating adhesion.

Further, the deposition amount of the hot-dip galvanizing layer on one side of the base steel sheet is preferably 10 g/m$^2$ or more and 100 g/m$^2$ or less.

[Fe Content in the Hot-Dip Galvanizing Layer: More than 0% and 3.0% or Less]

The Fe content in the hot-dip galvanizing layer is more than 0% and 3.0% or less. The Fe content, which is 0%, is difficult to be manufactured substantially. When the Fe content exceeds 3.0%, plating adhesion decreases. When the Fe content is less than 0.3%, plating adhesion sometimes decreases, and thus, from the viewpoint of securing plating adhesion, a preferable range of the Fe content is 0.3% to 2.5% and it is further preferably 0.5% to 2.0%.

[Al Content in the Hot-Dip Galvanizing Layer: More than 0% and 1.0% or Less]

The Al content in the hot-dip galvanizing layer is more than 0% and 1.0% or less. When Al is not contained in a plating bath, or its content is small excessively, alloying of the plating layer progresses and plating adhesion decreases, and thus the Al content in the plating layer is preferably set to 0.1% or more. When the Al content exceeds 1.0%, plating adhesion decreases. From the viewpoint of securing plating adhesion, a preferable range of the Al content is 0.1% to 0.8%, and it is further preferably 0.2% to 0.5%.

[Deposition Amount of the Hot-Dip Galvanizing: 10 g/m$^2$ to 100 g/m$^2$]

When the deposition amount of the hot-dip galvanizing layer on one side of the base steel sheet is small, there is a risk that sufficient corrosion resistance cannot be obtained. Therefore, the deposition amount of the plating layer on one side of the base steel sheet is preferably set to 10 g/m$^2$ or more. From the viewpoint of corrosion resistance, the deposition amount is more preferably 20 g/m$^2$ or more and further preferably 30 g/m$^2$ or more. On the other hand, when the deposition amount is large, electrodes are greatly worn out at the time of spot welding and a reduction in the diameter of a molten nugget and deterioration in welded joint strength may occur when the welding is continuously performed. Therefore, the deposition amount of the plating layer is preferably set to 100 g/m$^2$ or less. From the viewpoint of continuous weldability, the deposition amount is more preferably 93 g/m$^2$ or less and further preferably 85 g/m$^2$ or less.

(Manufacturing Method of the Hot-Dip Galvanized Steel Sheet)

Next, there is explained in detail a method of manufacturing the hot-dip galvanized steel sheet according to the embodiment of the present invention.

The manufacturing method of the hot-dip galvanized steel sheet according to this embodiment includes: a hot rolling step, that is a step of heating a slab having the above-described chemical components to 1080° C. or more and performing hot rolling thereon with a rolling completion temperature falling within a range of 850° C. to 980° C. to obtain a hot-rolled steel sheet, and then coiling the hot-rolled steel sheet as a coil and controls the temperature of the hot-rolled steel sheet in a cooling process down to 300° C. after the hot rolling so as to satisfy Formula (1); after acid pickling after the hot rolling step, a cold rolling step that performs cold rolling with the total reduction ratio set to 85% or less; an annealing step that heats the steel sheet that has undergone the cold rolling step with the maximum heating temperature falling within a temperature zone of (Ac3-60°) C. or more and 750° C. or more at an average heating rate from 600° C. to 750° C. set to 1.0° C./s or more and then cools the steel sheet at an average cooling rate from 720° C. to 650° C. set to 2.5° C./second or more and at an average cooling rate from 650° C. to 500° C. set to 5.0° C./second or more; after the annealing step, a plating step that immerses the steel sheet in a plating bath under the plating conditions of a plating bath temperature set to 440° C. to 470° C., a steel sheet temperature when entering the plating bath set to 430° C. to 480° C., and the effective Al amount in the plating bath set to 0.180 to 0.250 mass % to thereby perform hot-dip galvanizing on the surface of the steel sheet and form the plating layer; and after the plating step, a working step that cools the steel sheet down to 100° C. or less and then performs bending-unbending deformation two times or more in total using a roll with a diameter of 50 mm to 800 mm.

Hereinafter, the respective manufacturing steps are explained in detail.

In order to manufacture the hot-dip galvanized steel sheet according to the embodiment of the present invention, the base steel sheet is first manufactured.

The base steel sheet is manufactured by casting a slab containing alloy elements according to properties, performing hot rolling, and performing cold rolling.

Hereinafter, the respective manufacturing steps are explained in detail.

"Casting Step"

First, the slab to be subjected to hot rolling is cast. The chemical components (composition) of the slab are preferably the above-described components. As the slab to be subjected to hot rolling, a continuously cast slab or one manufactured by a thin slab caster or the like can be used.

"Hot Rolling Step"

In the hot rolling step, a heating temperature of the slab is preferably set to 1080° C. or more in order to suppress anisotropy of a crystal orientation due to casting. The heating temperature of the slab is more preferably set to 1150° C. or more. On the other hand, the upper limit of the heating temperature of the slab is not particularly determined. Heating the slab over 1300° C. requires a large amount of energy application, to thus cause a significant increase in manufacturing cost. Therefore, the heating temperature of the slab is preferably set to 1300° C. or less.

After the slab is heated, hot rolling is performed. When a completion temperature of the hot rolling (rolling completion temperature) is less than 850° C., a rolling reaction force increases, resulting in difficulty in obtaining a specified sheet thickness stably. Therefore, the completion temperature of the hot rolling is preferably set to 850° C. or more and more preferably set to 870° C. or more. On the other hand, setting the completion temperature of the hot rolling to more than 980° C. requires a device to heat the steel sheet in a step from the time when the slab heating is finished to the time when the hot rolling is completed, and a high cost is required. Therefore, the completion temperature of the hot rolling is set to 980° C. or less and more preferably set to 950° C. or less.

Then, the hot-rolled steel sheet that has undergone the hot rolling is coiled as a coil. An average cooling rate in a cooling process from the hot rolling to the coiling is preferably set to 10° C./second or more. This is because promoting transformation at a lower temperature makes the grain diameter of the hot-rolled steel sheet fine and makes the effective crystal grain diameter of the base steel sheet that has undergone cold rolling and annealing fine.

A coiling temperature of the hot-rolled steel sheet is preferably set to 450° C. or more and 650° C. or less. This is because in the microstructure of the hot-rolled steel sheet, pearlite and/or coarse cementite having a major axis of 1 μm or more are/is dispersedly generated to localize strain introduced by cold rolling. Thereby, reverse transformation to austenite in various crystal orientations is caused in the annealing step, thereby being capable of making effective crystal grains of the base steel sheet that has undergone annealing fine. When the coiling temperature is less than 450° C., pearlite and/or coarse cementite are/is not generated in some cases, which is not preferable. On the other hand, when the coiling temperature exceeds 650° C., pearlite and ferrite are each generated in a belt shape long in the rolling direction. Thereby, effective crystal grains of the base steel sheet generated from the ferrite portion after cold rolling and annealing tend to be coarse extended in the rolling direction, which is not preferable.

Further, after the hot-rolled steel sheet is coiled, an internal oxide layer is sometimes formed nonuniformly (to be thicker in a center portion than in edge portions) under a scale layer. When the coiling temperature exceeds 650° C., it becomes prominent. The case where this internal oxide layer is not removed even in a later-described post-step (acid pickling, cold rolling) leads to nonuniform formation of the fine-grain layer and the Fe—Al alloy layer, which may adversely affect plating adhesion and appearance uniformity. Therefore, also from the viewpoints of plating adhesion and appearance uniformity, the coiling temperature is preferably reduced to 650° C. or less.

Here, in order to control the hard structure to have a predetermined volume fraction in the surface of the base steel sheet that has undergone annealing, it is necessary to appropriately decarburize the base steel sheet from the surface in the hot rolling step. Decarburization behavior from the base steel sheet may be controlled by an atmosphere control, but a large scale facility is required and a burden on cost is large. For this reason, in this embodiment, the decarburization behavior is controlled by controlling a cooling rate to control the temperature of the steel sheet, in a section from the time when finish rolling is completed (the hot rolling is completed) to the time when the temperature reaches 300° C.

Temperature control of the base steel sheet is performed in a range in which the temperature becomes a temperature Ae3*° C. or less at which a BCC phase of iron is stabilized in the surface of the base steel sheet, in the section from the time when the finish rolling is completed to the time when the temperature reaches 300° C. This is because decarburization from the BCC phase of iron progresses faster than decarburization from a FCC phase being a stable phase at a high temperature. In this embodiment, when the temperature of the base steel sheet is in a temperature range lower than 300° C., a diffusion speed of oxygen is sufficiently slow and it can be considered that a proceeding speed of decarburization does not affect the decarburization behavior, and thus the temperature range in which the temperature control of the base steel sheet in the hot rolling step is performed is set to the section until the temperature reaches 300° C.

Ae3*[° C.] can be found by using the following formula.

Ae3*[° C.]=885+31.7Si−29.3Mn+123.2Al−18.2Cr−40.0Ni−21.0Cu+12.6Mo

In the above-described formula, C, Si, Mn, Al, Cr, Ni, Cu, and Mo represent the contents of these elements [mass %] respectively.

Further, the decarburization behavior of the steel sheet is controlled in a first period from the time when the finish rolling is completed to the time when the steel sheet is coiled into a coil and in a second period from the time when the steel sheet is coiled into a coil to the time when the temperature reaches a room temperature in a divided manner. This is because decarburization progresses under the atmosphere in the first period, while in the second period, decarburization progresses under the condition that the outside air hardly enters because the steel sheet is coiled into a coil to thereby cause close contact of the steel sheet, and thus the decarburization proceeding speed differs greatly between the both periods.

Concretely, in order to decarburize the surface layer portion of the steel sheet appropriately, the temperature of the steel sheet is controlled to fall within a range satisfying the following formula (1) in the cooling process from the time when the finish rolling is completed to the time when the temperature reaches 300° C. The formula (1) is a formula relating to the degree of progress of the decarburization behavior, and indicates that as the value of the formula (1) is larger, the decarburization progresses.

Regarding respective terms in the formula (1), t [second] represents an elapsed time from the finish rolling completion, t1 [second] represents an elapsed time from the finish rolling completion to the temperature reaching the Ae3* temperature, t2 [second] represents an elapsed time from the finish rolling completion to coiling into a coil, and t3 [second] represents an elapsed time from the finish rolling completion to the temperature of the steel sheet reaching 300° C. Further, T(t) [° C.] represents the temperature of the steel sheet, and $W_{si}$ [mass %] and $W_{Mn}$ [mass %] represent the average contents of the elements of Si and Mn respectively in the entire steel sheet. Further, terms of α, β, γ, and δ are constant terms, and are $8.35×10^8$, $2.20×10^4$, $1.73×10^{10}$, $2.64×10^4$ respectively.

[Mathematical formula 1]

$$0.8 \leq \left[ \int_{t1}^{t2} \alpha \cdot \exp\left(-\frac{\beta}{T(t)+273}\right) \cdot t \, dt + \int_{t2}^{t3} \gamma \cdot W_{Si}^{2.5} \cdot W_{Mn}^{0.5} \cdot \exp\left(-\frac{\delta}{T(t)+273}\right) \cdot t \, dt \right]^{0.5} \leq 20.0 \quad \text{Formula (1)}$$

In the above-described formula (1), the first integral term in parentheses is a term relating to the degree of progress of decarburization during cooling in the first period, and the second integral term in parentheses is a term relating to the degree of progress of decarburization during cooling in the second period. In either term, the decarburization progresses as the temperature of the base steel sheet is higher and a retention time is longer.

Particularly, in the second period, oxygen that is an element for promoting decarburization hardly exists in the atmosphere and the decarburization progresses by oxygen that is attracted by Si and Mn in the steel from the scale layer in the surface layer, and thus the second integral term includes the influence of the contents of Si and Mn, and the value of the formula (1) increases as the contents of Si and Mn in the steel are larger, which indicates that the decarburization progresses.

When the value of the above-described formula (1) becomes less than 0.8 in the cooling process after the finish rolling completion, the surface layer portion of the base steel sheet is hardly decarburized, V1/V2, which is the ratio of the volume fraction V1 of the hard structure in the surface layer portion to the volume fraction V2 of the hard structure of which center is the ¼ thickness from the surface of the base steel sheet, exceeds 0.90, and bendability deteriorates, and thus the cooling is performed so that the value of the above-described formula (1) becomes 0.8 or more. From this viewpoint, the cooling is preferably performed so that the value of the above-described formula (1) becomes 1.0 or more, and the value further preferably becomes 1.3 or more. On the other hand, when the value of the above-described formula (1) exceeds 20.0, the surface layer portion of the steel sheet is decarburized excessively, V1/V2 becomes less than 0.30, and the fatigue resistance of the steel sheet deteriorates significantly, and thus the cooling is performed so that the value of the above-described formula (1) becomes 20.0 or less. From this viewpoint, the cooling is preferably performed so that the value of the above-described formula (1) becomes 15.0 or less, and the value further preferably becomes 10.0 or less.

Then, acid pickling of the hot-rolled steel sheet manufactured in this manner is performed. The acid pickling aims at removing oxides on the surface of the hot-rolled steel sheet, and thus is important for improving the platability of the base steel sheet. The acid pickling may be performed only once or a plurality of times separately. The internal oxide layer generated under the scale layer is removed as much as possible by intensifying the acid pickling, which is more preferable from the viewpoints of uniform formation of the fine-grain layer and the Fe—Al alloy layer and securing uniform appearance obtained by the uniform formation. Acid pickling conditions are not particularly limited as long as the internal oxide layer is removed, and from the viewpoint of acid pickling efficiency and economic efficiency, for example, using hydrochloric acid is preferable. As the condition of removing the internal oxide layer, for example, the concentration of hydrochloric acid is 5 mass % or more as hydrogen chloride, an acid pickling temperature is 80° C. or more, and an acid pickling time is 30 seconds or more, which are cited as recommended conditions.

"Cold Rolling Step"

Next, cold rolling is performed on the hot-rolled steel sheet that has undergone the acid pickling, to obtain a cold-rolled steel sheet.

In the cold rolling, when the total reduction ratio exceeds 85%, the ductility of the base steel sheet is lost to increase a risk of the steel sheet being fractured during the cold rolling. Therefore, the total reduction ratio is preferably set to 85% or less. From this viewpoint, the total reduction ratio is more preferably set to 75% or less and further preferably set to 70% or less. The lower limit of the total reduction ratio in the cold rolling step is not particularly determined. When the total reduction ratio is less than 0.05%, the shape of the base steel sheet becomes nonuniform and plating does not adhere uniformly, resulting in that appearance is impaired. Therefore, it is preferably set to 0.05% or more and further preferably set to 0.10% or more. The cold rolling is preferably performed in a plurality of passes, but any number of passes of the cold rolling and any distribution of the reduction ratio to each pass are applicable.

Further, when the total reduction ratio in the cold rolling is within a range of more than 10% and less than 20%, recrystallization does not progress sufficiently in the following annealing step, coarse crystal grains in which malleability is lost by including a large amount of dislocations remain near the surface layer, and bendability and fatigue resistance deteriorate in some cases. In order to avoid this, it is effective to make the malleability of crystal grains remain by reducing the total reduction ratio and reducing accumulation of dislocations to the crystal grains. Alternatively, it is also effective to turn a processed structure into a structure of recrystallized crystal grains having a small amount of accumulation of dislocations therein by increasing the total reduction ratio and making the recrystallization sufficiently progress in the annealing step. From the viewpoint of reducing the accumulation of dislocations to the crystal grains, the total reduction ratio in the cold rolling step is preferably set to 10% or less and further preferably set to 5.0% or less. On the other hand, in order to make the recrystallization in the annealing step sufficiently progress, the total reduction ratio is preferably set to 20% or more and further preferably set to 30% or more.

"Annealing Step"

In the embodiment of the present invention, annealing is performed on the cold-rolled steel sheet. In the embodiment of the present invention, a continuous annealing-plating line having a preheating zone, a soaking zone, and a plating zone is preferably used. Then, while performing the annealing step, the steel sheet is allowed to pass through the preheating zone and the soaking zone, the annealing step is finished by the steel sheet reaching the plating zone, and the plating step is performed in the plating zone preferably.

As described above, in the case of using the continuous annealing-plating line in the annealing step and the plating step, for example, the following method is preferably used.

Particularly, the atmosphere in the preheating zone, control of a heating method, and control of the atmosphere in the soaking zone are important for securing plating adhesion and appearance uniformity while appropriately and uniformly generating the fine-grain layer and the Fe—Al alloy layer.

The steel sheet is allowed to pass through the preheating zone using a preheating burner with an air ratio set to 0.7 to 1.0 under the atmosphere where $\text{Log}(P(H_2O)/P(H_2))$ being a Log value of a ratio of a water vapor partial pressure $P(H_2O)$ to a hydrogen partial pressure $P(H_2)$ is controlled to −1.7 to −0.2 while heating to the steel sheet temperature of 400° C. to 800° C.

Adjusting the ratio of the water vapor partial pressure $P(H_2O)$ to the hydrogen partial pressure $P(H_2)$ in the preheating zone affects uniform precipitation of a Fe—Al alloy phase at the interface in the width direction in the subsequent hot-dip galvanizing and a surface property of the steel sheet before the plating.

This means that by adjusting the air ratio in the preheating zone, generation of an oxide film of a strong deoxidizing element such as Si on the surface of the steel sheet is suppressed. In addition to this, by adjusting the ratio of the water vapor partial pressure $P(H_2O)$ to the hydrogen partial pressure $P(H_2)$, excessive decarburization on the surface of the steel sheet is suppressed. Thereby, it is designed to suppress an excessive Fe—Zn alloying reaction at grain boundaries of the surface of the steel sheet and cause a Fe—Al alloying reaction to occur selectively in the subsequent plating step. The Fe—Al alloying reaction occurs selectively, thereby making it possible to promote formation of a uniform Fe—Al alloy layer and obtain excellent plating adhesion and appearance uniformity. When $Log(P(H_2O)/P(H_2))$ exceeds −0.2, Fe—Zn alloying becomes likely to occur in the subsequent plating step and the Fe concentration in the plating increases. Thereby, plating adhesion decreases and uneven appearance also becomes likely to occur. On the other hand, when $Log(P(H_2O)/P(H_2))$ is less than −1.7, a portion with a high carbon concentration is formed in the surface of the steel sheet and the fine-grain layer is not formed, and thus plating adhesion decreases.

"Air ratio" is a ratio of the volume of the air contained in a mixed gas of a unit volume and the volume of the air theoretically necessary for the complete combustion of a fuel gas contained in the mixed gas of the unit volume, and is expressed by the following formula.

Air ratio=[the volume (m³) of the air contained in the mixed gas of the unit volume]/[the volume (m³) of the air theoretically necessary for the complete combustion of the fuel gas contained in the mixed gas of the unit volume]

When the above-described air ratio is too large, which is more than 1.0, a Fe oxide film is excessively generated in the surface layer portion of the steel sheet, the decarburized layer after the annealing is enlarged, and the fine-grain layer is also generated excessively. Thereby, the alloying of the plating progresses excessively, and plating adhesion, chipping resistance, and powdering resistance decrease. Therefore, the above-described air ratio is preferably 1.0 or less, and more preferably 0.9 or less. When the air ratio is too small, which is less than 0.7, the fine-grain layer is not formed and plating adhesion decreases. Therefore, the above-described air ratio is set to 0.7 or more and is preferably 0.8 or more.

When the temperature of the steel sheet passing through the preheating zone is less than 400° C., the fine-grain layer cannot be formed sufficiently. Therefore, the temperature of the steel sheet passing through the preheating zone is set to 400° C. or more and preferably set to 600° C. or more. When the temperature of the steel sheet passing through the preheating zone is a high temperature that is more than 800° C., on the other hand, a coarse oxide containing Si and Mn is generated in the surface of the steel sheet and plating adhesion decreases. Therefore, the temperature of the steel sheet passing through the preheating zone is set to 800° C. or less and preferably set to 750° C. or less.

When a heating rate in the preheating zone is slow, internal oxidation progresses, resulting in the generation of a coarse oxide inside the steel sheet. In particular, the heating rate at 600° C. to 750° C. is important, and to avoid the excessive decarburization of the surface layer portion of the steel sheet and suppress the generation of the coarse oxide, an average heating rate at 600° C. to 750° C. needs to be set to 1.0° C./second or more. When the average heating rate at 600° C. to 750° C. is less than 1.0° C./second, the coarse oxide is generated in the fine-grain layer and plating adhesion and powdering resistance decrease. In order to avoid the excessive decarburization of the surface layer portion of the steel sheet and the generation of the coarse oxide, the average heating rate at 600° C. to 750° C. is preferably set to 1.5° C./second or more and more preferably set to 2.0° C./second or more. The average heating rate at 600° C. to 750° C. is preferably set to 50° C./second or less while securing a treatment time in the preheating zone. The average heating rate of 50° C./second or less facilitates forming a uniform fine-grain layer, making it possible to obtain the plating layer excellent in plating adhesion and appearance uniformity.

The maximum heating temperature in the annealing step is an important factor for controlling the volume fraction of the microstructure involved in the formability of the steel sheet to a predetermined range. When the maximum heating temperature is low, the coarse iron-based carbide is left undissolved in the steel and formability deteriorates. In order to sufficiently solid-dissolve the iron-based carbide to enhance formability, the maximum heating temperature is set to (Ac3 point-60) ° C. or more, preferably set to (Ac3 point-45°) C. or more, and further preferably set to (Ac3 point-35°) C. or more. The upper limit of the maximum heating temperature is not particularly determined, but from the viewpoint of plating adhesion, for reducing the oxide in the surface of the base iron, a lower maximum heating temperature is more preferable. From this viewpoint, the maximum heating temperature is preferably set to 950° C. or less and more preferably set to 900° C. or less.

The Ac3 point of the steel sheet is a start point and a completion point of austenite reverse transformation and concretely, is obtained by cutting out a small piece from the steel sheet having undergone the hot rolling, heating the small piece up to 1200° C. at 10° C./second, and measuring cubical expansion during this period.

The maximum heating temperature (750° C. or more) in the annealing step is reached in the soaking zone. In the atmosphere in this soaking zone, $Log(P(H_2O)/P(H_2))$ is controlled to −1.7 to −0.2. When $Log(P(H_2O)/P(H_2))$ is less than −1.7, the fine-grain layer is not formed and plating adhesion decreases. When $Log(P(H_2O)/P(H_2))$ exceeds −0.2, the decarburization excessively progresses, resulting in a great reduction in a hard phase in the surface layer of the base steel sheet, and at the same time, a coarse oxide is formed in the fine-grain layer and plating adhesion and powdering resistance decrease.

When $Log(P(H_2O)/P(H_2))$ in the soaking zone is −1.7 to −0.2 as above, oxides of Si and Mn to be a starting point of plating peeling are not formed in the uppermost surface layer, and a fine oxide of Si and/or Mn whose maximum diameter is 0.05 μm to 0.4 μm is formed inside the surface layer of the steel sheet. The fine oxide of Si and/or Mn suppresses the growth of Fe recrystallization during the annealing. Further, since water vapor in the annealing atmosphere decarburizes the surface layer of the base steel sheet, the microstructure in the surface layer of the base steel sheet having undergone the annealing becomes ferrite. As a result, in the surface layer of the base steel sheet having undergone the annealing, a fine-grain layer with an average thickness of 0.1 μm to 5.0 μm, in which an average grain diameter of the ferrite phase is 0.1 μm to 3.0 μm, and that contains the oxide of Si and/or Mn whose maximum diameter is 0.01 μm to 0.4 μm is formed.

In cooling before the plating (cooling step before plating), that is, before the steel sheet reaches a plating bath after the maximum heating temperature is reached, in the annealing step, the temperature of the steel sheet is controlled separately in a temperature zone of 720° C. to 650° C. and in a temperature zone of 650° C. to 500° C., thereby making it possible to obtain a predetermined microstructure.

First, in order to suppress generation of the ferrite, the average cooling rate from 720° C. to 650° C. is defined. When the average cooling rate from 720° C. to 650° C. is less than 2.5° C./second, the generation of the ferrite progresses excessively, and thus the average cooling rate from 720° C. to 650° C. is set to 2.5° C./second or more. In order to sufficiently suppress the generation of the ferrite, the average cooling rate from 720° C. to 650° C. is preferably set to 3.5° C./second or more and further preferably set to 4.5° C./second or more. The upper limit of the average cooling rate in the temperature zone of 720° C. to 650° C. is not particularly set, but for obtaining an excessively high average cooling rate, a special cooling facility or a coolant not interfering with the plating step is required, and thus it is not preferable. From this viewpoint, the average cooling rate in the above-described temperature zone is preferably set to 100° C./second or less and more preferably set to 70° C./second or less.

Then, in order to suppress excessive generation of the pearlite and/or the coarse cementite, the cooling rate from 650° C. to 500° C. is defined. When the average cooling rate from 650° C. to 500° C. is less than 5.0° C./second, the pearlite and/or the coarse cementite are/is generated in large amounts, and thus the average cooling rate is set to 5.0° C./second or more. Not containing pearlite and/or coarse cementite in the steel is preferable, and thus in order to sufficiently avoid the generation of these, the average cooling rate is preferably set to 7.5° C./second or more and more preferably set to 10.0° C./second or more. The upper limit of the average cooling rate in the temperature zone of 650° C. to 500° C. is not particularly set, but for obtaining an excessively high average cooling rate, a special cooling facility or a coolant not interfering with the plating step is required, and thus it is not preferable. From this viewpoint, the average cooling rate in the above-described temperature zone is preferably set to 100° C./second or less and more preferably set to 70° C./second or less.

Subsequently to the cooling step before plating, to obtain the tempered martensite, the steel sheet may be retained in a predetermined temperature zone for a predetermined time, during a period from the time when the temperature of the steel sheet reaches 500° C. up to the time when it reaches the plating bath as a martensite transformation treatment. A martensite transformation treatment temperature is set to a martensite transformation start temperature Ms point as the upper limit and set to 50° C. as the lower limit. Further, a martensite transformation treatment time is set to 1 second to 100 seconds. Martensite obtained in this treatment changes into the tempered martensite when the steel sheet enters the high-temperature plating bath in the plating step.

The Ms point is calculated by the following formula.

Ms point[° C.]=541−474C/(1−VF)−15Si−35Mn−17Cr−17Ni+19Al

In the above-described formula, VF indicates the volume fraction of the ferrite, and C, Si, Mn, Cr, Ni, and Al are the contents of these elements [mass %] respectively.

It is difficult to directly measure the volume fraction of the ferrite during the manufacture. Therefore, in order to determine the Ms point in the present invention, a small piece is cut out from the cold-rolled steel sheet that has not yet passed to the continuous annealing line, this small piece is annealed under the same temperature history as that when the cold-rolled steel sheet passes through the continuous annealing line, a volume change of the ferrite in the small piece is measured, and a numerical value calculated using the measurement result is defined as the volume fraction (VF) of the ferrite.

Furthermore, in order to promote the generation of the bainite, the steel sheet may be retained in a predetermined temperature zone for a predetermined time, during a period from the time when the temperature of the steel sheet reaches 500° C. up to the time when it reaches the plating bath as a bainite transformation treatment. When a bainite transformation treatment temperature exceeds 500° C., the generation of the pearlite and/or the coarse cementite progresses, and thus the bainite transformation treatment temperature is set to 500° C. or less. Further, when the bainite transformation treatment temperature falls below 350° C., the transformation does not progress sufficiently, and thus the bainite transformation treatment temperature is set to 350° C. or more. A bainite transformation treatment time is set to 10 seconds or more for sufficient progress of the transformation, and is set to 500 seconds or less for suppression of the generation of the pearlite and/or the coarse cementite. In the case where both the bainite transformation treatment and the martensite transformation treatment are performed after the cooling step before plating, as for the order of operation, the bainite transformation treatment and the martensite transformation treatment are performed.

[Plating Step]

Next, the base steel sheet obtained in this manner is immersed in the plating bath.

The plating bath has a composition in which zinc is the main element and an effective Al amount is 0.180 to 0.250 mass %, the effective Al amount being a value equal to the total Al amount in the plating bath from which the total Fe amount therein is subtracted. When the effective Al amount in the plating bath falls below 0.180%, the Fe—Al alloy layer is not sufficiently formed, and entrance of Fe into the plating layer progresses to impair plating adhesion, and thus the effective Al amount needs to be set to 0.180% or more. From this viewpoint, the effective Al amount in the plating bath is preferably 0.185% or more and further preferably 0.190% or more. On the other hand, when the effective Al amount in the plating bath exceeds 0.250%, the Fe—Al alloy layer at the interface between the base steel sheet and the plating layer is excessively generated and plating adhesion is impaired. From this viewpoint, the effective Al amount in the plating bath needs to be set to 0.250% or less, preferably set to 0.240% or less, and further preferably set to 0.230% or less.

The plating bath may contain one kind or two kinds of element or more of Ag, B, Be, Bi, Ca, Cd, Co, Cr, Cs, Cu, Ge, Hf, I, K, La, Li, Mg, Mn, Mo, Na, Nb, Ni, Pb, Rb, Sb, Si, Sn, Sr, Ta, Ti, V, W, Zr, and REM, and depending on the content of each element, the corrosion resistance and the workability of the hot-dip galvanizing layer are sometimes improved preferably.

Further, the temperature of the plating bath is preferably set to 440° C. to 470° C. When the plating bath temperature is less than 440° C., the viscosity of the plating bath excessively increases, making it difficult to control the thickness of the plating layer to impair the appearance of the hot-dip galvanized steel sheet. Therefore, the temperature of the plating bath is preferably 440° C. or more and further preferably set to 445° C. or more. On the other hand, when the plating bath temperature exceeds 470° C., a large amount of fume is generated, making the safe manufacture difficult. Therefore, the plating bath temperature is preferably 470° C. or less and further preferably set to 460° C. or less.

Further, when the temperature of the steel sheet when the base steel sheet enters the plating bath falls below 430° C., a large quantity of heat needs to be given to the plating bath to stabilize the temperature of the plating bath at 440° C. or more, which is not practical. When the temperature of the steel sheet when the base steel sheet enters the plating bath exceeds 480° C., on the other hand, facilities for removing a large quantity of heat from the plating bath need to be introduced to stabilize the temperature of the plating bath at 470° C. or less, which is not suitable in terms of the manufacturing cost. Therefore, the temperature when the base steel sheet enters the plating bath is set to 430° C. or more and 480° C. or less in order to stabilize the bath temperature of the plating bath. Further, to appropriately control the Fe—Al alloy layer, the temperature when the base steel sheet enters the plating bath is further preferably limited to 440° C. or more and 470° C. or less.

The temperature of the plating bath is preferably stabilized at a temperature falling within a range of 440° C. to 470° C. An unstable temperature of the plating bath makes the Fe content in the Fe—Al alloy layer and the plating layer nonuniform to make the appearance and the adhesion of the plating layer nonuniform. To stabilize the temperature of the plating bath, the temperature of the steel sheet when it enters the plating bath is preferably substantially equal to the temperature of the plating bath. Concretely, in view of the limit of the temperature controllability of actual manufacturing facilities, the temperature of the steel sheet when it enters the plating bath is preferably set to within ±10° C. of the plating bath temperature, and more preferably set to within ±5° C. of the plating bath temperature.

After the immersion in the plating bath, to make the plating deposition amount a predetermined amount, it is preferable to spray a high-pressure gas mainly containing nitrogen to the surface of the steel sheet to remove excess zinc of the surface layer. Thereafter, the steel sheet is cooled down to a room temperature. During the cooling, up to a temperature of 350° C. at which the diffusion of the Fe atoms from the base steel sheet to the plating layer scarcely progresses and the generation of the (phase almost stops, a cooling rate of 1° C./second or more is preferably secured from the viewpoint of securing plating adhesion.

Further, after the cooling down to 350° C., in order to obtain the hard structure, cooling may be performed down to 250° C. or less at an average cooling rate of 1.0° C./second or more. In order to obtain the fresh martensite phase and/or the tempered martensite phase, the average cooling rate is preferably set to 3.0° C./second or more and further preferably set to 5.0° C./second or more.

Further, after the cooling down to 250° C. or less, in order to obtain the tempered martensite, a reheat treatment may be performed. A treatment temperature and a treatment time of the reheat treatment may be appropriately set according to a target property. However, when the reheat treatment temperature is less than 250° C., a sufficient effect is not obtained, and when it exceeds 350° C., on the other hand, there is a concern that the plating layer is changed in quality and plating adhesion deteriorates, and thus the reheat treatment temperature is preferably set to 250° C. or more and 350° C. or less. Further, when the reheat treatment time exceeds 1000 seconds, the treatment effect is saturated, and thus, the treatment time is preferably set to 1000 seconds or less.

Further, after the cooling down to 350° C., in order to obtain the retained austenite, a bainite transformation treatment that retains the steel sheet in a temperature range of 250° C. to 350° C. for 15 seconds to 500 seconds may be performed. When a bainite transformation treatment temperature is less than 250° C., martensite is generated and the retained austenite cannot be sufficiently obtained. Therefore, the bainite transformation treatment temperature is preferably set to 250° C. or more and more preferably set to 300° C. or more. On the other hand, when the bainite transformation treatment temperature exceeds 350° C., the diffusion of the Fe atoms from the base steel sheet to the plating layer progresses and plating adhesion deteriorates. Therefore, the bainite transformation treatment temperature is preferably set to 350° C. or less and more preferably set to 330° C. or less.

When a bainite transformation treatment time is 15 seconds or more, the effect for performing the bainite transformation treatment is obtained sufficiently. The bainite transformation treatment time is more preferably 25 seconds or more. When the bainite transformation treatment time is 500 seconds or less, the bainite transformation treatment can be performed efficiently. The bainite transformation treatment time is more preferably 300 seconds or less.

Further, in order to further stabilize the retained austenite, a reheat treatment may be performed after the cooling down to 250° C. or less. A treatment temperature and a treatment time of the reheat treatment may be appropriately set according to a target property. However, when the reheat treatment temperature is less than 250° C., a sufficient effect is not obtained. Therefore, the reheat treatment temperature is preferably set to 250° C. or more and more preferably set to 280° C. or more. When the reheat treatment temperature exceeds 350° C., the diffusion of the Fe atoms from the base steel sheet to the plating layer progresses and plating adhesion deteriorates. Therefore, the reheat treatment temperature is preferably set to 350° C. or less and more preferably set to 330° C. or less.

Further, when the reheat treatment time exceeds 1000 seconds, the treatment effect is saturated, and thus, the treatment time is preferably set to 1000 seconds or less.

"Working Step"

Next, after the steel sheet is cooled until the temperature becomes 100° C. or less, bending-unbending deformation is performed on the metal coated steel sheet in order to reduce the retained austenite in the surface layer of the base steel sheet. The bending can be performed by using a roll with a diameter of 50 mm to 800 mm. When the roll diameter is less than 50 mm, a large amount of strain is introduced into the surface layer of the base steel sheet by bending deformation, and thus, the formability of the steel sheet is impaired. Further, when the roll diameter is more than 800 mm, the amount of strain in the surface layer of the base steel sheet is small, and thus, the retained austenite is not reduced sufficiently. As for the bending-unbending deformation, in order to reduce the retained austenite in each of the front and rear surfaces of the base steel sheet, it is necessary to perform deformation with each of the front and rear surfaces set as a bending outer side one time or more on each of the sides, resulting in that it is necessary to perform the bending-unbending deformation two times or more in total. Thereby, the retained austenite in both the front and rear surfaces of the base steel sheet can be made to fall within a predetermined range.

The hot-dip galvanized steel sheet according to this embodiment can be manufactured by the manufacturing method explained above, but the present invention is not limited to the above-described embodiment.

For example, in the embodiment of the present invention, a film made of a phosphorus oxide or a composite oxide containing phosphorus may be applied to the surface of the galvanizing layer of the hot-dip galvanized steel sheet obtained by the above-described method.

The film made of the phosphorus oxide or the composite oxide containing phosphorus can be made to function as a lubricant when the hot-dip galvanized steel sheet is worked and can protect the galvanizing layer formed on the surface of the base steel sheet.

Further, in this embodiment, cold rolling may be performed on the hot-dip galvanized steel sheet cooled down to a room temperature at a reduction ratio of 3.00% or less for shape correction.

The manufacturing method of the hot-dip galvanized steel sheet according to the embodiment of the present invention described above is preferably applied to the manufacture of a hot-dip galvanized steel sheet with a base steel sheet having a sheet thickness of 0.6 mm or more and less than 5.0 mm. When the sheet thickness of the base steel sheet is less than 0.6 mm, it becomes difficult to keep the shape of the base steel sheet flat, which is not appropriate in some cases. Further, when the sheet thickness of the base steel sheet is 5.0 mm or more, it becomes difficult to control the cooling in the annealing step and the plating step in some cases.

EXAMPLES

Examples of the present invention are explained. Conditions in the examples are only condition examples adopted for confirming the feasibility and effect of the present invention. The present invention is not limited to these condition examples. The present invention can adopt various conditions as long as they do not depart from the spirit of the present invention and achieve the object of the present invention.

Example 1

Slabs having chemical components (compositions) of A to AK illustrated in Table 1 were cast, hot rolled under the hot rolling step conditions (the slab heating temperature, the rolling completion temperature) illustrated in Table 2 and 3, and cooled under the hot rolling step conditions (the average cooling rate from the completion of the hot rolling up to coiling, the coiling temperature, and Formula (1)) illustrated in Table 2 and Table 3, and then hot-rolled steel sheets were obtained.

Thereafter, the hot-rolled steel sheets were subjected to acid pickling (immersion in 10% hydrochloric acid at 80° C., the immersion time illustrated in Table 2 and Table 3) and subjected to cold rolling under the cold rolling step condition (the reduction ratio) illustrated in Table 2 and Table 3, and then cold-rolled steel sheets were obtained.

Then, the obtained cold-rolled steel sheets were subjected to annealing under the heating step conditions in the annealing step (the air ratio in the preheating zone, $\text{Log}(P(H_2O)/P(H_2))$ in the preheating zone atmosphere, $\text{Log}(P(H_2O)/P(H_2))$ in the soaking zone atmosphere, the average heating rate in the temperature zone of 600° C. to 750° C., and the maximum heating temperature) illustrated in Table 4 to Table 7. These steel sheets were subjected to cooling under the conditions (a cooling rate 1 (the average cooling rate in a temperature zone of 760° C. to 700° C.), a cooling rate 2 (the average cooling rate in a temperature zone of 650° C. to 500T), martensite transformation treatment conditions (the treatment temperature, the treatment time), and conditions of a bainite transformation treatment 1 (the treatment temperature, the treatment time)) illustrated in Table 3, and then base steel sheets for a plating treatment were obtained.

Then, the base steel sheets were immersed in a galvanizing bath under the conditions (the effective Al amount, the plating bath temperature, the entrance temperature of the steel sheet) illustrated in Table 4 to Table 7, and were subjected to cooling after plating under the conditions (a cooling rate 3 (the average cooling rate to 350° C.), a cooling rate 4 (the average cooling rate in a temperature zone of 350° C. to 250° C.), conditions of a bainite transformation treatment 2 (the treatment temperature, the treatment time), and reheat treatment conditions (the treatment temperature, the treatment time)) illustrated in Table 4 to Table 7. Then, they were subjected to bending-unbending under the conditions (the roll diameter, the number of times of working) illustrated in Table 4 to Table 7, and further subjected to cold rolling under the condition (the reduction ratio) illustrated in Table 4 to Table 7, and then hot-dip galvanized steel sheets of Experimental examples 1 to 95 were obtained, (where in some of the experimental examples, the experiment was stopped).

Then, a sample with a sheet thickness cross section parallel to the rolling direction of the base steel sheet set as an observation surface was collected from each of the hot-dip galvanized steel sheets, a microstructure observation with a field emission scanning electron microscope (FE-SEM) and a high-resolution crystal orientation analysis by an EBSD method were performed, and volume fractions of the microstructure in the range of ⅛ thickness to ⅜ thickness of which center is ¼ of the sheet thickness (¼ thickness) and volume fractions of the microstructure in the surface layer portion starting from an interface between the plating layer and the base steel sheet to 20 μm in depth (base iron surface layer portion) were each measured. In Table 8 and Table 9, "MARTENSITE" indicates fresh martensite, and in Table 8 and Table 9, "OTHERS" in the microstructure indicate pearlite and/or coarse cementite. Further, "HARD STRUCTURE" indicates a hard structure composed of one or more of bainite, bainitic ferrite, fresh martensite, and tempered martensite.

For finding a plating deposition amount, the plating layer was melted using inhibitor-added hydrochloric acid and the weight before the melting and that after the melting were compared. Fe and Al were quantified by ICP simultaneously, and thereby the Fe concentration and the Al concentration in the plating layer were measured.

Further, a sample with a sheet thickness cross section parallel to the rolling direction of the base steel sheet set as an observation surface was collected from each of the metal coated steel sheets, and by using the above-described measurement methods, an average thickness and a difference in thickness in the width direction of a Fe—Al alloy layer at the interface between the base steel sheet and the hot-dip galvanizing layer, an average thickness and a difference in thickness in the width direction of a fine-grain layer directly in contact with the Fe—Al alloy layer, an average grain diameter of a ferrite phase in the fine-grain layer (a ferrite phase average grain diameter), and the maximum diameter of an oxide of one or more of Si and Mn in the fine-grain layer (an oxide maximum diameter) were found. Results thereof are illustrated in Table 8 and Table 9.

Then, in order to examine the properties of the metal coated steel sheet, a tensile test, a hole expanding test, a bending test, a fatigue test, an adhesion evaluation test, a spot welding test, a corrosion test, a chipping resistance test, a powdering resistance test, and a plating appearance uniformity evaluation were performed. Properties of the respective experimental examples are illustrated in Table 10 and Table 11.

The tensile test was performed by the method described in JIS Z 2241 on a No. 5 specimen described in JIS Z 2201, which was fabricated from each of the metal coated steel sheets, and a yield strength (YS), a maximum tensile strength (TS), and total elongation (El) were found. Note that, in cases where the maximum tensile strength TS was 550 MPa or more, the tensile property was evaluated as good.

The hole expanding test was performed by the method described in JIS Z 2256. Ductility (total elongation) El and hole expandability λ included in formabilities change with the maximum tensile strength TS, and in cases where Formula (2) below is satisfied, strength, ductility, and hole expandability were evaluated as good.

$$TS^{1.5} \times El \times \lambda^{0.5} \geq 2.0 \times 10^6 \qquad \text{Formula (2)}$$

As for the bending test, a No. 5 specimen described in JIS Z 2201 was fabricated from each of the hot-dip galvanized steel sheets and a 90° V-bending test was performed by using a V block method described in JIS Z 2248. A radius at a bottom portion of a V block is varied from 1.0 mm to 6.0 mm at intervals of 0.5 mm, and the smallest radius at which crack did not occur in the specimen is set as a minimum bend radius r [mm]. The bendability was evaluated by "r/t" obtained by normalizing the minimum bend radius r with the sheet thickness t [mm], and the case of "r/t" being 2.0 or less was evaluated as good bendability.

As for the fatigue test, a No. 1 specimen described in JIS Z 2275 was fabricated from each of the hot-dip galvanized steel sheets and a pulsating plane bending fatigue test was performed according to JIS Z 2273. A fatigue limit DL and a fatigue limit ratio DL/TS were evaluated by setting the maximum number of repetitions to 10 million times, and the case of the fatigue limit ratio being 0.30 or more was evaluated as good fatigue resistance.

As for plating adhesion, a Dupont impact test was performed on each of the metal coated steel sheets to which a 5% uniaxial tensile strain was given. An adhesive tape was pasted on each of the metal coated steel sheets having undergone the impact test and thereafter was peeled off, and the case where plating did not detach was evaluated as particularly good (⊚), the case where 5% or more of the plating detached was evaluated as bad (x), and the case where less than 5% of the plating detached was evaluated as good (O). In the Dupont impact test, an impact head having a tip with a ½ inch radius of curvature was used, and a 3 kg weight was dropped from a height of 1 m.

For the evaluation of spot weldability, an electrode tip life test was performed. Spot welding was continuously performed 1000 times under a welding condition that the diameter of a molten portion became 5.3 times to 5.7 times the square root of the sheet thickness. Then, the diameter of the molten portion at the first point $d_1$ and that at the 1000th point $d_{1000}$ were compared, and the case of $d_{1000}/d_1$ being 0.90 or more was evaluated as pass (O), and the case of it being less than 0.90 was evaluated as failure (x).

For the evaluation of corrosion resistance, a specimen cut out from each of the metal coated steel sheets to have a size of 150 mm×70 mm was used. The specimen was subjected to a zinc phosphate-based dip-type chemical conversion treatment, and subsequently, had cationic electrodeposition coating of 20 μm applied thereto, and further, had intermediate coating of 35 μm and top coating of 35 μm applied thereto, and then the rear surface and the end portion were sealed with an insulating tape. In the corrosion resistance test, CCT having one cycle of SST 6 hr→drying 4 hr→wetting 4 hr→freezing 4 hr was used. As for the evaluation of corrosion resistance after coating, a crosscut reaching the base steel sheet was made in the coated surface with a cutter and a blister width after 60 cycles of CCT was measured. The case of the blister width being 3.0 mm or less was evaluated as pass (O) and the case of the blister width being more than 3.0 mm was evaluated as failure (x).

The chipping resistance was evaluated by using a 70 mm×50 mm specimen cut out from each of the metal coated steel sheets. First, the specimen was subjected to steps of degreasing for automobiles, formation of a chemical conversion film, and three-coat painting. Next, while the specimen was kept in a state of being cooled to −20° C., ten crushed stones (0.3 g to 0.5 g) were vertically sprayed to it with an air pressure of 2 kgf/cm². The spraying of the crushed stones was repeated five times per specimen. Thereafter, totally 50 chipping traces were observed in each of the specimens, and the evaluation was made according to the following criteria, based on the positions of their peeling interfaces. Those whose peeling interfaces were above the plating layers (were plating layer-chemical conversion film interfaces or electrodeposition coating-intermediate coating interfaces) were evaluated as pass (O), and those having even one peeling in the plating layer-base iron interface were evaluated as failure (x).

To evaluate the workability of the plating layer, the powdering resistance was evaluated by using V-bending (JIS Z 2248). The metal coated steel sheets were each cut into 50 mm×90 mm, molded bodies were formed with a 1R-90° C. V-shaped die press, and they were used as test objects. On valley portions of the test objects, tape peeling was performed. Concretely, a cellophane adhesive tape with a width of 24 mm was pressed onto a bent portion of each of the test objects and then pulled off, and a 90 mm length portion of the cellophane adhesive tape was visually observed. Evaluation criteria were as follows. Those in which the peeling of the plating layer occupied less than 5% of the area of the worked portion was evaluated as pass (O), and those in which the peeling of the plating layer occupied more than 5% of the area of the worked portion was evaluated as failure (x).

In the evaluation of appearance uniformity, lightness (L* value) was measured totally at eight places, that is, positions 50 mm distant from both edges in the width direction of the steel sheet and positions dividing a gap therebetween into seven equal parts, and those in which a difference equal to the maximum value from which the minimum value was subtracted was less than 5 was evaluated as uniform (O), those in which this difference was 5 or more and less than 10 was evaluated as slightly nonuniform (Δ), and those in which this difference was 10 or more was evaluated as nonuniform (x).

TABLE 1

| | | CHEMICAL COMPONENT (MASS %) BALANCE: Fe AND INEVITABLE IMPURITIES | | | | | | | | | | | | | |
|---|---|---|---|---|---|---|---|---|---|---|---|---|---|---|---|
| | C | Si | Mn | P | S | Al | N | O | Ti | Nb | V | Cr | Ni | Cu | Mo |
| A | 0.118 | 0.61 | 2.34 | 0.018 | 0.0033 | 0.083 | 0.0022 | 0.0007 | | | | | | | |
| B | 0.231 | 1.77 | 1.45 | 0.011 | 0.0014 | 0.026 | 0.0044 | 0.0005 | | | | | | | |
| C | 0.091 | 0.45 | 1.78 | 0.019 | 0.0024 | 0.040 | 0.0058 | 0.0002 | | | | | | | |
| D | 0.079 | 0.98 | 1.65 | 0.011 | 0.0029 | 0.033 | 0.0046 | 0.0014 | | | | | | | |
| E | 0.171 | 0.14 | 1.80 | 0.015 | 0.0047 | 0.025 | 0.0009 | 0.0015 | 0.049 | | | | | | |

TABLE 1-continued

| | C | Si | Mn | P | S | Al | N | O | Ti | Nb | V | Cu | Ni | Cr | Mo |
|---|---|---|---|---|---|---|---|---|---|---|---|---|---|---|---|
| F | 0.179 | 1.22 | 1.62 | 0.010 | 0.0009 | 0.067 | 0.0020 | 0.0022 | | 0.036 | | | | | |
| G | 0.122 | 1.92 | 2.97 | 0.019 | 0.0055 | 0.022 | 0.0041 | 0.0019 | | | 0.107 | | | | |
| H | 0.134 | 0.23 | 2.58 | 0.018 | 0.0045 | 0.041 | 0.0057 | 0.0016 | | | | 0.56 | | | |
| I | 0.131 | 1.68 | 0.96 | 0.020 | 0.0026 | 0.046 | 0.0046 | 0.0010 | | | | | 0.73 | | |
| J | 0.073 | 1.06 | 3.27 | 0.017 | 0.0057 | 0.070 | 0.0022 | 0.0022 | | | | | | 0.70 | |
| K | 0.084 | 0.62 | 2.53 | 0.004 | 0.0005 | 0.724 | 0.0026 | 0.0009 | | | | | | | 0.15 |
| L | 0.212 | 0.48 | 1.36 | 0.010 | 0.0021 | 0.060 | 0.0044 | 0.0013 | | | | | | | |
| M | 0.122 | 0.22 | 1.57 | 0.017 | 0.0014 | 0.062 | 0.0067 | 0.0010 | | | | | | | |
| N | 0.055 | 1.20 | 2.73 | 0.010 | 0.0011 | 0.025 | 0.0025 | 0.0016 | | | | | | | |
| O | 0.180 | 1.58 | 1.97 | 0.007 | 0.0020 | 0.039 | 0.0060 | 0.0020 | | | | | | | |
| P | 0.177 | 1.42 | 2.87 | 0.018 | 0.0030 | 0.046 | 0.0056 | 0.0018 | | | | | | | |
| Q | 0.060 | 0.89 | 1.28 | 0.016 | 0.0040 | 0.048 | 0.0064 | 0.0018 | | | | | | | |
| R | 0.086 | 0.32 | 2.28 | 0.006 | 0.0004 | 1.000 | 0.0037 | 0.0021 | | | | | | | |
| S | 0.115 | 0.07 | 2.42 | 0.008 | 0.0052 | 0.198 | 0.0057 | 0.0006 | | | | | | | |
| T | 0.135 | 0.67 | 2.36 | 0.022 | 0.0019 | 1.180 | 0.0011 | 0.0017 | 0.015 | 0.024 | | | | | |
| U | 0.083 | 0.55 | 1.30 | 0.032 | 0.0044 | 0.057 | 0.0023 | 0.0015 | | | | | 0.14 | 0.16 | |
| V | 0.130 | 0.45 | 1.21 | 0.018 | 0.0056 | 0.052 | 0.0012 | 0.0018 | 0.024 | | | | | | |
| W | 0.118 | 0.53 | 0.69 | 0.010 | 0.0050 | 0.054 | 0.0049 | 0.0019 | 0.020 | 0.008 | | 0.43 | | | 0.08 |
| X | 0.207 | 0.65 | 1.76 | 0.014 | 0.0025 | 0.046 | 0.0044 | 0.0021 | 0.074 | | | 0.15 | | | |
| Y | 0.116 | 0.11 | 1.74 | 0.011 | 0.0062 | 0.067 | 0.0042 | 0.0007 | | 0.052 | | | | | |
| Z | 0.081 | 0.33 | 1.27 | 0.008 | 0.0035 | 0.035 | 0.0017 | 0.0008 | 0.008 | 0.007 | 0.032 | | | | 0.08 |
| AA | <u>0.016</u> | 1.20 | 2.50 | 0.020 | 0.0007 | 0.044 | 0.0021 | 0.0008 | | | | | | | |
| AB | <u>0.336</u> | 1.06 | 2.45 | 0.018 | 0.0064 | 0.051 | 0.0035 | 0.0006 | | | | | | | |
| AC | 0.133 | <u>0.00</u> | 2.83 | 0.012 | 0.0014 | 0.020 | 0.0014 | 0.0010 | | | | | | | |
| AD | 0.127 | <u>2.30</u> | 2.56 | 0.022 | 0.0050 | 0.015 | 0.0037 | 0.0003 | | | | | | | |
| AE | 0.181 | 0.15 | <u>0.36</u> | 0.009 | 0.0026 | 0.038 | 0.0058 | 0.0006 | | | | | | | |
| AF | 0.172 | 0.22 | <u>5.00</u> | 0.014 | 0.0047 | 0.051 | 0.0035 | 0.0007 | | | | | | | |
| AG | 0.113 | 0.61 | 3.24 | <u>0.140</u> | 0.0049 | 0.050 | 0.0011 | 0.0010 | | | | | | | |
| AH | 0.123 | 1.69 | 1.95 | 0.011 | <u>0.0156</u> | 0.035 | 0.0022 | 0.0017 | | | | | | | |
| AI | 0.124 | 1.51 | 2.06 | 0.011 | 0.0057 | <u>2.841</u> | 0.0025 | 0.0023 | | | | | | | |
| AJ | 0.106 | 1.07 | 1.92 | 0.022 | 0.0026 | 0.044 | <u>0.0122</u> | 0.0012 | | | | | | | |
| AK | 0.116 | 0.75 | 2.71 | 0.019 | 0.0017 | 0.056 | 0.0013 | <u>0.0132</u> | | | | | | | |

CHEMICAL COMPONENT (MASS %) BALANCE: Fe AND INEVITABLE IMPURITIES

| | B | W | Ca | Ce | Mg | Zr | La | REM | REMARKS |
|---|---|---|---|---|---|---|---|---|---|
| A | | | | | | | | | EXAMPLE |
| B | | | | | | | | | EXAMPLE |
| C | | | | | | | | | EXAMPLE |
| D | | | | | | | | | EXAMPLE |
| E | | | | | | | | | EXAMPLE |
| F | | | | | | | | | EXAMPLE |
| G | | | | | | | | | EXAMPLE |
| H | | | | | | | | | EXAMPLE |
| I | | | | | | | | | EXAMPLE |
| J | | | | | | | | | EXAMPLE |
| K | | | | | | | | | EXAMPLE |
| L | 0.0040 | | | | | | | | EXAMPLE |
| M | | 0.15 | | | | | | | EXAMPLE |
| N | | | 0.0025 | | | | | | EXAMPLE |
| O | | | | 0.0016 | | | | | EXAMPLE |
| P | | | | | 0.0030 | | | | EXAMPLE |
| Q | | | | | | 0.0012 | | | EXAMPLE |
| R | | | | | | | 0.0030 | | EXAMPLE |
| S | | | | | | | | 0.0014 | EXAMPLE |
| T | | | | | | | | | EXAMPLE |
| U | | | | | | | | | EXAMPLE |
| V | 0.0015 | | | | | | | | EXAMPLE |
| W | 0.0008 | | | | | | | | EXAMPLE |
| X | | | | | | | | | EXAMPLE |
| Y | | | 0.0028 | 0.0019 | | | | | EXAMPLE |
| Z | 0.0004 | | 0.0012 | | | | | | EXAMPLE |
| AA | | | | | | | | | COMPARATIVE EXAMPLE |
| AB | | | | | | | | | COMPARATIVE EXAMPLE |
| AC | | | | | | | | | COMPARATIVE EXAMPLE |
| AD | | | | | | | | | COMPARATIVE EXAMPLE |
| AE | | | | | | | | | COMPARATIVE EXAMPLE |
| AF | | | | | | | | | COMPARATIVE EXAMPLE |
| AG | | | | | | | | | COMPARATIVE EXAMPLE |
| AH | | | | | | | | | COMPARATIVE EXAMPLE |

TABLE 1-continued

| | |
|---|---|
| AI | COMPARATIVE EXAMPLE |
| AJ | COMPARATIVE EXAMPLE |
| AK | COMPARATIVE EXAMPLE |

※ UNDERLINED PART IS OUT OF PRESENT INVENTION RANGE

TABLE 2

| EXPERIMENTAL EXAMPLE | CHEMICAL COMPONENT | HOT ROLLING STEP | | | |
|---|---|---|---|---|---|
| | | SLAB HEATING TEMPERATURE °C. | ROLLING COMPLETION TEMPERATURE °C. | AVERAGE COOLING RATE °C./SECOND | COILING TEMPERATURE °C. |
| 1 | A | 1185 | 921 | 27 | 560 |
| 2 | A | 1260 | 925 | 19 | 597 |
| 3 | A | 1220 | 913 | 17 | 596 |
| 4 | B | 1250 | 900 | 32 | 550 |
| 5 | B | 1215 | 894 | 29 | 614 |
| 6 | B | 1225 | 936 | 21 | 627 |
| 7 | C | 1205 | 942 | 15 | 615 |
| 8 | C | 1255 | 908 | 18 | 582 |
| 9 | C | 1170 | 957 | 33 | 592 |
| 10 | D | 1230 | 908 | 18 | 595 |
| 11 | D | 1165 | 888 | 17 | 620 |
| 12 | D | 1165 | 951 | 23 | 558 |
| 13 | E | 1255 | 927 | 21 | 621 |
| 14 | E | 1220 | 933 | 26 | 595 |
| 15 | E | 1170 | 941 | 16 | 585 |
| 16 | F | 1190 | 941 | 33 | 593 |
| 17 | F | 1255 | 928 | 17 | 617 |
| 18 | F | 1215 | 925 | 26 | 617 |
| 19 | G | 1205 | 948 | 23 | 590 |
| 20 | G | 1245 | 912 | 20 | 585 |
| 21 | G | 1225 | 869 | 14 | 614 |
| 22 | H | 1195 | 935 | 25 | 554 |
| 23 | H | 1255 | 925 | 18 | 603 |
| 24 | H | 1265 | 899 | 24 | 616 |
| 25 | I | 1225 | 871 | 20 | 655 |
| 26 | I | 1225 | 871 | 20 | 655 |
| 27 | I | 1215 | 884 | 16 | 603 |
| 28 | I | 1225 | 925 | 23 | 616 |
| 29 | J | 1170 | 889 | 36 | 634 |
| 30 | J | 1190 | 935 | 27 | 609 |
| 31 | J | 1215 | 925 | 21 | 555 |
| 32 | K | 1195 | 923 | 14 | 612 |
| 33 | K | 1225 | 931 | 17 | 611 |
| 34 | K | 1225 | 911 | 32 | 590 |
| 35 | L | 1230 | 906 | 17 | 612 |
| 36 | L | 1190 | 931 | 29 | 581 |
| 37 | L | 1260 | 901 | 12 | 611 |
| 38 | M | 1250 | 917 | 16 | 654 |
| 39 | M | 1250 | 917 | 16 | 654 |
| 40 | M | 1190 | 914 | 20 | 584 |
| 41 | M | 1175 | 928 | 26 | 565 |
| 42 | N | 1225 | 919 | 24 | 579 |
| 43 | N | 1190 | 890 | 18 | 612 |
| 44 | N | 1180 | 915 | 12 | 634 |
| 45 | O | 1205 | 912 | 35 | 630 |
| 46 | O | 1215 | 920 | 19 | 609 |
| 47 | O | 1260 | 956 | 25 | 593 |

| EXPERIMENTAL EXAMPLE | HOT ROLLING STEP | | ACID PICKLING STEP ACID PICKLING TIME SECOND | COLD ROLLING STEP REDUCTION RATIO % | REMARKS |
|---|---|---|---|---|---|
| | Ae3* °C. | FORMULA (1) | | | |
| 1 | 846 | 5.4 | 30 | 41 | EXAMPLE |
| 2 | 846 | 3.0 | 30 | 44 | EXAMPLE |
| 3 | 846 | 3.0 | 30 | 5 | EXAMPLE |

TABLE 2-continued

| | | | | | |
|---|---|---|---|---|---|
| 4 | 902 | 7.1 | 30 | 56 | EXAMPLE |
| 5 | 902 | 2.3 | 30 | 68 | EXAMPLE |
| 6 | 902 | 26.0 | 30 | 37 | COMPARATIVE EXAMPLE |
| 7 | 852 | 4.1 | 30 | 33 | EXAMPLE |
| 8 | 852 | 8.3 | 30 | 64 | EXAMPLE |
| 9 | 852 | 7.2 | 30 | 38 | COMPARATIVE EXAMPLE |
| 10 | 872 | 7.3 | 30 | 42 | EXAMPLE |
| 11 | 872 | 7.7 | 30 | 44 | EXAMPLE |
| 12 | 872 | 3.0 | 30 | 61 | EXAMPLE |
| 13 | 840 | 7.3 | 30 | 64 | EXAMPLE |
| 14 | 840 | 4.9 | 30 | 61 | EXAMPLE |
| 15 | 840 | 7.3 | 30 | 63 | COMPARATIVE EXAMPLE |
| 16 | 884 | 8.0 | 30 | 68 | EXAMPLE |
| 17 | 884 | 4.1 | 30 | 69 | EXAMPLE |
| 18 | 884 | 0.4 | 30 | 41 | COMPARATIVE EXAMPLE |
| 19 | 862 | 6.7 | 30 | 40 | EXAMPLE |
| 20 | 862 | 8.7 | 30 | 50 | EXAMPLE |
| 21 | 862 | 5.8 | 30 | 35 | COMPARATIVE EXAMPLE |
| 22 | 812 | 9.1 | 30 | 70 | EXAMPLE |
| 23 | 812 | 2.2 | 30 | 71 | EXAMPLE |
| 24 | 812 | 7.9 | 30 | 66 | COMPARATIVE EXAMPLE |
| 25 | 887 | 5.5 | 30 | 33 | EXAMPLE |
| 26 | 887 | 5.5 | 60 | 33 | EXAMPLE |
| 27 | 887 | 4.4 | 30 | 59 | EXAMPLE |
| 28 | 887 | 9.7 | 30 | 68 | EXAMPLE |
| 29 | 817 | 6.7 | 30 | 73 | EXAMPLE |
| 30 | 817 | 1.4 | 30 | 38 | EXAMPLE |
| 31 | 817 | 2.9 | 30 | 49 | COMPARATIVE EXAMPLE |
| 32 | 922 | 4.8 | 30 | 65 | EXAMPLE |
| 33 | 922 | 3.2 | 30 | 64 | EXAMPLE |
| 34 | 922 | 8.6 | 30 | 57 | COMPARATIVE EXAMPLE |
| 35 | 868 | 7.3 | 30 | 62 | EXAMPLE |
| 36 | 868 | 6.1 | 30 | 43 | EXAMPLE |
| 37 | 868 | 3.4 | 30 | 38 | COMPARATIVE EXAMPLE |
| 38 | 854 | 2.8 | 30 | 69 | EXAMPLE |
| 39 | 854 | 2.8 | 60 | 69 | EXAMPLE |
| 40 | 854 | 6.9 | 30 | 35 | EXAMPLE |
| 41 | 854 | 5.4 | 30 | 3 | EXAMPLE |
| 42 | 846 | 8.9 | 30 | 70 | EXAMPLE |
| 43 | 846 | 9.9 | 30 | 33 | EXAMPLE |
| 44 | 846 | 0.5 | 30 | 63 | COMPARATIVE EXAMPLE |
| 45 | 882 | 2.6 | 30 | 63 | EXAMPLE |
| 46 | 882 | 3.9 | 30 | 56 | EXAMPLE |
| 47 | 882 | 5.1 | 30 | 72 | COMPARATIVE EXAMPLE |

TABLE 3

| | | HOT ROLLING STEP | | | | |
|---|---|---|---|---|---|---|
| EXPERIMENTAL EXAMPLE | CHEMICAL COMPONENT | SLAB HEATING TEMPERATURE ° C. | ROLLING COMPLETION TEMPERATURE ° C. | AVERAGE COOLING RATE ° C./SECOND | COILING TEMPERATURE ° C. | Ae3* ° C. |
| 48 | P | 1255 | 931 | 17 | 582 | 852 |
| 49 | P | 1185 | 897 | 16 | 626 | 852 |
| 50 | P | 1220 | 904 | 30 | 649 | 852 |
| 51 | Q | 1190 | 909 | 19 | 633 | 882 |
| 52 | Q | 1185 | 922 | 20 | 574 | 882 |
| 53 | Q | 1255 | 886 | 13 | 581 | 882 |
| 54 | R | 1260 | 891 | 18 | 560 | 952 |
| 55 | R | 1255 | 917 | 19 | 599 | 952 |
| 56 | R | 1225 | 914 | 28 | 602 | 952 |
| 57 | S | 1255 | 928 | 19 | 599 | 841 |
| 58 | S | 1260 | 926 | 44 | 612 | 841 |
| 59 | S | 1235 | 919 | 20 | 611 | 841 |
| 60 | T | 1215 | 935 | 20 | 588 | 982 |

TABLE 3-continued

| Experimental Example | Steel | | | | | | Hot Rolling Step Formula (1) | Acid Pickling Step Acid Pickling Time Second | Cold Rolling Step Reduction Ratio % | Remarks |
|---|---|---|---|---|---|---|---|---|---|---|
| 61 | T | 1265 | 905 | 27 | 619 | 982 | | | | |
| 62 | T | 1230 | 954 | 32 | 580 | 982 | | | | |
| 63 | U | 1235 | 926 | 24 | 609 | 862 | | | | |
| 64 | U | 1200 | 879 | 15 | 609 | 862 | | | | |
| 65 | U | 1245 | 878 | 15 | 639 | 862 | | | | |
| 66 | V | 1255 | 893 | 27 | 585 | 870 | | | | |
| 67 | V | 1170 | 876 | 28 | 590 | 870 | | | | |
| 68 | V | 1235 | 946 | 17 | 622 | 870 | | | | |
| 69 | W | 1205 | 912 | 26 | 548 | 881 | | | | |
| 70 | W | 1175 | 867 | 14 | 634 | 881 | | | | |
| 71 | W | 1200 | 939 | 24 | 594 | 881 | | | | |
| 72 | X | 1215 | 895 | 18 | 608 | 857 | | | | |
| 73 | X | 1190 | 948 | 18 | 607 | 857 | | | | |
| 74 | X | 1185 | 907 | 16 | 600 | 857 | | | | |
| 75 | Y | 1195 | 916 | 39 | 627 | 846 | | | | |
| 76 | Y | 1165 | 938 | 23 | 568 | 846 | | | | |
| 77 | Y | 1240 | 955 | 18 | 609 | 846 | | | | |
| 78 | Z | 1175 | 926 | 18 | 631 | 864 | | | | |
| 79 | Z | 1175 | 895 | 35 | 604 | 864 | | | | |
| 80 | Z | 1185 | 893 | 15 | 606 | 864 | | | | |
| 81 | AA | 1210 | 891 | 19 | 622 | 855 | | | | |
| 82 | AB | 1175 | 916 | 24 | 604 | 853 | | | | |
| 83 | AC | 1180 | 906 | 19 | 579 | 805 | | | | |
| 84 | AD | EXPERIMENT STOPPED BECAUSE SLAB CRACKED DURING HEATING IN HOT ROLLING STEP | | | | | | | | |
| 85 | AE | 1225 | 875 | 18 | 646 | 884 | | | | |
| 86 | AF | EXPERIMENT STOPPED BECAUSE SLAB CRACKED DURING ROLLING IN HOT ROLLING STEP | | | | | | | | |
| 87 | AG | EXPERIMENT STOPPED BECAUSE SLAB CRACKED IN CASTING STEP | | | | | | | | |
| 88 | AH | 1210 | 918 | 17 | 605 | 886 | | | | |
| 89 | AI | EXPERIMENT STOPPED BECAUSE SLAB CRACKED DURING ROLLING IN HOT ROLLING STEP | | | | | | | | |
| 90 | AJ | 1170 | 908 | 15 | 610 | 868 | | | | |
| 91 | AK | 1175 | 956 | 25 | 574 | 836 | | | | |
| 92 | A | 1260 | 925 | 19 | 597 | 846 | | | | |
| 93 | U | 1200 | 879 | 15 | 609 | 862 | | | | |
| 94 | A | 1260 | 925 | 19 | 597 | 846 | | | | |
| 95 | A | 1260 | 925 | 19 | 597 | 846 | | | | |
| 48 | | | | | | | 3.3 | 30 | 36 | EXAMPLE |
| 49 | | | | | | | 2.4 | 30 | 71 | EXAMPLE |
| 50 | | | | | | | 3.7 | 30 | 69 | COMPARATIVE EXAMPLE |
| 51 | | | | | | | 2.4 | 30 | 33 | EXAMPLE |
| 52 | | | | | | | 12.3 | 30 | 66 | EXAMPLE |
| 53 | | | | | | | 8.0 | 30 | 62 | COMPARATIVE EXAMPLE |
| 54 | | | | | | | 11.5 | 30 | 69 | EXAMPLE |
| 55 | | | | | | | 4.9 | 30 | 36 | EXAMPLE |
| 56 | | | | | | | 7.8 | 30 | 72 | COMPARATIVE EXAMPLE |
| 57 | | | | | | | 6.2 | 30 | 43 | EXAMPLE |
| 58 | | | | | | | 3.6 | 30 | 67 | EXAMPLE |
| 59 | | | | | | | 3.1 | 30 | 41 | COMPARATIVE EXAMPLE |
| 60 | | | | | | | 4.1 | 30 | 71 | EXAMPLE |
| 61 | | | | | | | 2.4 | 30 | 57 | EXAMPLE |
| 62 | | | | | | | 8.6 | 30 | 69 | COMPARATIVE EXAMPLE |
| 63 | | | | | | | 8.5 | 30 | 69 | EXAMPLE |
| 64 | | | | | | | 7.7 | 30 | 46 | EXAMPLE |
| 65 | | | | | | | 7.4 | 30 | 42 | COMPARATIVE EXAMPLE |
| 66 | | | | | | | 9.4 | 30 | 64 | EXAMPLE |
| 67 | | | | | | | 0.9 | 30 | 52 | EXAMPLE |
| 68 | | | | | | | 2.5 | 30 | 38 | COMPARATIVE EXAMPLE |
| 69 | | | | | | | 5.3 | 30 | 51 | EXAMPLE |
| 70 | | | | | | | 6.3 | 30 | 70 | EXAMPLE |

TABLE 3-continued

| | | | | |
|---|---|---|---|---|
| 71 | 3.6 | 30 | 50 | COMPARATIVE EXAMPLE |
| 72 | 7.6 | 30 | 55 | EXAMPLE |
| 73 | 4.8 | 30 | 43 | EXAMPLE |
| 74 | 3.2 | 30 | 36 | COMPARATIVE EXAMPLE |
| 75 | 7.5 | 30 | 39 | EXAMPLE |
| 76 | 5.7 | 30 | 33 | EXAMPLE |
| 77 | 9.0 | 30 | 39 | COMPARATIVE EXAMPLE |
| 78 | 8.9 | 30 | 48 | EXAMPLE |
| 79 | 1.9 | 30 | 38 | EXAMPLE |
| 80 | 22.3 | 30 | 64 | COMPARATIVE EXAMPLE |
| 81 | 4.7 | 30 | 67 | COMPARATIVE EXAMPLE |
| 82 | 4.9 | 30 | 45 | COMPARATIVE EXAMPLE |
| 83 | 2.1 | 30 | 72 | COMPARATIVE EXAMPLE |
| 84 | EXPERIMENT STOPPED BECAUSE SLAB CRACKED DURING HEATING IN HOT ROLLING STEP | | | COMPARATIVE EXAMPLE |
| 85 | 3.4 | 30 | 41 | COMPARATIVE EXAMPLE |
| 86 | EXPERIMENT STOPPED BECAUSE SLAB CRACKED DURING ROLLING IN HOT ROLLING STEP | | | COMPARATIVE EXAMPLE |
| 87 | EXPERIMENT STOPPED BECAUSE SLAB CRACKED IN CASTING STEP | | | COMPARATIVE EXAMPLE |
| 88 | 5.4 | 30 | 65 | COMPARATIVE EXAMPLE |
| 89 | EXPERIMENT STOPPED BECAUSE SLAB CRACKED DURING ROLLING IN HOT ROLLING STEP | | | COMPARATIVE EXAMPLE |
| 90 | 4.9 | 30 | 40 | COMPARATIVE EXAMPLE |
| 91 | 7.8 | 30 | 52 | COMPARATIVE EXAMPLE |
| 92 | 3.0 | 30 | 44 | COMPARATIVE EXAMPLE |
| 93 | 7.7 | 15 | 46 | COMPARATIVE EXAMPLE |
| 94 | 3.0 | 30 | 43 | EXAMPLE |
| 95 | 3.0 | 30 | 45 | COMPARATIVE EXAMPLE |

TABLE 4

| | | | ANNEALING STEP HEATING STEP | | | | | | PREHEATING ZONE | | SOAKING ZONE |
|---|---|---|---|---|---|---|---|---|---|---|---|
| EXPERIMENTAL EXAMPLE | CHEMICAL COMPONENT | AVERAGE HEATING RATE °C./SECOND | MAXIMUM HEATING TEMPERATURE Tm °C. | Ac3 °C. | Ac3 − Tm °C. | Ac1 °C. | Tm − Ac1 °C. | | AIR RATIO | Log (P(H₂O)/ P(H₂)) | Log (P(H₂O)/ P(H₂)) |
| 1 | A | 3.5 | 828 | 839 | 11 | 696 | 132 | | 0.8 | −0.5 | −0.2 |
| 2 | A | 10.5 | 832 | 839 | 7 | 696 | 136 | | 0.9 | −1.0 | −1.3 |
| 3 | A | 3.5 | 909 | 839 | −70 | 696 | 213 | | 0.9 | −0.5 | −0.7 |
| 4 | B | 7.4 | 873 | 863 | −10 | 735 | 138 | | 0.9 | −0.9 | −1.2 |
| 5 | B | 2.2 | 845 | 863 | 18 | 735 | 110 | | 1.0 | −0.7 | −0.9 |
| 6 | B | 2.7 | 826 | 863 | 37 | 735 | 91 | | 0.8 | −0.8 | −0.8 |
| 7 | C | 1.9 | 823 | 848 | 25 | 703 | 120 | | 0.8 | −0.7 | −0.8 |
| 8 | C | 3.2 | 825 | 848 | 23 | 703 | 122 | | 0.9 | −0.8 | −0.7 |
| 9 | C | 1.6 | 841 | 848 | 7 | 703 | 138 | | 0.9 | −0.7 | −0.6 |
| 10 | D | 2.3 | 878 | 876 | −2 | 717 | 161 | | 0.9 | −0.6 | −0.6 |
| 11 | D | 7.6 | 866 | 876 | 10 | 717 | 149 | | 0.7 | −0.8 | −0.7 |
| 12 | D | 2.5 | 838 | 876 | 38 | 717 | 121 | | 0.8 | −0.7 | −0.9 |
| 13 | E | 7.8 | 797 | 823 | 26 | 695 | 102 | | 0.9 | −0.6 | −0.7 |
| 14 | E | 1.5 | 818 | 823 | 5 | 695 | 123 | | 0.9 | −0.7 | −0.6 |
| 15 | E | 2.2 | 799 | 823 | 24 | 695 | 104 | | 0.6 | −0.7 | −0.6 |
| 16 | F | 6.7 | 844 | 859 | 15 | 722 | 122 | | 0.8 | −0.8 | −0.9 |
| 17 | F | 2.8 | 829 | 859 | 30 | 722 | 107 | | 0.8 | −0.7 | −0.6 |
| 18 | F | 3.6 | 844 | 859 | 15 | 722 | 122 | | 0.9 | −0.7 | −0.6 |
| 19 | G | 2.7 | 836 | 855 | 19 | 710 | 126 | | 0.8 | −0.6 | −0.5 |
| 20 | G | 2.4 | 848 | 855 | 7 | 710 | 138 | | 0.8 | −0.8 | −0.8 |
| 21 | G | 7.9 | 844 | 855 | 11 | 710 | 134 | | 0.9 | −0.7 | −0.8 |
| 22 | H | 2.6 | 813 | 822 | 9 | 693 | 120 | | 0.9 | −1.1 | −1.4 |
| 23 | H | 2.5 | 785 | 822 | 37 | 693 | 92 | | 0.9 | −0.8 | −0.7 |
| 24 | H | 2.9 | 758 | 822 | 64 | 693 | 65 | | 0.8 | −0.5 | −0.4 |
| 25 | I | 6.8 | 867 | 883 | 16 | 725 | 142 | | 0.8 | −0.6 | −0.5 |
| 26 | I | 6.8 | 867 | 883 | 16 | 725 | 142 | | 0.8 | −0.8 | −0.5 |
| 27 | I | 1.1 | 863 | 883 | 20 | 725 | 138 | | 0.8 | −1.7 | −1.0 |
| 28 | I | 2.7 | 852 | 883 | 31 | 725 | 127 | | 0.9 | −0.8 | −1.3 |
| 29 | J | 1.5 | 841 | 823 | −18 | 680 | 161 | | 0.9 | −0.8 | −0.7 |
| 30 | J | 3.1 | 796 | 823 | 27 | 680 | 116 | | 0.7 | −0.6 | −0.5 |
| 31 | J | 2.9 | 790 | 823 | 33 | 680 | 110 | | 1.0 | −0.8 | −0.7 |
| 32 | K | 3.4 | 915 | 924 | 9 | 721 | 194 | | 0.8 | −0.5 | −0.7 |
| 33 | K | 1.5 | 895 | 924 | 29 | 721 | 174 | | 1.0 | −0.8 | −0.8 |
| 34 | K | 7.2 | 911 | 924 | 13 | 721 | 190 | | 1.0 | −1.7 | −0.8 |
| 35 | L | 1.8 | 814 | 843 | 29 | 716 | 98 | | 0.9 | −0.8 | −0.9 |
| 36 | L | 7.3 | 818 | 843 | 25 | 716 | 102 | | 0.9 | −0.9 | −1.7 |
| 37 | L | 8.2 | 834 | 843 | 9 | 716 | 118 | | 0.8 | −0.8 | −1.3 |
| 38 | M | 8.3 | 850 | 850 | 0 | 704 | 146 | | 0.8 | −0.8 | −1.4 |
| 39 | M | 8.3 | 850 | 850 | 0 | 704 | 146 | | 0.8 | −0.7 | −1.4 |
| 40 | M | 1.8 | 899 | 850 | −49 | 704 | 195 | | 0.8 | −0.8 | −1.3 |
| 41 | M | 6.8 | 848 | 850 | 2 | 704 | 144 | | 0.8 | −0.6 | −0.7 |

TABLE 4-continued

| | | | | | | | | | |
|---|---|---|---|---|---|---|---|---|---|
| 42 | N | 3.7 | 847 | 855 | 8 | 147 | 0.8 | −0.6 | −0.8 |
| 43 | N | 1.4 | 839 | 855 | 16 | 139 | 0.8 | −0.6 | −0.7 |
| 44 | N | 2.0 | 818 | 855 | 37 | 118 | 0.8 | −0.8 | −0.7 |
| 45 | O | 3.4 | 821 | 856 | 35 | 96 | 0.7 | −0.8 | −0.6 |
| 46 | O | 6.3 | 821 | 856 | 35 | 96 | 0.9 | −0.6 | −0.7 |
| 47 | O | 2.1 | 841 | 856 | 15 | 116 | 1.0 | −0.6 | −0.1 |

| EXPERIMENTAL EXAMPLE | ANNEALING STEP COOLING STEP | | | MARTENSITE TRANSFORMATION TREATMENT | | BAINITE TRANSFORMATION TREATMENT 1 | | REMARKS |
|---|---|---|---|---|---|---|---|---|
| | COOLING RATE 1 °C/SECOND | COOLING RATE 2 °C/SECOND | Ms POINT °C | TREATMENT TEMPERATURE °C | TREATMENT TIME SECOND | TREATMENT TEMPERATURE °C | TREATMENT TIME SECOND | |
| 1 | 5.0 | 29.1 | 381 | | | 415 | 32 | EXAMPLE |
| 2 | 4.2 | 13.3 | 383 | | | 471 | 138 | EXAMPLE |
| 3 | 2.8 | 7.4 | 354 | | | | | EXAMPLE |
| 4 | 10.5 | 13.0 | 351 | | | | | EXAMPLE |
| 5 | 6.0 | 28.4 | 306 | 345 | 13 | 459 | 24 | COMPARATIVE EXAMPLE |
| 6 | 4.4 | 11.5 | 298 | | | | | EXAMPLE |
| 7 | 5.1 | 104.0 | 403 | | | | | EXAMPLE |
| 8 | 6.0 | 29.3 | 407 | 392 | 18 | 491 | 17 | EXAMPLE |
| 9 | 4.8 | 28.2 | 420 | | | | | COMPARATIVE EXAMPLE |
| 10 | 3.4 | 29.8 | 421 | 401 | 7 | 429 | 157 | EXAMPLE |
| 11 | 6.1 | 47.2 | 423 | | | 453 | 23 | EXAMPLE |
| 12 | 4.8 | 11.6 | 401 | | | 481 | 19 | EXAMPLE |
| 13 | 2.9 | 61.1 | 335 | | | 395 | 63 | EXAMPLE |
| 14 | 5.5 | 11.9 | 378 | 354 | 18 | 489 | 49 | EXAMPLE |
| 15 | 6.0 | 37.6 | 346 | | | | | COMPARATIVE EXAMPLE |
| 16 | 4.3 | 6.1 | 343 | 298 | 27 | | | EXAMPLE |
| 17 | 4.9 | 62.4 | 315 | | | 498 | 13 | EXAMPLE |
| 18 | 3.9 | 110.4 | 336 | | | | | COMPARATIVE EXAMPLE |
| 19 | 5.2 | 87.2 | 333 | | | 387 | 46 | EXAMPLE |
| 20 | 3.7 | 44.2 | 337 | | | 458 | 27 | EXAMPLE |
| 21 | 1.3 | 11.4 | 204 | | | 463 | 30 | COMPARATIVE EXAMPLE |
| 22 | 4.8 | 12.2 | 360 | | | | | EXAMPLE |
| 23 | 5.5 | 36.4 | 316 | | | 480 | 17 | EXAMPLE |

TABLE 4-continued

| | | | | | | | |
|---|---|---|---|---|---|---|---|
| 24 | 4.6 | 83.9 | 331 | | | 468 | 13 | COMPARATIVE EXAMPLE |
| 25 | 5.0 | 29.3 | 381 | 263 | 43 | 409 | 27 | COMPARATIVE EXAMPLE |
| 26 | 5.0 | 29.3 | 381 | 263 | 43 | 409 | 27 | EXAMPLE |
| 27 | 4.3 | 84.5 | 372 | | | 388 | 84 | EXAMPLE |
| 28 | 4.6 | 72.8 | 353 | | | 374 | 77 | EXAMPLE |
| 29 | 16.0 | 106.4 | 377 | 346 | 9 | 431 | 56 | EXAMPLE |
| 30 | 3.8 | 8.3 | 356 | | | | | EXAMPLE |
| 31 | 5.6 | 11.3 | 359 | | | 392 | 183 | COMPARATIVE EXAMPLE |
| 32 | 25.5 | 21.9 | 414 | | | | | EXAMPLE |
| 33 | 5.2 | 96.0 | 404 | | | 473 | 36 | EXAMPLE |
| 34 | 3.7 | 2.8 | 385 | | | 457 | 16 | COMPARATIVE EXAMPLE |
| 35 | 4.9 | 11.5 | 306 | 304 | 8 | 416 | 17 | EXAMPLE |
| 36 | 5.6 | 66.3 | 325 | | | 483 | 45 | EXAMPLE |
| 37 | 3.3 | 25.5 | 298 | | | 465 | 22 | EXAMPLE |
| 38 | 4.5 | 11.5 | 415 | 405 | 18 | 445 | 19 | COMPARATIVE EXAMPLE |
| 39 | 4.5 | 11.5 | 415 | 405 | 18 | 445 | 19 | EXAMPLE |
| 40 | 3.0 | 58.5 | 392 | 302 | 23 | | | EXAMPLE |
| 41 | 5.6 | 84.5 | 417 | | | 480 | 47 | EXAMPLE |
| 42 | 5.6 | 39.8 | 401 | | | 473 | 35 | EXAMPLE |
| 43 | 4.8 | 82.4 | 394 | 358 | 8 | | | EXAMPLE |
| 44 | 3.7 | 12.4 | 384 | 373 | 9 | 469 | 14 | COMPARATIVE EXAMPLE |
| 45 | 8.0 | 28.4 | 297 | | | | | EXAMPLE |
| 46 | 6.3 | 68.0 | 290 | | | | | EXAMPLE |
| 47 | 4.5 | 68.9 | 328 | | | 454 | 105 | COMPARATIVE EXAMPLE |

TABLE 5

| EXPERIMENTAL EXAMPLE | CHEMICAL COMPONENT | AVERAGE HEATING RATE °C./SECOND | ANNEALING STEP HEATING STEP | | | | | | PREHEATING ZONE | | SOAKING ZONE |
|---|---|---|---|---|---|---|---|---|---|---|---|
| | | | MAXIMUM HEATING TEMPERATURE Tm °C. | Ac3 °C. | Ac3 − Tm °C. | Ac1 °C. | Tm − Ac1 °C. | | AIR RATIO | Log (P(H₂O)/P(H₂)) | Log (P(H₂O)/P(H₂)) |
| 48 | P | 7.7 | 824 | 834 | 10 | 707 | 117 | | 1.0 | −0.7 | −0.8 |
| 49 | P | 2.8 | 831 | 834 | 3 | 707 | 124 | | 0.9 | −0.6 | −0.6 |
| 50 | P | 6.9 | 806 | 834 | 28 | 707 | 99 | | 0.8 | −0.9 | <u>−1.8</u> |
| 51 | Q | 3.8 | 874 | 882 | 8 | 721 | 153 | | 0.8 | −0.8 | <u>−0.9</u> |
| 52 | Q | 1.2 | 876 | 882 | 6 | 721 | 155 | | 1.0 | −1.0 | −1.5 |
| 53 | Q | 6.3 | 856 | 882 | 26 | 721 | 135 | | <u>0.6</u> | −0.8 | −1.2 |
| 54 | R | 2.6 | 977 | 978 | 1 | 732 | 245 | | 1.0 | −0.9 | −1.3 |
| 55 | R | 2.9 | 975 | 978 | 3 | 732 | 243 | | 0.9 | −0.6 | −0.6 |
| 56 | R | 4.7 | 948 | 978 | 30 | 732 | 216 | | 0.9 | −0.7 | −0.7 |
| 57 | S | 7.1 | 824 | 834 | 10 | 689 | 135 | | 0.8 | −0.8 | −1.0 |
| 58 | S | 3.2 | 793 | 834 | 41 | 689 | 104 | | 0.9 | −0.7 | −0.7 |
| 59 | S | 7.9 | 772 | 834 | <u>62</u> | 689 | 83 | | 0.8 | −0.6 | −0.8 |
| 60 | T | 7.7 | 977 | 999 | 22 | 745 | 232 | | 0.8 | −0.7 | −0.7 |
| 61 | T | 7.1 | 974 | 999 | 25 | 745 | 229 | | 1.0 | −0.8 | −1.1 |
| 62 | T | 8.1 | 969 | 999 | 30 | 745 | 224 | | 0.8 | −0.8 | −1.2 |
| 63 | U | 2.9 | 830 | 861 | 31 | 711 | 119 | | 0.8 | −0.6 | −0.5 |
| 64 | U | 1.4 | 848 | 861 | 13 | 711 | 137 | | 0.8 | −0.8 | −0.8 |
| 65 | U | 2.9 | 827 | 861 | 34 | 711 | 116 | | <u>1.1</u> | −0.8 | −0.9 |
| 66 | V | 10.6 | 835 | 852 | 17 | 716 | 119 | | 1.0 | −0.7 | −0.6 |
| 67 | V | 12.0 | 844 | 852 | 8 | 716 | 128 | | 0.8 | −0.6 | −0.8 |
| 68 | V | <u>0.3</u> | 842 | 852 | 10 | 716 | 126 | | 0.8 | −0.8 | −0.6 |
| 69 | W | 8.1 | 835 | 866 | 31 | 738 | 97 | | 0.8 | −0.6 | −0.7 |
| 70 | W | 2.1 | 836 | 866 | 30 | 738 | 98 | | 0.8 | −0.4 | −0.3 |
| 71 | W | 3.4 | 864 | 866 | 2 | 738 | 126 | | 0.8 | −0.7 | −0.8 |
| 72 | X | 1.6 | 829 | 831 | 2 | 712 | 117 | | 1.0 | −0.6 | −0.8 |
| 73 | X | 2.7 | 804 | 831 | 27 | 712 | 92 | | 0.9 | −0.8 | −0.6 |
| 74 | X | <u>0.5</u> | 803 | 831 | 28 | 712 | 91 | | 1.0 | −0.6 | −0.4 |
| 75 | Y | <u>7.5</u> | 815 | 837 | 22 | 698 | 117 | | 0.8 | −0.2 | −0.5 |
| 76 | Y | 6.6 | 867 | 837 | −30 | 698 | 169 | | 1.0 | −0.8 | −0.6 |
| 77 | Y | 3.0 | 836 | 837 | 1 | 698 | 138 | | 0.8 | −0.8 | −0.6 |
| 78 | Z | 8.3 | 825 | 863 | 38 | 711 | 114 | | 0.9 | <u>−0.1</u> | −1.3 |
| 79 | Z | 7.2 | 853 | 863 | 10 | 711 | 142 | | 0.9 | <u>−1.0</u> | −0.3 |
| 80 | Z | 3.2 | 848 | 863 | 15 | 711 | 137 | | 0.9 | −0.6 | −0.7 |
| 81 | AA | 7.4 | 847 | 852 | 5 | 833 | 14 | | 0.9 | −0.7 | −0.7 |
| 82 | AB | 2.1 | 796 | 804 | 8 | 702 | 94 | | 0.8 | −0.8 | −0.6 |
| 83 | AC | 7.1 | 797 | 809 | 12 | 671 | 126 | | 0.9 | −0.7 | −0.8 |
| 84 | AD | | | | EXPERIMENT STOPPED | | | | | | |
| 85 | AE | 2.6 | 885 | 909 | 24 | 710 | 175 | | 0.9 | −0.8 | −0.7 |
| 86 | AF | | | | EXPERIMENT STOPPED | | | | | | |
| 87 | AG | | | | EXPERIMENT STOPPED | | | | | | |
| 88 | AH | 2.7 | 857 | 873 | 16 | 728 | 129 | | 0.9 | −0.7 | −0.6 |

TABLE 5-continued

| | | | | | | | EXPERIMENT STOPPED | | | |
|---|---|---|---|---|---|---|---|---|---|---|
| 89 | AI | 2.3 | 859 | | 2 | | 714 | 145 | 0.8 | −0.8 | −0.7 |
| 90 | AJ | 7.1 | 814 | 861 | 16 | 145 | 690 | 124 | 0.9 | −0.7 | −0.6 |
| 91 | AK | 8.9 | 833 | 830 | 6 | 124 | 696 | 137 | 0.7 | −1.8 | −1.2 |
| 92 | A | 2.2 | 850 | 839 | 11 | 139 | 711 | 139 | 0.9 | −0.7 | −0.6 |
| 93 | U | 45.0 | 830 | 861 | 9 | 134 | 696 | 134 | 0.9 | −0.8 | −0.7 |
| 94 | A | 55.0 | 828 | 839 | 11 | 132 | 696 | 132 | 0.8 | −0.7 | −0.6 |
| 95 | A | | | 839 | | | | | | | |

| | | | | ANNEALING STEP COOLING STEP | | | | | |
|---|---|---|---|---|---|---|---|---|---|
| | | | | | MARTENSITE TRANSFORMATION TREATMENT | | BAINITE TRANSFORMATION TREATMENT 1 | | |
| EXPERIMENTAL EXAMPLE | COOLING RATE 1 °C/SECOND | COOLING RATE 2 °C/SECOND | Ms POINT °C | TREATMENT TEMPERATURE °C | TREATMENT TIME SECOND | TREATMENT TEMPERATURE °C | TREATMENT TIME SECOND | REMARKS |
| 48 | 5.6 | 23.8 | 322 | | | 427 | 69 | EXAMPLE |
| 49 | 3.4 | 25.8 | 316 | | | 459 | 35 | EXAMPLE |
| 50 | 5.8 | 68.5 | 292 | | | | | COMPARATIVE EXAMPLE |
| 51 | 3.9 | 5.8 | 443 | | | 453 | 287 | EXAMPLE |
| 52 | 4.8 | 72.0 | 448 | 426 | 6 | 448 | 22 | EXAMPLE |
| 53 | 6.3 | 29.6 | 442 | | | | | COMPARATIVE EXAMPLE |
| 54 | 6.3 | 85.8 | 431 | | | 464 | 49 | EXAMPLE |
| 55 | 3.8 | 13.6 | 426 | | | 481 | 81 | EXAMPLE |
| 56 | 6.0 | 13.2 | 420 | 366 | 14 | | | COMPARATIVE EXAMPLE |
| 57 | 4.4 | 13.0 | 391 | | | 435 | 38 | EXAMPLE |
| 58 | 7.5 | 11.8 | 363 | | | 465 | 67 | EXAMPLE |
| 59 | 3.8 | 29.8 | 260 | | | | | COMPARATIVE EXAMPLE |
| 60 | 5.8 | 13.4 | 392 | 351 | 12 | 471 | 19 | EXAMPLE |
| 61 | 6.0 | 13.1 | 389 | | | 488 | 25 | EXAMPLE |
| 62 | 5.8 | 3.5 | 354 | | | | | COMPARATIVE EXAMPLE |
| 63 | 5.1 | 11.7 | 419 | 387 | 38 | 461 | 17 | EXAMPLE |
| 64 | 4.1 | 60.5 | 426 | | | 465 | 42 | EXAMPLE |
| 65 | 5.8 | 12.4 | 413 | | | 462 | 125 | COMPARATIVE EXAMPLE |
| 66 | 5.8 | 46.5 | 405 | | | 492 | 15 | EXAMPLE |
| 67 | 5.2 | 66.5 | 414 | | | | | EXAMPLE |

TABLE 5-continued

| | | | | | | |
|---|---|---|---|---|---|---|
| 68 | 4.9 | 78.4 | 407 | | 495 | 20 | COMPARATIVE EXAMPLE |
| 69 | 5.8 | 12.0 | 419 | | 489 | 47 | EXAMPLE |
| 70 | 4.8 | 68.5 | 398 | | 464 | 75 | EXAMPLE |
| 71 | 2.0 | 11.9 | 187 | | | | COMPARATIVE EXAMPLE |
| 72 | 4.4 | 96.0 | 352 | | | | EXAMPLE |
| 73 | 4.4 | 39.5 | 290 | 317 | 359 | 135 | EXAMPLE |
| 74 | 6.1 | 40.1 | 305 | 268 | | | COMPARATIVE EXAMPLE |
| 75 | 5.5 | 11.5 | 402 | | | | EXAMPLE |
| 76 | 3.5 | 10.2 | 410 | | | | EXAMPLE |
| 77 | 5.8 | 12.6 | 419 | | 445 | 102 | COMPARATIVE EXAMPLE |
| 78 | 7.2 | 12.7 | 429 | | 483 | 36 | EXAMPLE |
| 79 | 4.4 | 11.8 | 441 | 22 | 471 | 15 | EXAMPLE |
| 80 | 4.9 | 32.2 | 437 | 8 | | | COMPARATIVE EXAMPLE |
| 81 | 6.1 | 13.5 | — | | | | COMPARATIVE EXAMPLE |
| 82 | 5.7 | 13.5 | 247 | 18 | | | EXAMPLE |
| 83 | 3.9 | 13.5 | 361 | 18 | 488 | 73 | EXAMPLE |
| 84 | | | EXPERIMENT STOPPED | | | | COMPARATIVE EXAMPLE |
| 85 | 5.4 | 68.0 | 254 | | | | EXAMPLE |
| 86 | | | EXPERIMENT STOPPED | | | | COMPARATIVE EXAMPLE |
| 87 | | | EXPERIMENT STOPPED | | | | EXAMPLE |
| 88 | 4.3 | 41.0 | 373 | | | | COMPARATIVE EXAMPLE |
| 89 | | | EXPERIMENT STOPPED | | | | EXAMPLE |
| 90 | 5.1 | 31.4 | 401 | | 462 | 26 | COMPARATIVE EXAMPLE |

TABLE 5-continued

| | | | | |
|---|---|---|---|---|
| 91 | 6.0 | 26.7 | 368 | 459 | 123 | COMPARATIVE EXAMPLE |
| 92 | 4.2 | 13.3 | 383 | 471 | 138 | COMPARATIVE EXAMPLE |
| 93 | 4.0 | 55.4 | 426 | 464 | 38 | COMPARATIVE EXAMPLE |
| 94 | 3.8 | 12.5 | 383 | 472 | 135 | COMPARATIVE EXAMPLE |
| 95 | 3.9 | 13.6 | 383 | 473 | 136 | |

TABLE 6

| EXPERI-MENTAL EXAMPLE | PLATING STEP PLATING BATH | | | COOLING STEP AFTER PLATING | | | | | | | WORKING STEP BENDING-UNBENDING WORKING STEP | | COLD ROLLING | REMARKS |
|---|---|---|---|---|---|---|---|---|---|---|---|---|---|---|
| | EFFECTIVE Al AMOUNT MASS % | BATH TEMPER-ATURE °C. | STEEL SHEET ENTRANCE TEMPERATURE °C. | COOLING RATE 3 (TO 350°C.) °C./SECOND | COOLING RATE 4 (350 TO 250°C.) °C./SECOND | BAINITE TRANSFORMATION TREATMENT 2 | | REHEAT TREATMENT | | ROLL DIAMETER mm | NUMBER OF TIMES OF WORKING TIMES | REDUC-TION RATIO % | |
| | | | | | | TREATMENT TEMPER-ATURE °C. | TREAT-MENT TIME SECOND | TREATMENT TEMPER-ATURE °C. | TREAT-MENT TIME SECOND | | | | |
| 1 | 0.191 | 445 | 439 | 1.6 | 5.1 | | | | | 350 | 2 | — | EXAMPLE |
| 2 | 0.202 | 452 | 446 | 1.8 | 3.2 | | | | | 350 | 2 | 0.07 | EXAMPLE |
| 3 | 0.192 | 451 | 469 | 1.3 | 4.0 | | | | | 350 | 2 | 0.28 | EXAMPLE |
| 4 | 0.182 | 455 | 462 | 1.2 | 1.6 | | | | | 350 | 2 | 0.44 | EXAMPLE |
| 5 | 0.194 | 449 | 444 | 1.7 | 5.3 | | | | | 350 | 2 | 0.27 | EXAMPLE |
| 6 | 0.209 | 455 | 453 | 1.9 | 4.6 | | | | | 350 | 2 | 0.09 | COMPAR-ATIVE EXAMPLE |
| 7 | 0.218 | 447 | 450 | 2.5 | 5.3 | | | | | 150 | 2 | 0.44 | EXAMPLE |
| 8 | 0.213 | 458 | 464 | 1.7 | 1.2 | | | | | 350 | 2 | 0.47 | EXAMPLE |
| 9 | 0.182 | 457 | 452 | 0.5 | 5.5 | | | | | 350 | 2 | 0.20 | COMPAR-ATIVE EXAMPLE |
| 10 | 0.215 | 449 | 454 | 2.2 | 4.0 | | | | | 350 | 2 | 0.18 | EXAMPLE |
| 11 | 0.182 | 452 | 464 | 1.1 | 6.1 | | | | | 100 | 2 | 0.06 | EXAMPLE |
| 12 | 0.236 | 448 | 451 | 7.1 | 4.9 | | | | | 350 | 2 | 0.47 | EXAMPLE |
| 13 | 0.209 | 450 | 437 | 2.7 | 7.2 | | | 305 | 14 | 350 | 2 | 0.34 | EXAMPLE |
| 14 | 0.224 | 455 | 457 | 3.7 | 5.0 | | | 258 | 71 | 350 | 4 | 0.29 | EXAMPLE |
| 15 | 0.215 | 446 | 439 | 3.8 | 4.2 | | | 316 | 13 | 350 | 2 | 0.13 | COMPAR-ATIVE EXAMPLE |
| 16 | 0.197 | 441 | 443 | 2.0 | 0.7 | 327 | 36 | 324 | 28 | 350 | 2 | 0.05 | EXAMPLE |
| 17 | 0.180 | 455 | 453 | 1.0 | 1.2 | | | 341 | 28 | 350 | 2 | 0.36 | EXAMPLE |
| 18 | 0.203 | 441 | 444 | 2.2 | 5.4 | | | | | 350 | 2 | 0.24 | COMPAR-ATIVE EXAMPLE |
| 19 | 0.199 | 455 | 452 | 1.4 | 0.3 | 281 | 126 | 324 | 28 | 350 | 2 | 0.19 | EXAMPLE |
| 20 | 0.182 | 448 | 434 | 1.5 | 6.0 | | | | | 350 | 2 | — | EXAMPLE |
| 21 | 0.196 | 455 | 462 | 1.3 | 2.4 | | | | | 350 | 2 | 0.35 | COMPAR-ATIVE EXAMPLE |
| 22 | 0.185 | 450 | 455 | 1.3 | 8.0 | 342 | 27 | 336 | 19 | 350 | 2 | 0.44 | EXAMPLE |
| 23 | 0.183 | 443 | 451 | 1.1 | 1.9 | | | 334 | 16 | 350 | 2 | 0.13 | EXAMPLE |
| 24 | 0.203 | 457 | 458 | 1.4 | 5.7 | | | | | 350 | 2 | 0.15 | EXAMPLE |
| 25 | 0.227 | 455 | 461 | 2.3 | 2.5 | | | | | 350 | 2 | 0.05 | COMPAR-ATIVE EXAMPLE |
| 26 | 0.227 | 455 | 461 | 2.3 | 2.5 | | | | | 350 | 2 | 0.05 | EXAMPLE |

Additional entries from reheat treatment column (rows 5, 6, 8): 327/26, 328/30, 325/312, 342/209

TABLE 6-continued

| | PLATING STEP | | COOLING STEP AFTER PLATING | | | | | | | WORKING STEP | | | |
|---|---|---|---|---|---|---|---|---|---|---|---|---|---|
| | PLATING BATH | | | | BAINITE TRANSFORMATION TREATMENT 2 | | REHEAT TREATMENT | | BENDING-UNBENDING WORKING STEP | | COLD ROLLING | | |
| EXPERI-MENTAL EXAMPLE | EFFECTIVE Al AMOUNT MASS % | BATH TEMPER-ATURE °C. | STEEL SHEET ENTRANCE TEMPERATURE °C. | COOLING RATE 3 (TO 350° C.) °C./ SECOND | COOLING RATE 4 (350 TO 250° C.) °C./ SECOND | TREATMENT TEMPER-ATURE °C. | TREAT-MENT TIME SECOND | TREATMENT TEMPER-ATURE °C. | TREAT-MENT TIME SECOND | ROLL DIAMETER mm | NUMBER OF TIMES OF WORKING TIMES | REDUC-TION RATIO % | REMARKS |
| 27 | 0.216 | 452 | 456 | 2.0 | 6.2 | | | | | 350 | 2 | 0.32 | EXAMPLE |
| 28 | 0.204 | 447 | 441 | 5.5 | 5.3 | | | | | 350 | 2 | 0.22 | EXAMPLE |
| 29 | 0.189 | 450 | 446 | 1.4 | 4.7 | | | | | 350 | 2 | 0.03 | EXAMPLE |
| 30 | 0.188 | 450 | 455 | 1.4 | 2.8 | | | | | 350 | 2 | 0.22 | EXAMPLE |
| 31 | 0.001 | 453 | 456 | 1.5 | 3.9 | 337 | 149 | 316 | 19 | 350 | 2 | 0.11 | COMPAR-ATIVE EXAMPLE |
| 32 | 0.214 | 448 | 446 | 2.3 | 7.5 | | | 285 | 427 | 350 | 2 | 0.43 | EXAMPLE |
| 33 | 0.204 | 456 | 461 | 1.6 | 5.4 | 322 | 21 | | | 350 | 2 | 0.08 | EXAMPLE |
| 34 | 0.258 | 442 | 439 | 1.3 | 2.8 | | | | | 350 | 2 | 0.15 | COMPAR-ATIVE EXAMPLE |
| 35 | 0.185 | 454 | 450 | 1.4 | 7.2 | | | | | 350 | 2 | 1.15 | EXAMPLE |
| 36 | 0.204 | 449 | 444 | 2.1 | 1.9 | | | | | 350 | 2 | 0.25 | EXAMPLE |
| 37 | 0.258 | 446 | 448 | 2.0 | 5.2 | | | | | 350 | 2 | 0.33 | COMPAR-ATIVE EXAMPLE |
| 38 | 0.199 | 442 | 437 | 2.1 | 6.3 | | | 268 | 40 | 350 | 2 | 0.05 | COMPAR-ATIVE EXAMPLE |
| 39 | 0.199 | 442 | 437 | 2.1 | 6.3 | | | 268 | 40 | 350 | 2 | 0.05 | EXAMPLE |
| 40 | 0.182 | 441 | 444 | 1.3 | 2.6 | | | | | 500 | 2 | 0.26 | EXAMPLE |
| 41 | 0.224 | 456 | 449 | 2.0 | 5.9 | | | 270 | 17 | 350 | 2 | 0.41 | EXAMPLE |
| 42 | 0.212 | 448 | 443 | 2.7 | 6.0 | | | 333 | 33 | 350 | 2 | 0.31 | EXAMPLE |
| 43 | 0.182 | 444 | 452 | 1.1 | 2.8 | 347 | 23 | 298 | 20 | 350 | 2 | 0.22 | EXAMPLE |
| 44 | 0.187 | 458 | 460 | 1.0 | 7.1 | | | | | 350 | 2 | 0.37 | COMPAR-ATIVE EXAMPLE |
| 45 | 0.225 | 449 | 447 | 2.7 | 5.6 | | | 347 | 31 | 350 | 2 | 0.28 | EXAMPLE |
| 46 | 0.224 | 456 | 455 | 2.5 | 1.3 | 303 | 255 | | | 350 | 2 | 0.41 | EXAMPLE |
| 47 | 0.184 | 457 | 463 | 1.1 | 5.2 | | | | | 350 | 2 | 0.43 | COMPAR-ATIVE EXAMPLE |

TABLE 7

| EXPERIMENTAL EXAMPLE | PLATING STEP EFFECTIVE Al AMOUNT MASS % | PLATING BATH BATH TEMPERATURE °C. | PLATING BATH STEEL SHEET ENTRANCE TEMPERATURE °C. | COOLING STEP AFTER PLATING COOLING RATE 3 (TO 350° C.) °C./SECOND | COOLING RATE 4 (350 TO 250° C.) °C./SECOND | BAINITE TRANSFORMATION TREATMENT 2 TREATMENT TEMPERATURE °C. | TREATMENT TIME SECOND | REHEAT TREATMENT TREATMENT TEMPERATURE °C. | TREATMENT TIME SECOND | WORKING STEP BENDING-UNBENDING WORKING STEP ROLL DIAMETER mm | NUMBER OF TIMES OF WORKING TIMES | COLD ROLLING REDUCTION RATIO % | REMARKS |
|---|---|---|---|---|---|---|---|---|---|---|---|---|---|
| 48 | 0.208 | 456 | 462 | 1.8 | 3.3 | | | | | 750 | 2 | 0.08 | EXAMPLE |
| 49 | 0.216 | 450 | 455 | 2.0 | 8.3 | 341 | 88 | 280 | 63 | 350 | 2 | 0.40 | EXAMPLE |
| 50 | 0.208 | 449 | 444 | 2.6 | 1.3 | | | | | 350 | 2 | 0.28 | COMPARATIVE EXAMPLE |
| 51 | 0.209 | 457 | 455 | 1.9 | 6.1 | | | | | 350 | 2 | — | EXAMPLE |
| 52 | 0.193 | 452 | 459 | 1.6 | 7.2 | 327 | 233 | | | 600 | 2 | 0.07 | EXAMPLE |
| 53 | 0.212 | 457 | 459 | 1.8 | 1.6 | | | | | 350 | 2 | 0.21 | COMPARATIVE EXAMPLE |
| 54 | 0.189 | 458 | 451 | 1.1 | 5.3 | | | | | 350 | 2 | 0.74 | EXAMPLE |
| 55 | 0.198 | 447 | 453 | 1.7 | 3.9 | 296 | 83 | 291 | 72 | 350 | 2 | 0.41 | EXAMPLE |
| 56 | 0.176 | 455 | 453 | 2.0 | 6.4 | | | | | 350 | 2 | 0.38 | COMPARATIVE EXAMPLE |
| 57 | 0.195 | 442 | 435 | 1.8 | 8.4 | | | | | 350 | 2 | 0.16 | EXAMPLE |
| 58 | 0.249 | 454 | 464 | 4.0 | 0.9 | | | 310 | 17 | 500 | 8 | 0.38 | EXAMPLE |
| 59 | 0.212 | 448 | 453 | 2.3 | 5.5 | | | | | 350 | 2 | 0.23 | COMPARATIVE EXAMPLE |
| 60 | 0.188 | 453 | 447 | 1.3 | 5.8 | | | | | 350 | 2 | — | EXAMPLE |
| 61 | 0.210 | 456 | 449 | 1.9 | 2.1 | 287 | 28 | | | 350 | 2 | 0.34 | EXAMPLE |
| 62 | 0.182 | 451 | 457 | 1.1 | 6.3 | | | | | 350 | 2 | 0.24 | COMPARATIVE EXAMPLE |
| 63 | 0.212 | 457 | 449 | 2.3 | 6.3 | | | | | 350 | 2 | 0.14 | EXAMPLE |
| 64 | 0.184 | 452 | 448 | 1.4 | 7.8 | | | | | 350 | 2 | 0.44 | EXAMPLE |
| 65 | 0.219 | 457 | 458 | 1.7 | 6.2 | | | | | 350 | 2 | 0.30 | COMPARATIVE EXAMPLE |
| 66 | 0.186 | 451 | 454 | 1.1 | 1.0 | 302 | 75 | 318 | 21 | 350 | 2 | 0.22 | EXAMPLE |
| 67 | 0.224 | 447 | 450 | 2.7 | 1.9 | 326 | 36 | | | 350 | 2 | 0.59 | EXAMPLE |
| 68 | 0.206 | 442 | 449 | 2.1 | 2.8 | 267 | 23 | | | 350 | 2 | 0.12 | COMPARATIVE EXAMPLE |
| 69 | 0.205 | 441 | 448 | 2.2 | 6.0 | | | | | 350 | 2 | 0.45 | EXAMPLE |
| 70 | 0.217 | 451 | 445 | 2.3 | 7.0 | | | | | 350 | 4 | 0.35 | EXAMPLE |
| 71 | 0.195 | 444 | 441 | 1.7 | 5.5 | | | | | 350 | 2 | 0.40 | COMPARATIVE EXAMPLE |

TABLE 7-continued

| EXPERI-MENTAL EXAMPLE | PLATING STEP PLATING BATH | | | COOLING STEP AFTER PLATING | | | BAINITE TRANSFORMATION TREATMENT 2 | | REHEAT TREATMENT | | WORKING STEP BENDING-UNBENDING WORKING STEP | | COLD ROLLING | REMARKS |
|---|---|---|---|---|---|---|---|---|---|---|---|---|---|---|
| | EFFECTIVE Al AMOUNT MASS % | BATH TEMPER-ATURE °C | STEEL SHEET ENTRANCE TEMPERATURE °C | COOLING RATE 3 (TO 350°C) °C/SECOND | COOLING RATE 4 (350 TO 250°C) °C/SECOND | | TREATMENT TEMPER-ATURE °C | TREAT-MENT TIME SECOND | TREATMENT TEMPER-ATURE °C | TREAT-MENT TIME SECOND | ROLL DIAMETER mm | NUMBER OF TIMES OF WORKING TIMES | REDUC-TION RATIO % | |
| 72 | 0.202 | 442 | 440 | 3.0 | 7.7 | | | | | | 350 | 2 | 0.34 | EXAMPLE |
| 73 | 0.201 | 457 | 457 | 1.5 | 1.9 | | | | | | 750 | 2 | 0.15 | EXAMPLE |
| 74 | 0.225 | 442 | 442 | 3.3 | 1.4 | | | | | | 350 | 2 | 0.31 | COMPAR-ATIVE EXAMPLE |
| 75 | 0.228 | 451 | 433 | 4.0 | 1.4 | | 319 | 113 | 274 | 8 | 350 | 2 | 0.43 | EXAMPLE |
| 76 | 0.208 | 449 | 449 | 2.0 | 6.4 | | 336 | 44 | | | 350 | 2 | 0.18 | EXAMPLE |
| 77 | 0.188 | 453 | 449 | 1.4 | 6.3 | | | | | | 350 | 2 | 0.15 | COMPAR-ATIVE EXAMPLE |
| 78 | 0.212 | 443 | 436 | 2.9 | 1.7 | | 345 | 67 | 328 | 16 | 350 | 8 | 0.41 | EXAMPLE |
| 79 | 0.202 | 455 | 458 | 1.7 | 1.5 | | | | | | 350 | 2 | 0.44 | EXAMPLE |
| 80 | 0.220 | 445 | 443 | 2.9 | 5.1 | | 282 | 23 | | | 350 | 2 | 0.23 | COMPAR-ATIVE EXAMPLE |
| 81 | 0.204 | 442 | 435 | 2.4 | 6.2 | | 306 | 29 | | | 350 | 2 | 0.26 | COMPAR-ATIVE EXAMPLE |
| 82 | 0.217 | 441 | 453 | 3.4 | 7.2 | | | | 341 | 31 | 350 | 2 | 0.28 | COMPAR-ATIVE EXAMPLE |
| 83 | 0.193 | 441 | 441 | 1.7 | 9.1 | | | | | | 350 | 2 | 0.47 | EXAMPLE |
| 84 | | | | | | | | | | | | | | COMPAR-ATIVE EXAMPLE |
| 85 | 0.198 | 450 | 451 | 1.7 | 5.7 | | | | | | 350 | 2 | 0.20 | COMPAR-ATIVE EXAMPLE |
| 86 | | | | | | | | | | | | | | EXAMPLE |
| 87 | | | | | | | | | | | | | | COMPAR-ATIVE EXAMPLE |
| 88 | 0.206 | 450 | 454 | 1.9 | 5.3 | | | | 337 | 36 | 350 | 2 | — | COMPAR-ATIVE EXAMPLE |
| 89 | | | | | | | | | | | | | | COMPAR-ATIVE EXAMPLE |

TABLE 7-continued

| | PLATING STEP PLATING BATH | | | COOLING STEP AFTER PLATING | | BAINITE TRANSFORMATION TREATMENT 2 | | REHEAT TREATMENT | | WORKING STEP BENDING-UNBENDING WORKING STEP | | COLD ROLLING | |
|---|---|---|---|---|---|---|---|---|---|---|---|---|---|
| EXPERI-MENTAL EXAMPLE | EFFECTIVE Al AMOUNT MASS % | BATH TEMPER-ATURE ° C. | STEEL SHEET ENTRANCE TEMPERATURE ° C. | COOLING RATE 3 (TO 350° C.) ° C./SECOND | COOLING RATE 4 (350 TO 250° C.) ° C./SECOND | TREATMENT TEMPER-ATURE ° C. | TREAT-MENT TIME SECOND | TREATMENT TEMPER-ATURE ° C. | TREAT-MENT TIME SECOND | ROLL DIAMETER mm | NUMBER OF TIMES OF WORKING TIMES | REDUC-TION RATIO % | REMARKS |
| 90 | 0.192 | 455 | 455 | 1.4 | 5.6 | | | 321 | 33 | 350 | 2 | — | COMPAR-ATIVE EXAMPLE |
| 91 | 0.193 | 448 | 455 | 1.4 | 1.9 | | | | | 350 | 2 | — | COMPAR-ATIVE EXAMPLE |
| 92 | 0.202 | 452 | 446 | 1.8 | 3.2 | | | | | 350 | 2 | 0.07 | COMPAR-ATIVE EXAMPLE |
| 93 | 0.186 | 453 | 450 | 1.4 | 7.8 | | | | | 350 | 2 | 0.44 | COMPAR-ATIVE EXAMPLE |
| 94 | 0.198 | 451 | 450 | 1.7 | 2.8 | | | | | 350 | 2 | 0.08 | COMPAR-ATIVE EXAMPLE |
| 95 | 0.194 | 450 | 449 | 1.9 | 2.5 | | | | | 350 | 2 | 0.09 | COMPAR-ATIVE EXAMPLE |

TABLE 8

| | | MICROSTRUCTURE | | | | | | | | | | |
|---|---|---|---|---|---|---|---|---|---|---|---|---|
| | | ¼ THICKNESS STRUCTURAL FRACTION | | | | | | | BASE IRON SURFACE LAYER | | | |
| | | | | | | | | | STRUCTURAL FRACTION | | | |
| EXPERIMENTAL EXAMPLE | CHEMICAL COMPONENT | FERRITE % | BAINITE % | BAINITIC FERRITE % | MARTENSITE % | TEMPERED MARTENSITE % | RETAINED AUSTENITE % | OTHERS % | HARD STRUCTURE V1 % | RETAINED AUSTENITE % | HARD STRUCTURE V2 % | V1/V2 | OXIDE AT BOUNDARY AND/OR WITHIN GRAIN |
| 1 | A | 21 | 43 | 6 | 5 | 23 | 0 | 2 | 77 | 1 | 13 | 0.17 | PRESENT |
| 2 | A | 18 | 46 | 26 | 6 | 0 | 4 | 0 | 78 | 0 | 51 | 0.66 | ABSENT |
| 3 | A | 43 | 24 | 4 | 13 | 15 | 0 | 1 | 56 | 0 | 30 | 0.54 | ABSENT |
| 4 | B | 3 | 16 | 56 | 0 | 16 | 5 | 4 | 88 | 3 | 66 | 0.75 | ABSENT |
| 5 | B | 31 | 2 | 15 | 8 | 42 | 0 | 2 | 67 | 0 | 56 | 0.84 | ABSENT |
| 6 | B | 34 | 1 | 42 | 11 | 8 | 3 | 1 | 62 | 0 | 5 | 0.08 | ABSENT |
| 7 | C | 38 | 26 | 18 | 18 | 0 | 0 | 0 | 62 | 0 | 50 | 0.80 | ABSENT |
| 8 | C | 34 | 12 | 3 | 0 | 47 | 2 | 2 | 62 | 1 | 36 | 0.58 | ABSENT |
| 9 | D | 19 | 0 | 0 | 6 | 75 | 0 | 0 | 81 | 0 | 32 | 0.39 | ABSENT |
| 10 | D | 22 | 19 | 5 | 13 | 38 | 1 | 2 | 75 | 0 | 28 | 0.38 | ABSENT |
| 11 | D | 18 | 38 | 23 | 20 | 0 | 1 | 0 | 81 | 0 | 59 | 0.73 | ABSENT |
| 12 | D | 45 | 16 | 14 | 18 | 3 | 2 | 2 | 51 | 0 | 44 | 0.86 | ABSENT |
| 13 | E | 43 | 21 | 2 | 9 | 24 | 0 | 1 | 56 | 0 | 32 | 0.57 | ABSENT |
| 14 | E | 17 | 30 | 2 | 27 | 22 | 0 | 2 | 81 | 2 | 50 | 0.62 | ABSENT |
| 15 | E | 38 | 39 | 2 | 5 | 16 | 0 | 0 | 62 | 0 | 50 | 0.80 | ABSENT |
| 16 | F | 32 | 20 | 4 | 5 | 37 | 2 | 0 | 66 | 0 | 56 | 0.85 | ABSENT |
| 17 | F | 41 | 2 | 47 | 3 | 0 | 7 | 0 | 52 | 0 | 37 | 0.72 | ABSENT |
| 18 | F | 35 | 4 | 4 | 9 | 45 | 0 | 3 | 62 | 1 | 63 | 1.02 | ABSENT |
| 19 | G | 24 | 20 | 53 | 0 | 0 | 3 | 0 | 73 | 0 | 36 | 0.49 | ABSENT |
| 20 | G | 19 | 0 | 23 | 1 | 57 | 0 | 0 | 81 | 0 | 59 | 0.73 | ABSENT |
| 21 | G | 72 | 6 | 15 | 3 | 0 | 4 | 0 | 24 | 0 | 16 | 0.67 | ABSENT |
| 22 | H | 19 | 2 | 0 | 2 | 75 | 1 | 1 | 79 | 0 | 64 | 0.81 | ABSENT |
| 23 | H | 43 | 29 | 19 | 5 | 0 | 4 | 0 | 53 | 0 | 40 | 0.76 | ABSENT |
| 24 | H | 63 | 16 | 0 | 3 | 17 | 0 | 1 | 36 | 0 | 15 | 0.41 | ABSENT |
| 25 | I | 31 | 17 | 11 | 0 | 40 | 0 | 1 | 68 | 0 | 19 | 0.28 | ABSENT |
| 26 | I | 31 | 17 | 11 | 0 | 40 | 0 | 1 | 68 | 0 | 19 | 0.28 | ABSENT |
| 27 | I | 37 | 32 | 12 | 19 | 0 | 0 | 0 | 63 | 0 | 37 | 0.58 | ABSENT |
| 28 | I | 47 | 19 | 28 | 2 | 2 | 0 | 2 | 51 | 0 | 44 | 0.87 | ABSENT |
| 29 | J | 0 | 28 | 12 | 4 | 55 | 0 | 1 | 99 | 0 | 20 | 0.20 | ABSENT |
| 30 | J | 38 | 37 | 22 | 3 | 0 | 0 | 0 | 62 | 0 | 51 | 0.82 | ABSENT |
| 31 | J | 35 | 26 | 22 | 5 | 12 | 0 | 0 | 59 | 0 | 38 | 0.65 | ABSENT |
| 32 | K | 8 | 9 | 7 | 0 | 75 | 1 | 0 | 91 | 0 | 51 | 0.56 | ABSENT |
| 33 | K | 25 | 53 | 10 | 12 | 0 | 0 | 0 | 75 | 0 | 47 | 0.62 | ABSENT |
| 34 | K | 45 | 26 | 6 | 5 | 0 | 1 | 17 | 37 | 5 | 23 | 0.62 | ABSENT |
| 35 | L | 45 | 16 | 7 | 18 | 14 | 0 | 0 | 55 | 0 | 43 | 0.78 | ABSENT |
| 36 | L | 38 | 21 | 38 | 0 | 0 | 3 | 0 | 59 | 0 | 50 | 0.85 | ABSENT |
| 37 | L | 47 | 25 | 3 | 15 | 8 | 1 | 1 | 51 | 0 | 43 | 0.84 | ABSENT |
| 38 | M | 16 | 31 | 0 | 19 | 34 | 0 | 0 | 84 | 2 | 75 | 0.89 | ABSENT |
| 39 | M | 16 | 31 | 0 | 19 | 34 | 0 | 0 | 84 | 2 | 75 | 0.89 | ABSENT |

TABLE 8-continued

| 40 | M | 37 | 4 | 1 | 63 | 0 | 0 | 0 | 42 | 0.67 | ABSENT |
| 41 | M | 14 | 41 | 1 | 85 | 0 | 0 | 0 | 61 | 0.72 | ABSENT |
| 42 | N | 5 | 19 | 7 | 93 | 1 | 0 | 0 | 71 | 0.76 | ABSENT |
| 43 | N | 22 | 7 | 13 | 76 | 2 | 0 | 0 | 45 | 0.59 | ABSENT |
| 44 | O | 40 | 15 | 3 | 58 | 1 | 0 | 0 | 56 | <u>0.97</u> | ABSENT |
| 45 | O | 44 | 6 | 8 | 56 | 0 | 0 | 0 | 42 | 0.75 | ABSENT |
| 46 | O | 46 | 11 | 40 | 51 | 3 | 0 | 0 | 37 | 0.73 | ABSENT |
| 47 | O | 30 | 0 | 50 | 67 | 3 | 0 | 0 | 3 | <u>0.04</u> | ABSENT |

| EXPERIMENTAL EXAMPLE | PLATING LAYER | | | Fe—Al ALLOY LAYER | | FINE-GRAIN LAYER | | BASE STEEL SHEET | | REMARKS |
|---|---|---|---|---|---|---|---|---|---|---|
| | CONTENT Fe % | CONTENT Al % | PLATING DEPOSITION AMOUNT g/m² | AVERAGE THICKNESS μm | DIFFERENCE IN WIDTH DIRECTION μm | AVERAGE THICKNESS μm | DIFFERENCE IN WIDTH DIRECTION μm | AVERAGE GRAIN DIAMETER OF FERRITE PHASE μm | MAXIMUM DIAMETER OF OXIDE μm | |
| 1 | 2.8 | 0.14 | 81 | 0.8 | 0.2 | 4.6 | 0.4 | 0.4 | 0.1 | EXAMPLE |
| 2 | 1.5 | 0.31 | 55 | 1.2 | 0.4 | 0.9 | 0.7 | 1.1 | 0.04 | EXAMPLE |
| 3 | 1.6 | 0.32 | 54 | 0.8 | 0.3 | 2.9 | 0.6 | 0.8 | 0.1 | EXAMPLE |
| 4 | 1.7 | 0.17 | 79 | 0.5 | 0.2 | 0.9 | 0.3 | 0.9 | 0.1 | EXAMPLE |
| 5 | 1.1 | 0.29 | 77 | 0.8 | 0.3 | 1.3 | 1.0 | 0.8 | 0.1 | EXAMPLE |
| 6 | 1.7 | 0.43 | 70 | 1.3 | 0.4 | 1.4 | 1.1 | 0.4 | 0.2 | COMPARATIVE EXAMPLE |
| 7 | 1.3 | 0.52 | 89 | 1.6 | 0.4 | 2.5 | 0.8 | 0.7 | 0.3 | EXAMPLE |
| 8 | 1.4 | 0.37 | 90 | 1.4 | 0.3 | 2.5 | 0.5 | 1.5 | 0.03 | EXAMPLE |
| 9 | <u>3.8</u> | 0.26 | 84 | 0.4 | 0.2 | 3.4 | 0.4 | 0.9 | 0.03 | COMPARATIVE EXAMPLE |
| 10 | 1.1 | 0.35 | 34 | 1.5 | 0.4 | 2.4 | 0.6 | 0.6 | 0.1 | EXAMPLE |
| 11 | 2.4 | 0.24 | 64 | 0.3 | 0.2 | 2.0 | 1.3 | 0.7 | 0.1 | EXAMPLE |
| 12 | 0.2 | 0.86 | 53 | 1.8 | 0.3 | 1.0 | 0.2 | 0.6 | 0.1 | EXAMPLE |
| 13 | 1.7 | 0.42 | 72 | 1.2 | 0.3 | 3.8 | 1.2 | 0.7 | 0.2 | EXAMPLE |
| 14 | 0.5 | 0.68 | 67 | 1.7 | 0.4 | 3.5 | 0.8 | 0.3 | 0.3 | EXAMPLE |
| 15 | 1.0 | 0.40 | 51 | 1.5 | 0.3 | 3.5 | 0.4 | 1.4 | 0.04 | COMPARATIVE EXAMPLE |
| 16 | 2.0 | 0.41 | 61 | 1.1 | 0.3 | 1.3 | 0.3 | 0.6 | 0.1 | EXAMPLE |
| 17 | 2.8 | 0.23 | 71 | 0.4 | 0.2 | 2.0 | 0.5 | 1.7 | 0.02 | EXAMPLE |
| 18 | 1.0 | 0.28 | 73 | 1.1 | 0.3 | 2.2 | 0.6 | 0.4 | 0.1 | COMPARATIVE EXAMPLE |
| 19 | 1.7 | 0.42 | 52 | 1.0 | 0.2 | 2.1 | 0.4 | 0.4 | 0.1 | EXAMPLE |
| 20 | 1.9 | 0.13 | 80 | 0.3 | 0.2 | 1.3 | 0.4 | 1.0 | 0.1 | EXAMPLE |
| 21 | 1.6 | 0.40 | 85 | 1.1 | 0.3 | 1.4 | 0.6 | 0.7 | 0.1 | COMPARATIVE EXAMPLE |

TABLE 8-continued

| | | | | | | | | | | |
|---|---|---|---|---|---|---|---|---|---|---|
| 22 | 1.4 | 0.23 | 33 | 0.6 | 0.2 | 0.5 | 0.2 | 0.9 | 0.1 | EXAMPLE |
| 23 | 2.4 | 0.24 | 73 | 0.4 | 0.2 | 2.8 | 0.8 | 0.5 | 0.04 | EXAMPLE |
| 24 | 1.9 | 0.43 | 72 | 1.2 | 0.3 | 4.2 | 1.2 | 0.3 | 0.03 | COMPARATIVE EXAMPLE |
| 25 | 1.1 | 0.36 | 40 | 1.6 | 0.7 | 2.5 | 2.1 | 0.6 | 0.1 | COMPARATIVE EXAMPLE |
| 26 | 1.0 | 0.38 | 42 | 1.7 | 0.3 | 2.2 | 0.3 | 0.5 | 0.1 | EXAMPLE |
| 27 | 0.7 | 0.32 | 49 | 1.4 | 0.3 | 0.1 | 0.5 | 2.3 | 0.02 | EXAMPLE |
| 28 | 0.2 | 0.28 | 33 | 1.2 | 0.3 | 0.5 | 0.6 | 0.5 | 0.3 | EXAMPLE |
| 29 | 1.5 | 0.24 | 66 | 0.7 | 0.2 | 2.1 | 1.4 | 0.5 | 0.1 | EXAMPLE |
| 30 | 1.9 | 0.31 | 69 | 0.5 | 0.2 | 2.3 | 0.8 | 1.4 | 0.3 | EXAMPLE |
| 31 | 7.5 | 0.00 | 31 | 0 | 0 | 2.3 | 0.2 | 0.5 | 0.1 | COMPARATIVE EXAMPLE |
| 32 | 1.1 | 0.31 | 53 | 1.4 | 0.3 | 2.4 | 1.0 | 0.6 | 0.1 | EXAMPLE |
| 33 | 1.3 | 0.28 | 86 | 1.1 | 0.3 | 2.6 | 0.7 | 0.4 | 0.2 | EXAMPLE |
| 34 | 1.4 | 0.31 | 65 | 0.6 | 0.2 | 2.0 | 0.6 | 0.8 | 0.3 | COMPARATIVE EXAMPLE |
| 35 | 1.9 | 0.26 | 45 | 0.4 | 0.2 | 1.8 | 0.8 | 0.7 | 0.3 | EXAMPLE |
| 36 | 0.4 | 0.26 | 46 | 1.1 | 0.3 | 0.1 | 0.5 | 2.6 | 0.02 | EXAMPLE |
| 37 | 0.1 | 1.08 | 47 | 2.2 | 0.5 | 0.9 | 0.7 | 0.8 | 0.04 | COMPARATIVE EXAMPLE |
| 38 | 1.1 | 0.26 | 74 | 1.1 | 0.8 | 0.9 | 2.2 | 1.9 | 0.01 | COMPARATIVE EXAMPLE |
| 39 | 1.3 | 0.28 | 71 | 1.0 | 0.3 | 0.8 | 0.3 | 1.5 | 0.01 | EXAMPLE |
| 40 | 2.2 | 0.23 | 75 | 0.3 | 0.2 | 0.3 | 0.5 | 0.8 | 0.03 | EXAMPLE |
| 41 | 2.2 | 0.71 | 51 | 1.6 | 0.4 | 2.7 | 0.4 | 0.4 | 0.04 | EXAMPLE |
| 42 | 1.1 | 0.32 | 61 | 1.4 | 0.4 | 1.3 | 0.5 | 0.8 | 0.1 | EXAMPLE |
| 43 | 2.0 | 0.28 | 31 | 0.3 | 0.2 | 1.8 | 0.8 | 1.3 | 0.04 | EXAMPLE |
| 44 | 2.1 | 0.30 | 69 | 0.5 | 0.3 | 2.0 | 1.6 | 0.4 | 0.1 | COMPARATIVE EXAMPLE |
| 45 | 0.9 | 0.42 | 50 | 1.6 | 0.3 | 2.0 | 1.3 | 0.5 | 0.3 | EXAMPLE |
| 46 | 1.0 | 0.37 | 72 | 1.5 | 0.2 | 2.1 | 0.8 | 0.6 | 0.3 | EXAMPLE |
| 47 | 3.2 | 0.14 | 53 | 0.4 | 0.2 | 6.2 | 0.5 | 0.5 | 0.04 | COMPARATIVE EXAMPLE |

TABLE 9

| EXPERIMENTAL EXAMPLE | CHEMICAL COMPONENT | MICROSTRUCTURE ¼ THICKNESS STRUCTURAL FRACTION | | | | | | | BASE IRON SURFACE LAYER | | | | |
|---|---|---|---|---|---|---|---|---|---|---|---|---|---|
| | | FERRITE % | BAINITE % | BAINITIC FERRITE % | MARTENSITE % | TEMPERED MARTENSITE % | RETAINED AUSTENITE % | OTHERS % | HARD STRUCTURE V1 % | STRUCTURAL FRACTION RETAINED AUSTENITE % | HARD STRUCTURE V2 % | V1/V2 | OXIDE AT BOUNDARY AND/OR WITHIN GRAIN |
| 48 | P | 15 | 52 | 26 | 5 | 2 | 0 | 0 | 85 | 0 | 64 | 0.75 | ABSENT |
| 49 | P | 19 | 15 | 21 | 8 | 33 | 0 | 4 | 77 | 2 | 52 | 0.67 | ABSENT |
| 50 | P | 35 | 0 | 62 | 0 | 0 | 3 | 0 | 62 | 0 | 51 | 0.83 | ABSENT |
| 51 | Q | 31 | 29 | 29 | 9 | 0 | 1 | 1 | 67 | 1 | 59 | 0.88 | ABSENT |
| 52 | Q | 21 | 28 | 1 | 15 | 33 | 0 | 2 | 77 | 0 | 52 | 0.68 | ABSENT |
| 53 | Q | 32 | 38 | 25 | 3 | 0 | 0 | 0 | 66 | 0 | 59 | 0.89 | ABSENT |
| 54 | R | 9 | 24 | 18 | 14 | 30 | 2 | 1 | 86 | 0 | 76 | 0.88 | ABSENT |
| 55 | R | 18 | 62 | 16 | 4 | 0 | 4 | 0 | 82 | 0 | 38 | 0.47 | ABSENT |
| 56 | R | 26 | 12 | 14 | 15 | 29 | 4 | 0 | 70 | 0 | 39 | 0.55 | ABSENT |
| 57 | S | 20 | 70 | 1 | 6 | 3 | 0 | 0 | 80 | 0 | 27 | 0.34 | ABSENT |
| 58 | S | 43 | 56 | 0 | 1 | 0 | 0 | 0 | 57 | 0 | 38 | 0.67 | ABSENT |
| 59 | S | <u>73</u> | 14 | 0 | 0 | 11 | 0 | 2 | 38 | 0 | 21 | 0.83 | ABSENT |
| 60 | T | <u>19</u> | 14 | 20 | 15 | 28 | 4 | 1 | <u>25</u> | 2 | 42 | 0.55 | ABSENT |
| 61 | T | 22 | 22 | 44 | 6 | 1 | 4 | 1 | 77 | 0 | 56 | 0.77 | ABSENT |
| 62 | T | 40 | 21 | 9 | 10 | 0 | 0 | 0 | 73 | 0 | 35 | 0.87 | ABSENT |
| 63 | U | 41 | 18 | 9 | 13 | 17 | 0 | 2 | <u>40</u> | 1 | 21 | 0.37 | ABSENT |
| 64 | U | 34 | 48 | 6 | 10 | 2 | 0 | 0 | 57 | 0 | 52 | 0.79 | ABSENT |
| 65 | U | 46 | 35 | 9 | 5 | 5 | 0 | 0 | 66 | 0 | 5 | <u>0.09</u> | ABSENT |
| 66 | V | 30 | 40 | 26 | 0 | 0 | 4 | 0 | 54 | 1 | 11 | <u>0.17</u> | PRESENT |
| 67 | V | 22 | 31 | 43 | 0 | 0 | 4 | 0 | 66 | 0 | 66 | 0.89 | ABSENT |
| 68 | V | 28 | 24 | 37 | 7 | 0 | 4 | 0 | 74 | 0 | 6 | <u>0.09</u> | ABSENT |
| 69 | W | 33 | 55 | 3 | 9 | 0 | 0 | 0 | 68 | 0 | 50 | 0.74 | ABSENT |
| 70 | W | 47 | 34 | 11 | 7 | 0 | 1 | 0 | 67 | 0 | 19 | 0.37 | ABSENT |
| 71 | W | <u>82</u> | 3 | 0 | 13 | 0 | 2 | 0 | 52 | 0 | 12 | 0.78 | ABSENT |
| 72 | X | <u>15</u> | 32 | 19 | 11 | 22 | 0 | 1 | <u>16</u> | 1 | 63 | 0.75 | ABSENT |
| 73 | X | 45 | 12 | 25 | 0 | 15 | 3 | 0 | 84 | 0 | 30 | 0.58 | ABSENT |
| 74 | X | 40 | 12 | 31 | 6 | 7 | 4 | 0 | 52 | 3 | 4 | <u>0.07</u> | ABSENT |
| 75 | Y | 30 | 40 | 26 | 0 | 0 | 4 | 0 | 56 | 4 | 16 | 0.25 | ABSENT |
| 76 | Y | 21 | 12 | 1 | 5 | 59 | 0 | 2 | 66 | 0 | 17 | 0.22 | ABSENT |
| 77 | Y | 10 | 68 | 5 | 11 | 3 | 1 | 3 | 77 | 0 | 6 | <u>0.07</u> | ABSENT |
| 78 | Z | 39 | 40 | 5 | 10 | 4 | 1 | 1 | 87 | 0 | 53 | 0.89 | ABSENT |
| 79 | Z | 25 | 18 | 1 | 14 | 39 | 2 | 1 | 59 | 0 | 9 | 0.13 | ABSENT |
| 80 | Z | 30 | 19 | 1 | 13 | 36 | 0 | 1 | 72 | 0 | 6 | <u>0.09</u> | ABSENT |
| 81 | AA | <u>99</u> | 0 | 0 | 0 | 0 | 0 | 1 | 69 | 0 | 0 | <u>0</u> | ABSENT |
| 82 | AB | <u>18</u> | 11 | 16 | 4 | 48 | 0 | 3 | <u>0</u> | 1 | 54 | 0.69 | ABSENT |
| 83 | AC | 23 | 56 | 0 | 10 | 0 | 0 | <u>11</u> | 79 | 1 | 52 | 0.79 | ABSENT |
| 84 | AD | EXPERIMENT STOPPED | | | | | | | | | | | |
| 85 | AE | <u>68</u> | 23 | 0 | 0 | 0 | 0 | <u>9</u> | <u>23</u> | 0 | 14 | 0.61 | ABSENT |

TABLE 9-continued

| | | | | | | | | | | |
|---|---|---|---|---|---|---|---|---|---|---|
| 86 | AF | 22 | 5 | 19 | 8 | 42 | EXPERIMENT STOPPED | | 0.47 | ABSENT |
| 87 | AG | | | | | | EXPERIMENT STOPPED | | | |
| 88 | AH | | | | | | 3 | 74 | | |
| 89 | AI | | | | | | 1 | | | |
| 90 | AJ | | | | | | EXPERIMENT STOPPED | | | |
| 91 | AK | 13 | 38 | 7 | 4 | 38 | 0 | 87 | 0 | 0.74 | ABSENT |
| 92 | A | 20 | 68 | 10 | 2 | 0 | 0 | 80 | 0 | 0.60 | ABSENT |
| 93 | U | 18 | 46 | 26 | 6 | 0 | 4 | 78 | 0 | 0.66 | ABSENT |
| 94 | A | 34 | 48 | 6 | 10 | 2 | 0 | 66 | 0 | 0.79 | ABSENT |
| 95 | A | 18 | 46 | 26 | 6 | 0 | 4 | 78 | 0 | 0.66 | ABSENT |
|  |  | 18 | 46 | 26 | 6 | 0 | 4 | 78 | 0 | 0.66 | ABSENT |

| | PLATING LAYER | | | Fe—Al ALLOY LAYER THICKNESS | | FINE-GRAIN LAYER THICKNESS | | BASE STEEL SHEET | | |
|---|---|---|---|---|---|---|---|---|---|---|
| | CONTENT | | PLATING DEPOSITION AMOUNT g/m² | AVERAGE THICKNESS μm | DIFFERENCE IN WIDTH DIRECTION μm | AVERAGE THICKNESS μm | DIFFERENCE IN WIDTH DIRECTION μm | AVERAGE GRAIN DIAMETER OF FERRITE PHASE μm | MAXIMUM DIAMETER OF OXIDE μm | REMARKS |
| EXPERIMENTAL EXAMPLE | Fe % | Al % | | | | | | | | |
| 48 | 1.7 | 0.35 | 51 | 1.2 | 0.3 | 1.4 | 0.6 | 0.6 | 0.2 | EXAMPLE |
| 49 | 1.4 | 0.44 | 73 | 1.5 | 0.4 | 1.9 | 0.8 | 0.4 | 0.1 | EXAMPLE |
| 50 | 0.6 | 0.14 | 87 | 1.2 | 0.3 | <0.1 | <0.1 | (3.4) | (<0.01) | COMPARATIVE EXAMPLE |
| 51 | 1.3 | 0.37 | 57 | 1.3 | 0.3 | 1.2 | 1.0 | 0.7 | 0.1 | EXAMPLE |
| 52 | 0.9 | 0.23 | 38 | 0.8 | 0.3 | 0.6 | 0.4 | 1.7 | 0.1 | EXAMPLE |
| 53 | 0.6 | 0.29 | 68 | 1.3 | 0.3 | 0.8 | 0.3 | 1.0 | 0.04 | COMPARATIVE EXAMPLE |
| 54 | 2.0 | 0.36 | 70 | 0.6 | 0.2 | 0.9 | 0.2 | 1.1 | 0.02 | EXAMPLE |
| 55 | 1.3 | 0.23 | 68 | 1.0 | 0.3 | 3.0 | 0.6 | 0.8 | 0.3 | EXAMPLE |
| 56 | 3.9 | 0.53 | 64 | 0.08 | 0.1 | 2.8 | 0.7 | 0.5 | 0.1 | COMPARATIVE EXAMPLE |
| 57 | 1.7 | 0.31 | 84 | 1.0 | 0.3 | 0.7 | 0.7 | 0.9 | 0.3 | EXAMPLE |
| 58 | 1.3 | 0.95 | 36 | 2.0 | 0.5 | 4.2 | 0.8 | 0.5 | 0.1 | EXAMPLE |
| 59 | 1.9 | 0.50 | 48 | 1.4 | 0.3 | 2.6 | 0.5 | 0.7 | 0.04 | COMPARATIVE EXAMPLE |
| 60 | 2.0 | 0.37 | 65 | 0.5 | 0.2 | 2.1 | 0.4 | 0.7 | 0.1 | EXAMPLE |
| 61 | 1.5 | 0.42 | 71 | 1.3 | 0.3 | 0.8 | 0.6 | 0.9 | 0.1 | EXAMPLE |
| 62 | 1.4 | 0.24 | 75 | 0.3 | 0.2 | 0.9 | 0.6 | 1.0 | 0.1 | COMPARATIVE EXAMPLE |
| 63 | 1.3 | 0.37 | 46 | 1.4 | 0.3 | 2.1 | 0.8 | 0.6 | 0.4 | EXAMPLE |
| 64 | 1.9 | 0.22 | 51 | 0.5 | 0.2 | 1.1 | 0.9 | 0.6 | 0.1 | EXAMPLE |

TABLE 9-continued

| | | | | | | | | | | |
|---|---|---|---|---|---|---|---|---|---|---|
| 65 | 4.0 | 0.64 | 75 | 1.5 | 0.3 | 7.1 | 0.8 | 0.6 | 0.1 | COMPARATIVE EXAMPLE |
| 66 | 2.2 | 0.17 | 66 | 0.5 | 0.3 | 2.2 | 0.8 | 0.6 | 0.1 | EXAMPLE |
| 67 | 1.2 | 0.47 | 54 | 1.5 | 0.3 | 1.3 | 0.9 | 0.5 | 0.1 | EXAMPLE |
| 68 | 1.2 | 0.30 | 47 | 1.3 | 0.3 | 2.0 | 1.0 | 1.6 | 0.6 | COMPARATIVE EXAMPLE |
| 69 | 1.0 | 0.30 | 60 | 1.2 | 0.3 | 1.8 | 0.4 | 1.5 | 0.03 | EXAMPLE |
| 70 | 1.6 | 0.41 | 86 | 1.4 | 0.3 | 2.7 | 1.8 | 0.5 | 0.1 | EXAMPLE |
| 71 | 1.9 | 0.28 | 75 | 0.8 | 0.2 | 1.2 | 0.6 | 0.6 | 0.1 | EXAMPLE |
| 72 | 0.9 | 0.25 | 66 | 1.2 | 0.3 | 0.8 | 0.7 | 0.8 | 0.1 | COMPARATIVE EXAMPLE |
| 73 | 2.0 | 0.35 | 69 | 1.0 | 0.3 | 2.2 | 0.8 | 1.6 | 0.03 | EXAMPLE |
| 74 | 0.8 | 0.35 | 88 | 1.6 | 0.3 | 3.1 | 1.3 | 0.4 | 1.0 | COMPARATIVE EXAMPLE |
| 75 | 2.8 | 0.25 | 76 | 1.7 | 0.4 | 4.8 | 1.5 | 0.5 | 0.3 | EXAMPLE |
| 76 | 1.1 | 0.22 | 66 | 1.3 | 0.3 | 2.6 | 0.8 | 0.6 | 0.1 | EXAMPLE |
| 77 | 4.5 | 0.10 | 32 | 0.5 | 0.8 | 9.3 | 1.0 | 0.4 | 0.1 | COMPARATIVE EXAMPLE |
| 78 | 0.9 | 0.38 | 70 | 1.5 | 0.3 | 0.1 | 0.1 | 0.9 | 0.02 | EXAMPLE |
| 79 | 2.1 | 0.67 | 52 | 1.0 | 0.3 | 4.2 | 0.8 | 0.4 | 0.03 | EXAMPLE |
| 80 | 0.8 | 0.29 | 49 | 1.5 | 0.3 | 2.2 | 0.7 | 0.4 | 0.03 | EXAMPLE |
| 81 | 1.6 | 0.34 | 86 | 1.2 | 0.3 | 1.2 | 0.8 | 0.5 | 0.1 | COMPARATIVE EXAMPLE |
| 82 | 1.1 | 0.37 | 59 | 1.5 | 0.3 | 1.9 | 0.6 | 0.5 | 0.04 | EXAMPLE |
| 83 | 2.7 | 0.29 | 74 | 0.8 | 0.3 | 3.1 | 0.4 | 0.6 | 0.1 | EXAMPLE |
| 84 | | | | | EXPERIMENT STOPPED | | | | | COMPARATIVE EXAMPLE |
| 85 | 2.0 | 0.24 | 69 | 1.1 | 0.6 | 2.4 | 0.8 | 0.8 | 0.1 | EXAMPLE |
| 86 | | | | | EXPERIMENT STOPPED | | | | | COMPARATIVE EXAMPLE |
| 87 | | | | | EXPERIMENT STOPPED | | | | | COMPARATIVE EXAMPLE |
| 88 | 1.7 | 0.16 | 67 | 1.2 | 0.3 | 3.0 | 0.6 | 0.6 | 0.03 | EXAMPLE |

TABLE 9-continued

| | | | | EXPERIMENT STOPPED | | | | |
|---|---|---|---|---|---|---|---|---|
| 89 | | | | | | | | |
| 90 | 2.1 | 0.14 | 69 | 0.8 | 0.3 | 0.5 | 0.5 | 0.7 | 0.1 | COMPARATIVE EXAMPLE |
| 91 | 0.7 | 0.18 | 62 | 0.7 | 0.3 | 0.5 | 0.3 | 0.6 | 0.2 | COMPARATIVE EXAMPLE |
| 92 | 1.5 | 0.31 | 55 | 1.2 | 0.3 | <0.1 | <0.1 | (3.2) | (<0.01) | COMPARATIVE EXAMPLE |
| 93 | 2.0 | 0.20 | 55 | 0.5 | 0.6 | 1.1 | 2.1 | 0.6 | 0.1 | COMPARATIVE EXAMPLE |
| 94 | 1.4 | 0.28 | 54 | 0.8 | 0.4 | 0.9 | 1.2 | 0.5 | 0.04 | COMPARATIVE EXAMPLE |
| 95 | 1.3 | 0.27 | 50 | 0.7 | 0.6 | 0.6 | 2.2 | 0.3 | 0.02 | COMPARATIVE EXAMPLE |

TABLE 10

| EXPERIMENTAL EXAMPLE | CHEMICAL COMPONENT | SHEET THICKNESS t mm | TENSILE PROPERTIES ||||| HOLE EXPANDABILITY λ % | TS^0.5 × El × λ^0.5 | BENDABILITY |||
|---|---|---|---|---|---|---|---|---|---|---|---|---|
| | | | YIELD STRENGTH YS MPa | MAXIMUM TENSILE STRENGTH TS MPa | TOTAL ELONGATION El % | YIELD RATIO YS/TS | | | | MINIMUM BEND RADIUS r mm | r/t | FATIGUE FATIGUE LIMIT DL MPa |
| 1 | A | 1.3 | 657 | 881 | 17 | 0.75 | 65 | 3.58E+06 | 1.5 | 1.2 | 384 |
| 2 | A | 1.4 | 572 | 759 | 20 | 0.75 | 55 | 3.10E+06 | 2.0 | 1.4 | 400 |
| 3 | A | 1.9 | 603 | 851 | 18 | 0.71 | 44 | 2.96E+06 | 2.0 | 1.1 | 333 |
| 4 | B | 1.1 | 823 | 1037 | 14 | 0.79 | 59 | 3.59E+06 | 1.0 | 0.9 | 496 |
| 5 | B | 1.2 | 819 | 1110 | 12 | 0.74 | 57 | 3.35E+06 | 1.5 | 1.3 | 616 |
| 6 | B | 1.2 | 834 | 1136 | 11 | 0.73 | 49 | 2.95E+06 | 1.0 | 0.8 | 350 |
| 7 | C | 2.0 | 467 | 694 | 23 | 0.67 | 45 | 2.82E+06 | 3.0 | 1.5 | 330 |
| 8 | C | 1.8 | 622 | 790 | 19 | 0.79 | 60 | 3.27E+06 | 3.0 | 1.7 | 389 |
| 9 | C | 1.8 | 717 | 895 | 16 | 0.80 | 51 | 3.06E+06 | 2.0 | 1.1 | 389 |
| 10 | D | 2.5 | 603 | 794 | 19 | 0.76 | 63 | 3.37E+06 | 4.0 | 1.6 | 342 |
| 11 | D | 1.4 | 591 | 823 | 19 | 0.72 | 38 | 2.77E+06 | 2.0 | 1.4 | 411 |
| 12 | D | 1.2 | 496 | 729 | 26 | 0.68 | 39 | 3.20E+06 | 1.5 | 1.3 | 302 |
| 13 | E | 0.9 | 578 | 846 | 20 | 0.68 | 42 | 3.19E+06 | 1.0 | 1.1 | 365 |
| 14 | E | 1.6 | 796 | 1046 | 12 | 0.76 | 44 | 2.69E+06 | 1.5 | 0.9 | 400 |
| 15 | E | 1.0 | 537 | 772 | 19 | 0.70 | 93 | 3.93E+06 | 4.0 | 4.0 | 361 |
| 16 | F | 1.6 | 859 | 1123 | 13 | 0.76 | 49 | 3.42E+06 | 2.0 | 1.3 | 550 |
| 17 | F | 0.9 | 713 | 1013 | 14 | 0.70 | 52 | 3.25E+06 | 1.0 | 1.1 | 460 |
| 18 | F | 1.2 | 847 | 1118 | 10 | 0.76 | 74 | 3.22E+06 | 3.0 | 2.5 | 569 |
| 19 | G | 1.2 | 637 | 862 | 16 | 0.74 | 54 | 2.98E+06 | 2.0 | 1.7 | 422 |
| 20 | G | 1.2 | 991 | 1195 | 10 | 0.83 | 57 | 3.12E+06 | 2.0 | 1.7 | 671 |
| 21 | G | 1.3 | 507 | 939 | 15 | 0.54 | 34 | 2.52E+06 | 2.5 | 1.9 | 330 |
| 22 | H | 1.2 | 793 | 968 | 14 | 0.82 | 61 | 3.29E+06 | 2.0 | 1.7 | 604 |
| 23 | H | 0.9 | 473 | 704 | 25 | 0.67 | 40 | 2.95E+06 | 1.5 | 1.7 | 313 |
| 24 | H | 1.6 | 373 | 663 | 29 | 0.56 | 42 | 3.21E+06 | 3.0 | 1.9 | 241 |
| 25 | I | 1.2 | 674 | 907 | 16 | 0.74 | 61 | 3.41E+06 | 2.0 | 1.7 | 449 |
| 26 | I | 1.2 | 674 | 907 | 16 | 0.74 | 61 | 3.41E+06 | 2.0 | 1.7 | 449 |
| 27 | I | 1.6 | 586 | 886 | 18 | 0.66 | 33 | 2.73E+06 | 2.5 | 1.6 | 357 |
| 28 | I | 1.6 | 487 | 735 | 21 | 0.66 | 71 | 3.53E+06 | 2.0 | 1.4 | 323 |
| 29 | J | 1.0 | 791 | 935 | 17 | 0.85 | 60 | 3.76E+06 | 1.5 | 1.5 | 439 |
| 30 | J | 1.8 | 494 | 728 | 25 | 0.68 | 48 | 3.40E+06 | 2.5 | 1.4 | 380 |
| 31 | J | 2.2 | 562 | 758 | 21 | 0.74 | 64 | 3.51E+06 | 4.0 | 1.8 | 358 |
| 32 | K | 0.7 | 802 | 939 | 15 | 0.85 | 76 | 3.76E+06 | 1.0 | 1.4 | 535 |
| 33 | K | 0.9 | 573 | 799 | 18 | 0.72 | 60 | 3.15E+06 | 1.5 | 1.7 | 338 |
| 34 | K | 1.2 | 371 | 572 | 23 | 0.65 | 37 | 1.91E+06 | 2.0 | 1.7 | 229 |
| 35 | L | 1.9 | 670 | 981 | 15 | 0.68 | 44 | 3.06E+06 | 2.0 | 1.1 | 391 |
| 36 | L | 1.2 | 481 | 678 | 26 | 0.71 | 65 | 3.70E+06 | 1.5 | 1.3 | 320 |
| 37 | M | 3.1 | 608 | 936 | 14 | 0.65 | 49 | 2.81E+06 | 2.0 | 0.6 | 388 |
| 38 | M | 0.9 | 698 | 883 | 18 | 0.79 | 56 | 3.53E+06 | 1.0 | 1.1 | 421 |
| 39 | M | 0.9 | 698 | 883 | 18 | 0.79 | 56 | 3.53E+06 | 1.0 | 1.1 | 421 |
| 40 | M | 1.3 | 700 | 942 | 18 | 0.74 | 51 | 3.72E+06 | 2.5 | 1.9 | 423 |
| 41 | M | 2.9 | 663 | 857 | 17 | 0.77 | 70 | 3.57E+06 | 5.0 | 1.7 | 482 |
| 42 | N | 1.8 | 756 | 923 | 17 | 0.82 | 45 | 3.20E+06 | 2.5 | 1.4 | 560 |
| 43 | N | 2.0 | 649 | 809 | 18 | 0.80 | 75 | 3.59E+06 | 3.5 | 1.8 | 419 |

TABLE 10-continued

| | | | | | | | | | | |
|---|---|---|---|---|---|---|---|---|---|---|
| 44 | N | 1.0 | 527 | 710 | | 22 | 0.74 | 61 | 3.25E+06 | 2.5 | 2.5 | 402 |
| 45 | O | 1.0 | 698 | 1012 | | 15 | 0.69 | 39 | 3.02E+06 | 1.5 | 1.5 | 531 |
| 46 | O | 1.1 | 517 | 747 | | 23 | 0.69 | 48 | 3.25E+06 | 2.0 | 1.8 | 394 |
| 47 | O | 1.4 | 708 | 1018 | | 13 | 0.70 | 51 | 3.02E+06 | 1.5 | 1.1 | 329 |

| EXPERIMENTAL EXAMPLE | FATIGUE DL/TS | PLATING ADHESION | SPOT WELDABILITY | CORROSION RESISTANCE | CHIPPING RESISTANCE | POWDERING RESISTANCE | PLATING APPEARANCE UNIFORMITY | REMARKS |
|---|---|---|---|---|---|---|---|---|
| 1 | 0.44 | ○ | ○ | ○ | ○ | ○ | ○ | EXAMPLE |
| 2 | 0.53 | ◎ | ○ | ○ | ○ | ○ | ○ | EXAMPLE |
| 3 | 0.39 | ◎ | ○ | ○ | ○ | ○ | ○ | EXAMPLE |
| 4 | 0.48 | ◎ | ○ | ○ | ○ | ○ | ○ | EXAMPLE |
| 5 | 0.55 | ◎ | ○ | ○ | ○ | ○ | ○ | EXAMPLE |
| 6 | 0.31 | ◎ | ○ | ○ | ○ | ○ | ○ | COMPARATIVE EXAMPLE |
| 7 | 0.48 | ◎ | ○ | ○ | ○ | ○ | ○ | EXAMPLE |
| 8 | 0.49 | ◎ | ○ | ○ | ○ | ○ | ○ | EXAMPLE |
| 9 | 0.43 | X | ○ | ○ | X | X | X | COMPARATIVE EXAMPLE |
| 10 | 0.43 | ◎ | ○ | ○ | ○ | ○ | ○ | EXAMPLE |
| 11 | 0.50 | ◎ | ○ | ○ | ○ | ○ | ○ | EXAMPLE |
| 12 | 0.41 | ◎ | ○ | ○ | ○ | ○ | ○ | EXAMPLE |
| 13 | 0.43 | ◎ | ○ | ○ | ○ | ○ | ○ | EXAMPLE |
| 14 | 0.38 | ◎ | ○ | ○ | ○ | ○ | ○ | EXAMPLE |
| 15 | 0.47 | X | ○ | ○ | ○ | X | X (UNPLATING) | COMPARATIVE EXAMPLE |
| 16 | 0.49 | ◎ | ○ | ○ | ○ | ○ | ○ | EXAMPLE |
| 17 | 0.45 | ◎ | ○ | ○ | ○ | ○ | ○ | EXAMPLE |
| 18 | 0.51 | ◎ | ○ | ○ | ○ | ○ | ○ | EXAMPLE |
| 19 | 0.49 | ◎ | ○ | ○ | ○ | ○ | ○ | EXAMPLE |
| 20 | 0.56 | ◎ | ○ | ○ | ○ | ○ | ○ | EXAMPLE |
| 21 | 0.35 | ◎ | ○ | ○ | ○ | ○ | ○ | COMPARATIVE EXAMPLE |
| 22 | 0.62 | ◎ | ○ | ○ | ○ | ○ | ○ | EXAMPLE |
| 23 | 0.44 | ◎ | ○ | ○ | ○ | ○ | ○ | EXAMPLE |
| 24 | 0.36 | ◎ | ○ | ○ | ○ | ○ | ○ | COMPARATIVE EXAMPLE |
| 25 | 0.50 | ◎ | ○ | ○ | ○ | ○ | △ | COMPARATIVE EXAMPLE |
| 26 | 0.50 | ◎ | ○ | ○ | ○ | ○ | ○ | EXAMPLE |
| 27 | 0.40 | ○ | ○ | ○ | ○ | ○ | ○ | EXAMPLE |
| 28 | 0.44 | ◎ | ○ | ○ | ○ | ○ | ○ | EXAMPLE |
| 29 | 0.47 | ◎ | ○ | ○ | ○ | ○ | ○ | EXAMPLE |
| 30 | 0.52 | ◎ | ○ | ○ | ○ | ○ | ○ | EXAMPLE |

TABLE 10-continued

| | | | | | | | | |
|---|---|---|---|---|---|---|---|---|
| 31 | 0.47 | X̲ | ○ | ○ | X̲ | X̲ | X̲ | COMPARATIVE EXAMPLE |
| 32 | 0.57 | ◎ | ○ | ○ | ○ | ○ | ○ | EXAMPLE |
| 33 | 0.42 | ◎ | ○ | ○ | ○ | ○ | ○ | EXAMPLE |
| 34 | 0.40 | ◎ | ○ | ○ | ○ | ○ | ○ | EXAMPLE |
| 35 | 0.40 | ◎ | ○ | ○ | ○ | ○ | ○ | EXAMPLE |
| 36 | 0.47 | ○ | ○ | ○ | ○ | ○ | ○ | EXAMPLE |
| 37 | 0.41 | X̲ | X̲ | ○ | ○ | ○ | ○ | COMPARATIVE EXAMPLE |
| 38 | 0.48 | ◎ | ○ | ○ | ○ | ○ | △ | EXAMPLE |
| 39 | 0.48 | ◎ | ○ | ○ | ○ | ○ | ○ | EXAMPLE |
| 40 | 0.45 | ◎ | ○ | ○ | ○ | ○ | ○ | EXAMPLE |
| 41 | 0.56 | ◎ | ○ | ○ | ○ | ○ | ○ | EXAMPLE |
| 42 | 0.61 | ◎ | ○ | ○ | ○ | ○ | ○ | EXAMPLE |
| 43 | 0.52 | ◎ | ○ | ○ | ○ | ○ | ○ | EXAMPLE |
| 44 | 0.57 | ◎ | ○ | ○ | ○ | ○ | ○ | EXAMPLE |
| 45 | 0.52 | ◎ | ○ | ○ | ○ | ○ | ○ | EXAMPLE |
| 46 | 0.53 | ◎ | ○ | ○ | ○ | ○ | ○ | EXAMPLE |
| 47 | 0.32̲ | X̲ | ○ | ○ | ○ | ○ | ○ | COMPARATIVE EXAMPLE |

※ UNDERLINED PART IS OUT OF PRESENT INVENTION RANGE

TABLE 11

| EXPERIMENTAL EXAMPLE | CHEMICAL COMPONENT | SHEET THICKNESS t mm | TENSILE PROPERTIES | | | | | $TS^{0.5} \times El \times \lambda^{0.5}$ | BENDABILITY | | FATIGUE FATIGUE LIMIT DL MPa |
|---|---|---|---|---|---|---|---|---|---|---|---|
| | | | YIELD STRENGTH YS MPa | MAXIMUM TENSILE STRENGTH TS MPa | TOTAL ELONGATION El % | YIELD RATIO YS/TS | HOLE EXPANDABILITY λ % | | MINIMUM BEND RADIUS r mm | r/t | |
| 48 | P | 1.6 | 717 | 925 | 15 | 0.78 | 69 | 3.51E+06 | 2.5 | 1.6 | 486 |
| 49 | P | 0.9 | 881 | 1100 | 12 | 0.80 | 58 | 3.33E+06 | 1.0 | 1.1 | 451 |
| 50 | P | 0.9 | 644 | 906 | 18 | 0.71 | 36 | 2.95E+06 | 1.5 | 1.7 | 441 |
| 51 | Q | 0.7 | 505 | 711 | 23 | 0.71 | 53 | 3.17E+06 | 1.0 | 1.4 | 321 |
| 52 | Q | 1.7 | 593 | 757 | 21 | 0.78 | 75 | 3.79E+06 | 1.5 | 0.9 | 342 |
| 53 | Q | 1.2 | 464 | 633 | 28 | 0.73 | 57 | 3.37E+06 | 2.5 | 2.1 | 325 |
| 54 | R | 0.9 | 715 | 900 | 17 | 0.79 | 60 | 3.56E+06 | 1.5 | 1.7 | 470 |
| 55 | R | 1.6 | 521 | 676 | 24 | 0.77 | 67 | 3.45E+06 | 2.0 | 1.3 | 320 |
| 56 | R | 1.4 | 618 | 847 | 20 | 0.73 | 42 | 3.20E+06 | 1.5 | 1.1 | 370 |
| 57 | S | 1.6 | 495 | 642 | 24 | 0.77 | 79 | 3.47E+06 | 3.0 | 1.9 | 313 |
| 58 | S | 1.0 | 459 | 686 | 26 | 0.67 | 64 | 3.47E+06 | 2.0 | 2.0 | 323 |
| 59 | S | 1.2 | 279 | 547 | 28 | 0.51 | 53 | 2.61E+06 | 2.0 | 1.7 | 214 |
| 60 | T | 1.1 | 822 | 1062 | 15 | 0.77 | 32 | 2.94E+06 | 1.0 | 0.9 | 469 |
| 61 | T | 1.3 | 602 | 818 | 19 | 0.74 | 49 | 3.11E+06 | 1.5 | 1.2 | 418 |
| 62 | T | 0.9 | 366 | 678 | 19 | 0.54 | 27 | 1.74E+06 | 1.5 | 1.7 | 304 |
| 63 | U | 0.9 | 473 | 708 | 20 | 0.67 | 90 | 3.57E+06 | 1.5 | 1.7 | 274 |
| 64 | U | 1.3 | 454 | 644 | 28 | 0.70 | 58 | 3.48E+06 | 2.0 | 1.5 | 327 |
| 65 | U | 1.1 | 459 | 659 | 25 | 0.70 | 59 | 3.25E+06 | 1.0 | 0.9 | 274 |
| 66 | V | 0.9 | 435 | 612 | 23 | 0.71 | 110 | 3.65E+06 | 1.0 | 1.1 | 274 |
| 67 | V | 1.2 | 547 | 712 | 24 | 0.77 | 71 | 3.84E+06 | 2.0 | 1.7 | 351 |
| 68 | V | 1.3 | 496 | 701 | 23 | 0.71 | 66 | 3.47E+06 | 1.5 | 1.2 | 234 |
| 69 | W | 2.4 | 461 | 658 | 22 | 0.70 | 81 | 3.34E+06 | 4.0 | 1.7 | 340 |
| 70 | W | 1.5 | 418 | 623 | 29 | 0.67 | 50 | 3.19E+06 | 3.0 | 2.0 | 243 |
| 71 | W | 1.7 | 429 | 798 | 19 | 0.54 | 44 | 2.84E+06 | 1.5 | 0.9 | 299 |
| 72 | X | 1.8 | 765 | 989 | 12 | 0.77 | 78 | 3.30E+06 | 1.5 | 0.8 | 522 |
| 73 | X | 1.6 | 670 | 928 | 16 | 0.72 | 53 | 3.29E+06 | 2.5 | 1.6 | 415 |
| 74 | X | 1.6 | 649 | 967 | 14 | 0.67 | 47 | 2.89E+06 | 2.0 | 1.3 | 288 |
| 75 | Y | 1.4 | 526 | 739 | 19 | 0.71 | 99 | 3.80E+06 | 2.5 | 1.8 | 294 |
| 76 | Y | 2.0 | 662 | 816 | 20 | 0.81 | 67 | 3.82E+06 | 3.0 | 1.5 | 385 |
| 77 | Y | 2.2 | 582 | 745 | 21 | 0.78 | 67 | 3.50E+06 | 2.0 | 0.9 | 237 |
| 78 | Z | 1.3 | 429 | 647 | 24 | 0.66 | 70 | 3.30E+06 | 2.0 | 1.5 | 318 |
| 79 | Z | 1.8 | 646 | 864 | 17 | 0.75 | 58 | 3.29E+06 | 3.5 | 1.9 | 338 |
| 80 | Z | 0.9 | 579 | 760 | 24 | 0.76 | 48 | 3.48E+06 | 1.0 | 1.1 | 254 |
| 81 | AA | 1.0 | 179 | 378 | 29 | 0.47 | 106 | 2.19E+06 | <1.0 | — | 150 |
| 82 | AB | 1.1 | 1112 | 1355 | 6 | 0.82 | 36 | 1.80E+06 | 3.0 | 2.7 | 670 |
| 83 | AC | 1.4 | 448 | 728 | 16 | 0.62 | 33 | 1.81E+06 | 3.0 | 2.1 | 308 |
| 84 | AD | | | | EXPERIMENT STOPPED | | | | | | |
| 85 | AE | 1.8 | 274 | 508 | 24 | 0.54 | 45 | 1.84E+06 | 3.0 | 1.7 | 196 |
| 86 | AF | | | | EXPERIMENT STOPPED | | | | | | |
| 87 | AG | | | | EXPERIMENT STOPPED | | | | | | |
| 88 | AH | 1.4 | 810 | 1037 | 8 | 0.78 | 28 | 1.41E+06 | 4.5 | 3.2 | 323 |
| 89 | AI | | | | | | | | | | | |
| 90 | AJ | 1.2 | 706 | 901 | 10 | 0.78 | 29 | 1.46E+06 | 5.0 | 4.2 | 278 |

TABLE 11-continued

| | | | | | | | | | | | | REMARKS |
|---|---|---|---|---|---|---|---|---|---|---|---|---|
| 91 | AK | 1.2 | 562 | 766 | 15 | 0.73 | 32 | 1.80E+01 | 4.0 | 3.3 | 242 | EXAMPLE |
| 92 | A | 1.4 | 572 | 759 | 20 | 0.75 | 55 | 3.10E+06 | 2.0 | 1.4 | 400 | EXAMPLE |
| 93 | U | 1.3 | 454 | 644 | 28 | 0.70 | 58 | 3.48E+06 | 2.0 | 1.5 | 327 | COMPARATIVE EXAMPLE |
| 94 | A | 1.4 | 573 | 758 | 19 | 0.76 | 55 | 4.64E+02 | 2.0 | 1.4 | 398 | EXAMPLE |
| 95 | A | 1.4 | 575 | 755 | 20 | 0.76 | 55 | 5.05E+02 | 2.0 | 1.4 | 401 | EXAMPLE |

| EXPERIMENTAL EXAMPLE | FATIGUE DL/TS | PLATING ADHESION | SPOT WELDABILITY | CORROSION RESISTANCE | CHIPPING RESISTANCE | POWDERING RESISTANCE | PLATING APPEARANCE UNIFORMITY | REMARKS |
|---|---|---|---|---|---|---|---|---|
| 48 | 0.53 | ◎ | ○ | ○ | ○ | ○ | ○ | EXAMPLE |
| 49 | 0.41 | ◎ | ○ | ○ | ○ | ○ | ○ | EXAMPLE |
| 50 | 0.49 | X | ○ | ○ | ○ | ○ | X (UNPLATING) | COMPARATIVE EXAMPLE |
| 51 | 0.45 | ◎ | ○ | ○ | ○ | ○ | ○ | EXAMPLE |
| 52 | 0.45 | ◎ | ○ | ○ | ○ | ○ | ○ | EXAMPLE |
| 53 | 0.51 | X | ○ | ○ | ○ | X | X (UNPLATING) | COMPARATIVE EXAMPLE |
| 54 | 0.52 | ◎ | ○ | ○ | ○ | ○ | ○ | EXAMPLE |
| 55 | 0.47 | ◎ | ○ | ○ | ○ | ○ | ○ | EXAMPLE |
| 56 | 0.44 | X | ○ | ○ | X | X | X | COMPARATIVE EXAMPLE |
| 57 | 0.49 | ◎ | ○ | ○ | ○ | ○ | ○ | EXAMPLE |
| 58 | 0.47 | ◎ | ○ | ○ | ○ | ○ | ○ | EXAMPLE |
| 59 | 0.39 | ◎ | ○ | ○ | ○ | ○ | ○ | COMPARATIVE EXAMPLE |
| 60 | 0.44 | ◎ | ○ | ○ | ○ | ○ | ○ | EXAMPLE |
| 61 | 0.51 | ◎ | ○ | ○ | ○ | ○ | ○ | EXAMPLE |
| 62 | 0.45 | ◎ | ○ | ○ | ○ | ○ | ○ | COMPARATIVE EXAMPLE |
| 63 | 0.39 | ◎ | ○ | ○ | ○ | ○ | ○ | EXAMPLE |
| 64 | 0.51 | ◎ | ○ | ○ | ○ | ○ | ○ | EXAMPLE |
| 65 | 0.32 | ◎ | ○ | ○ | ○ | ○ | ○ | COMPARATIVE EXAMPLE |
| 66 | 0.45 | ◎ | ○ | ○ | ○ | ○ | ○ | EXAMPLE |
| 67 | 0.49 | ◎ | ○ | ○ | ○ | ○ | ○ | EXAMPLE |
| 68 | 0.33 | X | ○ | ○ | X | X | X | COMPARATIVE EXAMPLE |
| 69 | 0.52 | ◎ | ○ | ○ | ○ | ○ | ○ | EXAMPLE |
| 70 | 0.39 | ◎ | ○ | ○ | ○ | ○ | ○ | EXAMPLE |
| 71 | 0.37 | ◎ | ○ | ○ | ○ | ○ | ○ | EXAMPLE |
| 72 | 0.53 | ◎ | ○ | ○ | ○ | ○ | ○ | EXAMPLE |
| 73 | 0.45 | ◎ | ○ | ○ | ○ | ○ | ○ | EXAMPLE |

TABLE 11-continued

| # | Value | C1 | C2 | C3 | C4 | C5 | C6 | Type |
|---|---|---|---|---|---|---|---|---|
| 74 | 0.30 | X | ○ | ○ | ○ | X | ○ | COMPARATIVE EXAMPLE |
| 75 | 0.40 | ○ | ○ | ○ | ○ | ○ | ○ | EXAMPLE |
| 76 | 0.47 | ◎ | ○ | ○ | ○ | ○ | ○ | EXAMPLE |
| 77 | 0.32 | X | X | ○ | ○ | ○ | X | COMPARATIVE EXAMPLE |
| 78 | 0.49 | ◎ | ○ | ○ | ○ | ○ | ○ | EXAMPLE |
| 79 | 0.39 | ◎ | ○ | ○ | ○ | ○ | ○ | EXAMPLE |
| 80 | 0.33 | ◎ | ○ | ○ | ○ | ○ | ○ | COMPARATIVE EXAMPLE |
| 81 | 0.40 | ◎ | ○ | ○ | ○ | ○ | ○ | EXAMPLE |
| 82 | 0.49 | ◎ | X | ○ | ○ | ○ | ○ | EXAMPLE |
| 83 | 0.42 | ◎ | ○ | ○ | ○ | ○ | ○ | EXAMPLE |
| 84 | | | | EXPERIMENT STOPPED | | | | COMPARATIVE EXAMPLE |
| 85 | 0.39 | ◎ | ○ | ○ | ○ | ○ | ○ | EXAMPLE |
| 86 | | | | EXPERIMENT STOPPED | | | | COMPARATIVE EXAMPLE |
| 87 | | | | EXPERIMENT STOPPED | | | | COMPARATIVE EXAMPLE |
| 88 | 0.31 | ◎ | X | EXPERIMENT STOPPED | ○ | ○ | ○ | COMPARATIVE EXAMPLE |
| 89 | | | | | | | | EXAMPLE |
| 90 | 0.31 | ◎ | ○ | ○ | ○ | ○ | ○ | COMPARATIVE EXAMPLE |
| 91 | 0.32 | ◎ | ○ | ○ | ○ | ○ | ○ | COMPARATIVE EXAMPLE |
| 92 | 0.53 | X | ○ | ○ | ○ | ○ | X (UNPLATING) | COMPARATIVE EXAMPLE |
| 93 | 0.51 | ◎ | ○ | ○ | ○ | ○ | △ | COMPARATIVE EXAMPLE |
| 94 | 0.53 | ○ | ○ | ○ | ○ | ○ | ○ | EXAMPLE |

TABLE 11-continued

| | | | | | | | COMPAR- ATIVE EXAMPLE |
|---|---|---|---|---|---|---|---|
| 95 | 0.53 | ◯ | ◯ | ◯ | ◯ | ◯ | Δ |

✕ UNDERLINED PART IS OUT OF PRESENT INVENTION RANGE

In Experimental example 17, which is the example of the present invention, the effective Al amount was 0.180 mass %, but the Fe—Al alloy was generated uniformly in the width direction, the decrease in plating adhesion described in Patent Literature 12 was not caused, and the plating adhesion improved conversely.

Experimental example 81 is an example where the C content was small and the volume fraction of the hard structure V2 in the range of ⅛ thickness to ⅜ thickness of which center is ¼ of the sheet thickness decreased, failing to obtain a sufficient tensile strength.

Experimental example 82 is an example where the C content was large and the spot weldability deteriorated.

Experimental example 83 is an example where the Si content was small, and in the annealing step and the plating step, large amounts of the pearlite and the coarse cementite were generated, and thus the formability deteriorated.

Experimental example 84 is an example where the Si content was large, in the hot rolling step, the slab cracked during heating, and thus the experiment was stopped.

Experimental example 85 is an example where the Mn content was small, and in the annealing step and the plating step, large amounts of pearlite and coarse cementite were generated, failing to sufficiently obtain the tensile strength and the formability of the steel sheet.

Experimental example 86 is an example where the Mn content was large, in the hot rolling step, the slab cracked during rolling, and thus the experiment was stopped.

Experimental example 87 is an example where the P content was large, in the casting step, the slab cracked, and thus the experiment was stopped.

Experimental example 88 is an example where the S content was large and a large amount of coarse sulfide was generated, and thus the ductility, the hole expandability, the bendability, the fatigue resistance, and the spot weldability deteriorated.

Experimental example 89 is an example where the Al content was large, in the hot rolling step, the slab cracked during rolling, and thus the experiment was stopped.

Experimental example 90 is an example where the N content was large and a large amount of coarse nitride was generated, and thus the ductility, the hole expandability, the bendability, and the fatigue resistance deteriorated.

Experimental example 91 is an example where the O content was large and a large amount of coarse oxide was generated, and thus the ductility, the hole expandability, the bendability, and the fatigue resistance deteriorated.

Experimental examples 6 and 80 each are an example where the value in Formula (1) in the hot rolling step was too large, the fraction of the hard structure in the surface layer portion of the steel sheet decreased excessively, and the fatigue limit strength decreased.

Experimental examples 18 and 44 each are an example where the value in Formula (1) in the hot rolling step was too small, the fraction of the hard structure in the surface layer portion of the steel sheet increased excessively, and the bendability deteriorated.

Experimental examples 68 and 74 each are an example where in the annealing step, the average heating rate in the temperature zone of 600° C. to 750° C. was small, the growth of oxides inside the steel sheet progressed excessively, and coarse oxides to be a starting point of breakage were generated, and thus the bendability and the fatigue resistance deteriorated. With the deterioration in the bendability, plating peeling resulting from bending crack of the steel sheet occurred in the evaluation tests of the plating adhesion and the powdering resistance, and thus the plating adhesion and the powdering resistance also deteriorated.

In Experimental example 95, in the annealing step, the average heating rate in the temperature zone of 600° C. to 750° C. was too large, and thus the difference between the maximum value and the minimum value of the thickness of the fine-grain layer in the width direction of the steel sheet was greater than 2.0 μm, and further the difference between the maximum value and the minimum value of the thickness of the Fe—Al alloy layer was more than 0.5 μm. Therefore, the plating appearance was slightly nonuniform.

Experimental example 65 is an example where in the heating step of the annealing step, the air ratio in the preheating zone was large and the decarburization in the surface layer progressed excessively, and thus the fatigue resistance deteriorated. Additionally, it is an example where the average thickness of the fine-grain layer thickened, the alloying of the plating layer (generation of the Zn—Fe alloy) progressed excessively, and the Fe content in the plating layer increased, and thus the plating adhesion, the chipping resistance, and the powdering resistance deteriorated.

Experimental examples 15 and 53 each are an example where in the heating step of the annealing step, the air ratio in the preheating zone was small and the plating adhesion deteriorated. Due to the deterioration in the plating adhesion, plating peeling occurred at the time of bending deformation, and thus the bendability also deteriorated. Further, appearance failure due to unplating also occurred.

Experimental example 47 is an example where in the heating step of the annealing step, $\text{Log}(P(H_2O)/P(H_2))$ in the soaking zone was large, the fine-grain layer in the surface layer thickened excessively, the alloying of the plating layer (generation of the Zn—Fe alloy) progressed excessively, and the Fe content in the plating layer increased, and thus the plating adhesion deteriorated.

Experimental example 77 is an example where in the heating step of the annealing step, $\text{Log}(P(H_2O)/P(H_2))$ in the preheating zone was large, the fine-grain layer in the surface layer thickened excessively, the alloying of the plating layer (generation of the Zn—Fe alloy) progressed excessively, and the Fe content in the plating layer increased, and thus the plating adhesion deteriorated. Further, the difference between the maximum value and the minimum value of the thickness of the Fe—Al alloy layer in the width direction of the steel sheet was more than 0.5 μm and the plating appearance was nonuniform.

Experimental example 50 is an example where in the heating step of the annealing step, $\text{Log}(P(H_2O)/P(H_2))$ in the soaking zone was small and the surface layer was not made fine, and thus the plating adhesion deteriorated. The average grain diameter of the ferrite in the surface was 3.4 μm and the maximum diameter of the oxides inside the steel sheet in the range from the surface to 0.5 μm was less than 0.01 μm. Further, the appearance failure due to unplating also occurred.

Experimental example 92 is an example where in the heating step of the annealing step, $\text{Log}(P(H_2O)/P(H_2))$ in the preheating zone was small and the surface layer was not made fine, and thus the plating adhesion deteriorated. The average grain diameter of the ferrite in the surface was 3.2 μm and the maximum diameter of the oxides inside the steel sheet in the range from the surface to 0.5 μm was less than 0.01 μm. Further, the appearance failure due to unplating also occurred.

Experimental examples 24 and 59 each are an example where in the heating step of the annealing step, the maximum heating temperature was low, the fraction of the ferrite to the microstructure increased excessively, and further the volume fraction of the hard structure V2 in the range of ⅛ thickness to ⅜ thickness of which center is ¼ of the sheet thickness decreased, and the yield ratio deteriorated.

Experimental examples 21 and 71 each are an example where in the first cooling step of the annealing step, the cooling rate from 720° C. to 650° C. (the cooling rate 1) was small, the fraction of the ferrite to the microstructure increased excessively, and further the volume fraction of the hard structure V2 in the range of ⅛ thickness to ⅜ thickness of which center is ¼ of the sheet thickness decreased, and the yield ratio deteriorated.

Experimental examples 34 and 62 each are an example where in the first cooling step of the annealing step, the cooling rate from 650° C. to 500° C. (the cooling rate 2) was small, a large amount of pearlite was generated, and further the volume fraction of the hard structure V2 in the range of ⅛ thickness to ⅜ thickness of which center is ¼ of the sheet thickness decreased, and thus the tensile strength, the ductility, and the yield ratio deteriorated.

Experimental example 9 is an example where in the plating step, the cooling rate after plating was small and the Fe content in the plating layer increased excessively, failing to obtain sufficient plating adhesion, chipping resistance, and powdering resistance.

Experimental example 56 is an example where in the plating step, the effective Al concentration in the plating bath was low, the Fe content in the plating layer increased, and the plating adhesion, the chipping resistance, and the powdering resistance were impaired.

Experimental example 31 is an example where in the plating step, the effective Al concentration in the plating bath was extremely low, the Fe—Al alloy layer was not formed, and the Fe content in the plating layer increased excessively, failing to obtain sufficient plating adhesion, chipping resistance, powdering resistance, and plating appearance uniformity.

Experimental example 37 is an example where in the plating step, the effective Al concentration in the plating bath was high and the Al content in the plating layer increased excessively, failing to obtain sufficient plating adhesion and spot weldability.

In Experimental examples 25 and 38, the coiling temperature in the hot rolling step was 650° C. or more, the difference between the maximum value and the minimum value of the thickness of the fine-grain layer in the width direction of the steel sheet was more than 2.0 µm, and further the difference between the maximum value and the minimum value of the thickness of the Fe—Al alloy layer in the width direction of the steel sheet was more than 0.5 µm, and thus the plating appearance was slightly nonuniform.

On the other hand, in Experimental examples 26 and 39, similarly to the above, the coiling temperature in the hot rolling step was 650° C. or more, but the acid pickling time in the acid pickling step was made long, and thereby the difference between the maximum value and the minimum value of the thickness of the fine-grain layer in the width direction of the steel sheet became better, which was within 2.0 µm, and at the same time, the difference between the maximum value and the minimum value of the thickness of the Fe—Al alloy layer in the width direction of the steel sheet became better, which was within 0.5 µm, resulting in that good plating appearance uniformity was obtained.

In Experimental example 93, the coiling temperature was less than 650° C., but the acid pickling time was short, which was 15 seconds, thus failing to completely remove the internal oxide layer generated nonuniformly, and the difference between the maximum value and the minimum value of the thickness of the fine-grain layer in the width direction of the steel sheet became more than 2.0 µm and further, the difference between the maximum value and the minimum value of the thickness of the Fe—Al alloy layer in the width direction of the steel sheet was more than 0.5 µm, and thus the plating appearance was slightly nonuniform.

In the foregoing, the embodiments of the present invention have been explained in detail, but it should be noted that the above-described embodiments only present specific examples in carrying out the present invention. The technical scope of the present invention should not be construed in a limited manner by these. That is, the present invention can be embodied in a variety of forms without departing from its technical idea or its main feature.

INDUSTRIAL APPLICABILITY

The present invention is a technique effective for a high-strength hot-dip galvanized steel sheet excellent in plating appearance uniformity, formability, fatigue resistance, weldability, corrosion resistance, and plating adhesion and a manufacturing method thereof. Then, according to the embodiment of the present invention, it is possible to provide a high-strength hot-dip galvanized steel sheet that is excellent in bendability, stretch flange formability, and plating adhesion after forming and has a high fatigue limit and a manufacturing method thereof.

The invention claimed is:

1. A hot-dip galvanized steel sheet comprising a hot-dip galvanizing layer on at least one side of a base steel sheet, wherein the base steel sheet has chemical components containing, in mass %, C: 0.040% to 0.280%,
Si: 0.05% to 2.00%,
Mn: 0.50% to 3.50%,
P: 0.0001% to 0.1000%,
S: 0.0001% to 0.0100%,
Al: 0.001% to 1.500%,
N: 0.0001% to 0.0100%,
O: 0.0001% to 0.0100%,
Ti: 0% to 0.150%,
Nb: 0% to 0.100%,
V: 0% to 0.300%,
Cr: 0% to 2.00%,
Ni: 0% to 2.00%,
Cu: 0% to 2.00%,
Mo: 0% to 2.00%,
B: 0% to 0.0100%,
W: 0% to 2.00%, and
Ca, Ce, Mg, Zr, La, and REM: 0% to 0.0100% in total, and
a balance comprising Fe and impurities, and
the base steel sheet has a microstructure in which
in a range of ⅛ thickness to ⅜ thickness of which center is a ¼ thickness of the entire thickness of the base steel sheet from a surface of any side of the base steel sheet,
a volume fraction of a ferrite phase is 0% or more and less than 50%,
a volume fraction of the total of a hard structure comprising one or more of a bainite structure, a bainitic ferrite phase, a fresh martensite phase, and a tempered martensite phase is 50% or more,
a volume fraction of a retained austenite phase is 0% to 8%, and a volume fraction of the total of a pearlite phase and a coarse cementite phase is 0% to 8%, in a surface layer portion from an interface between the hot-dip galvanizing layer and the base steel sheet to 20 µm in depth in the thickness direction of the steel sheet, a volume fraction of retained austenite is 0% to 3%, and V1/V2 being a ratio of a volume fraction V1 of the hard structure in the surface layer portion to a volume fraction V2 of the hard structure in the range of ⅛ thickness to ⅜ thickness of which center is the ¼ thickness from the surface of any side of the base steel sheet is limited within a range of 0.10 or more and 0.90 or less, and in the hot-dip galvanizing layer, a Fe content is more than 0% and 3.0% or less and an Al content is more than 0% and 1.0% or less, the hot-dip galvanized steel sheet comprising:

a Fe—Al alloy layer provided at an interface between the hot-dip galvanizing layer and the base steel sheet, the Fe—Al alloy layer consisting of a Fe—Al alloy phase and having an average thickness of 0.1 µm to 2.0 µm and a difference between a maximum thickness and a minimum thickness in a width direction of the steel sheet being within 0.5 µm; and a fine-grain layer provided in the base steel sheet and directly in contact with the Fe—Al alloy layer, the fine-grain layer having an average thickness of 0.1 µm to 5.0 µm, the fine-grain layer including a ferrite phase with an average grain diameter of 0.1 µm to 3.0 µm, the fine-grain layer containing an oxide of one or more of Si and Mn, a maximum diameter of the oxide being 0.01 µm to 0.4 µm, and the fine-grain layer having a difference between a maximum thickness and a minimum thickness in the width direction of the steel sheet being within 2.0 µm.

2. The hot-dip galvanized steel sheet according to claim 1, wherein
a plating deposition amount per one side of the hot-dip galvanizing layer is 10 g/m² or more and 100 g/m² or less.

3. The hot-dip galvanized steel sheet according to claim 1, wherein
the base steel sheet further contains, in mass %, one or two or more selected from a group consisting of
Ti: 0.001% to 0.150%,
Nb: 0.001% to 0.100%, and
V: 0.001% to 0.300%.

4. The hot-dip galvanized steel sheet according to claim 2, wherein
the base steel sheet further contains, in mass %, one or two or more selected from a group consisting of
Ti: 0.001% to 0.150%,
Nb: 0.001% to 0.100%, and
V: 0.001% to 0.300%.

5. The hot-dip galvanized steel sheet according to claim 1, wherein
the base steel sheet further contains, in mass %, one or two or more selected from a group consisting of
Cr: 0.01% to 2.00%,
Ni: 0.01% to 2.00%,
Cu: 0.01% to 2.00%,
Mo: 0.01% to 2.00%,
B: 0.0001% to 0.0100%, and
W: 0.01% to 2.00%.

6. The hot-dip galvanized steel sheet according to claim 2, wherein
the base steel sheet further contains, in mass %, one or two or more selected from a group consisting of
Cr: 0.01% to 2.00%,
Ni: 0.01% to 2.00%,
Cu: 0.01% to 2.00%,
Mo: 0.01% to 2.00%,
B: 0.0001% to 0.0100%, and
W: 0.01% to 2.00%.

7. The hot-dip galvanized steel sheet according to claim 1, wherein
the base steel sheet further contains, in mass %, 0.0001% to 0.0100% in total of one or two or more selected from a group consisting of Ca, Ce, Mg, Zr, La, and REM.

8. The hot-dip galvanized steel sheet according to claim 2, wherein
the base steel sheet further contains, in mass %, 0.0001% to 0.0100% in total of one or two or more selected from a group consisting of Ca, Ce, Mg, Zr, La, and REM.

* * * * *